United States Patent
Kim et al.

(10) Patent No.: US 11,159,669 B2
(45) Date of Patent: Oct. 26, 2021

(54) ATTACHMENT DEVICE AND METHOD FOR CONTROLLING ELECTRONIC DEVICE THEREOF

(71) Applicant: Samsung Electronics Co., Ltd., Suwon-si (KR)

(72) Inventors: Sun-hwa Kim, Seoul (KR); Sung-won Kim, Suwon-si (KR); Hee-bum Ahn, Seoul (KR); Joonoo Kim, Suwon-si (KR); Jin Ra, Suwon-si (KR); Jong-hyun Ryu, Suwon-si (KR); Kyung-ho Jeong, Seoul (KR); Yong-ho Kim, Seoul (KR); Yong-gook Park, Yongin-si (KR); Myung-sik Kim, Suwon-si (KR); Chan-hong Min, Yongin-si (KR); Jin-hyuk Jung, Suwon-si (KR); Woo-hyek Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/457,228

(22) Filed: Jun. 28, 2019

(65) Prior Publication Data

US 2019/0320059 A1    Oct. 17, 2019

Related U.S. Application Data

(63) Continuation of application No. 14/955,886, filed on Dec. 1, 2015, now Pat. No. 10,425,520.

(30) Foreign Application Priority Data

Dec. 1, 2014    (KR) ........................ 10-2014-0169798

(51) Int. Cl.
*H04M 1/72*    (2021.01)
*H04M 1/72415*    (2021.01)
(Continued)

(52) U.S. Cl.
CPC ........ *H04M 1/72415* (2021.01); *H04L 12/12* (2013.01); *H04L 12/2816* (2013.01);
(Continued)

(58) Field of Classification Search
CPC ... H04L 63/061; H04L 9/0866; H04L 9/0819; H04L 9/0869; H04L 12/2809;
(Continued)

(56) References Cited

U.S. PATENT DOCUMENTS 9,912,726 B2    3/2018    Sasaki et al.
9,953,520 B2    4/2018    Wu et al.
(Continued)

FOREIGN PATENT DOCUMENTS

CN    202334570 U    7/2012
CN    202475468 U    10/2012
(Continued)

OTHER PUBLICATIONS

Chinese Office Action dated Jun. 25, 2019, issued in Chinese Application No. 201580065235.1.
(Continued)

*Primary Examiner* — Fred A Casca
(74) *Attorney, Agent, or Firm* — Jefferson IP Law, LLP

(57) ABSTRACT

A technique for controlling an electronic device thereof is provided. The technique includes, in response to an attachment device being selected by an external device from a list of attachment devices, receiving and storing mapping information in which data configured in a first communication format and data configured in a second communication format in relation to one function of the electronic device to which the attachment device is attached are mapped. In addition, in response to the data configured in the first communication format being received from an external device which is communicably connected with the attach-
(Continued)

ment device, the data configured in the second communication format corresponding to the data configured in the first communication format based on the mapping information is acquired, and the data configured in the second communication format to the electronic device to control the one function of the electronic device to be performed is transmitted.

10 Claims, 59 Drawing Sheets

(51) Int. Cl.
  *H04L 12/12* (2006.01)
  *H04L 29/08* (2006.01)
  *H04L 12/28* (2006.01)
  *H04L 12/46* (2006.01)
  *H04M 1/72412* (2021.01)

(52) U.S. Cl.
  CPC ...... *H04L 12/2823* (2013.01); *H04L 12/4625* (2013.01); *H04L 67/12* (2013.01); *H04L 67/16* (2013.01); *H04M 1/72412* (2021.01); *Y02D 30/50* (2020.08)

(58) Field of Classification Search
  CPC ....... H04L 63/10; H04L 63/20; H04L 12/281; H04W 12/04; H04W 12/12; H04W 4/005; H04W 4/008; H04W 4/206; H04W 4/023; H04W 4/003; H04W 4/02; H04W 84/12; H04W 8/005; H04W 76/025; H04W 48/16; H04W 4/00; H04W 4/70; H04M 1/72533; H04M 2250/12; G08C 2201/93; G08C 17/02
  See application file for complete search history.

(56) References Cited

U.S. PATENT DOCUMENTS

| | | | |
|---|---|---|---|
| 2003/0018776 A1 | 1/2003 | Yoon et al. | |
| 2003/0210126 A1* | 11/2003 | Kanazawa | G08C 17/02 340/5.5 |
| 2004/0053636 A1* | 3/2004 | Oguma | H04W 88/06 455/550.1 |
| 2006/0168236 A1* | 7/2006 | Higuma | G11C 16/102 709/227 |
| 2008/0166915 A1 | 7/2008 | Kendall et al. | |
| 2013/0121183 A1* | 5/2013 | Pope | H04L 29/06 370/252 |
| 2014/0141834 A1* | 5/2014 | Kim | H04W 88/06 455/552.1 |
| 2015/0067529 A1 | 3/2015 | Sasaki et al. | |
| 2015/0223277 A1* | 8/2015 | Jovicic | H04L 12/437 455/41.2 |
| 2015/0351004 A1* | 12/2015 | Ko | H04W 12/003 455/411 |
| 2015/0379071 A1 | 12/2015 | Dorner et al. | |
| 2016/0171880 A1 | 6/2016 | Wu et al. | |

FOREIGN PATENT DOCUMENTS

| | | |
|---|---|---|
| CN | 104020733 A | 9/2014 |
| CN | 104169659 A | 11/2014 |
| EP | 2242208 A2 | 10/2010 |
| JP | 2014-160893 A | 9/2014 |
| KR | 10-0997265 B1 | 11/2010 |
| KR | 10-2014-0081269 A | 7/2014 |
| WO | 2014-005939 A1 | 1/2014 |
| WO | 2014-027349 A1 | 2/2014 |

OTHER PUBLICATIONS

European Examination Report dated Oct. 29, 2019, issued in European Application No. 15865778.3.
Chinese Office Action dated Nov. 19, 2019, issued in Chinese Application No. 201580065235.1.
Indian Examination Report dated Jun. 16, 2020 issued in Indian Application No. 201717021959.
Korean Office Action dated Feb. 24, 2021, issued in Korean Application No. 10-2014-0169798.

\* cited by examiner

| Model Name | Attachment Device ID |
|---|---|
| Samsung U8000 | 1642 |
| Samsung AF4500 | 1643 |
| LG 76504 | 1644 |

202

| Command | IR Code | BT Code |
|---|---|---|
| Turn On Power | 0xFFFF40 | 700771 |
| Increase Temperature | 0xFFFF41 | 700773 |

203

| Command | IR Code | BT Code |
|---|---|---|
| Turn On Power | 0xFFFF10 | 700750 |
| Increase Channel | 0xFFFF33 | 700751 |

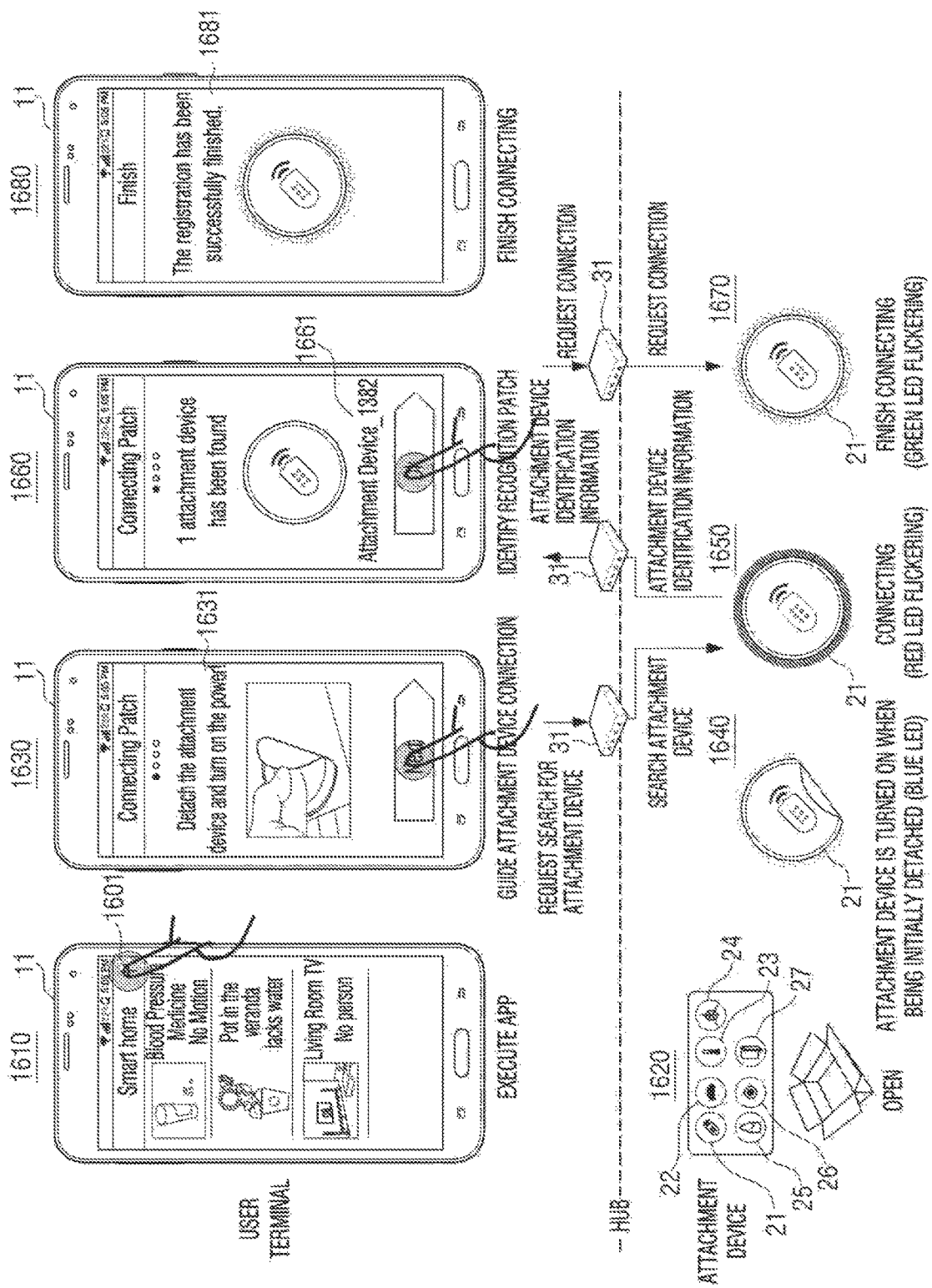

| | ATTACHMENT LOCATION | |
|---|---|---|
| WIDE AREA | CALF | RELAXING MUSCLES... |
| | BACK | LUMBAGO |
| | BELLY | FETAL MOVEMENT, HUNGER, BODY FAT |
| | SHOULDER, MUSCLES OF ARM | TIGHTENED SHOULDER MUSCLES, MUSCLE SENSING |
| | SPINE | BODY TYPE CORRECTION |
| CURVY PARTS | FINGER | DISPLAY |
| | FACE | FACIAL MUSCLE CORRECTION |
| | HIP | SITTING TIME |
| | TOP OF FOOT, SOLE, HEEL | NUMBER OF STEPS |
| | MOUTH | |
| | EAR | |
| EASILY ATTACHABLE AND DETACHABLE PARTS | NAIL | TEMPORARILY USE DUE TO NAIL GROWING CHARACTERISTIC |

3720

| | INPUT | ATTACH TO SKIN SURFACE AND DETECT |
|---|---|---|
| BIOLOGICAL SIGNALS | | TEMPERATURE |
| | | HEART BEAT |
| | | SWEAT |
| | | BLOOD FLOW |
| | | OXYGEN SATURATION |
| | | BRAINWAVE MEASUREMENT |
| | | STRESS |
| | | SLEEPINESS |
| | | EMOTION (SURPRISE, ETC.) |
| | | BREATHING |
| SKIN SURFACE | | SKIN STATE (DRYNESS AND WETNESS) |
| | | SCAR, HURT |
| | | ATTACHMENT LOCATION |
| | | SKIN FLEXIBILITY |
| BODY MOTION | | GESTURE |
| | | MUSCLE MOVEMENT |
| MATERIAL | | FLEXIBILITY (TWIST OR STRETCH) |
| | | PRESSURE |
| | | TOUCH |
| SURROUNDING ENVIRONMENT | | FINE DUST |
| | | UV |
| | | TEMPERATURE AND HUMIDITY |
| | | SOUND |
| | | SURROUNDING IMAGE (W/CAMERA) |
| | | LOCATION (GPS) |
| | | WEATHER |

3730

| OUTPUT | DISPLAYING NECESSARY INFORMATION ACCORDING TO SITUATION |
|---|---|
| | DISPLAY (RGB) |
| | VIBRATION |
| | SOUND |
| | LIGHT |
| | ELECTRICAL IMPULSE |
| | TIGHTENED OR LOOSENED USING ELASTICITY OF MATERIAL |
| | (SKIN SURFACE IS CHANGED FORCIBLY) |
| | TORN (WHEN FUNCTION IS ACHIEVED) |

3740

| | POWER SUPPLY |
|---|---|
| POWER SUPPLY METHOD | BODY HEAT |
| | BODY MOTION (SELF-GENERATING) |
| | SOLAR HEAT |
| | DRAWN BLOOD |

ATTACHMENT DEVICE AND METHOD FOR CONTROLLING ELECTRONIC DEVICE THEREOF

CROSS-REFERENCE TO RELATED APPLICATION(S)

This application is a continuation application of prior application Ser. No. 14/955,886, filed on Dec. 1, 2015, which was based on and claimed priority under 35 U.S.C. § 119(a) of a Korean patent application number 10-2014-0169798, filed on Dec. 1, 2014, in the Korean Intellectual Property Office, the disclosure of which is incorporated by reference herein in its entirety.

TECHNICAL FIELD

The present disclosure relates to an attachment device and a method for controlling an electronic device thereof. More particularly, the present disclosure relates to an attachment device which receives data from an external device and controls an electronic device using the data, and a method for controlling an electronic device thereof.

BACKGROUND

Smart home technology refers to technology which interconnects indoor electronic devices provided with a network function, and monitors and controls the electronic devices.

A user can remotely control the indoor electronic devices using the smart home technology regardless of place or time. For example, the user may control the indoor electronic devices to operate at a desired time at a user's office.

The smart home technology is developing in various ways in recent years with the development of wire and wireless communication networks and the development of user terminal devices. For example, the indoor electronic devices can be controlled using a smartphone, and in particular, can be controlled in an efficient and integrated manner with a smartphone and an indoor hub interworking with each other.

The above information is presented as background information only to assist with an understanding of the present disclosure. No determination has been made, and no assertion is made, as to whether any of the above might be applicable as prior art with regard to the present disclosure.

SUMMARY

In the smart home environment, the indoor electronic devices may be connected with one another via a communication network. However, in order to establish the smart home environment for all of the indoor electronic devices, existing old-fashioned electronic devices (so-called legacy devices) without a communication network function should be replaced with new electronic devices.

Aspects of the present disclosure are to address at least the above-mentioned problems and/or disadvantages and to provide at least the advantages described below. Accordingly, an aspect of the present disclosure is to provide a method for establishing a smart home environment without replacing legacy devices with new electronic devices. In particular, an aspect of the present disclosure is to provide a method for monitoring and controlling legacy devices using a low-cost attachment device which is attachable to things or persons like a patch. The things recited herein include an electronic device including a legacy device, furniture, a manufactured product such as a toy, and a part of a building such as a wall, a pillar, a door, a floor, etc., and also includes various kinds of things having a surface which occupies a space and to which an attachment device is attachable.

In accordance with an aspect of the present disclosure, a method for controlling an electronic device in an attachment device is provided. The method includes receiving and storing mapping information in which data configured in a first communication format and data configured in a second communication format in relation to one function of the electronic device to which the attachment device is attached are mapped, receiving the data configured in the first communication format from a user terminal or a hub which is communicably connected with the attachment device, acquiring the data configured in the second communication format corresponding to the data configured in the first communication format based on the stored mapping information, and transmitting the data configured in the second communication format to the electronic device to which the attachment device is attached to control the one function of the electronic device to be performed.

The receiving and storing of the mapping information related to the one function of the electronic device to which the attachment device is attached may include, in response to the attachment device being selected from an attachment device list of the user terminal, receiving the mapping information related to the one function of the electronic device to which the attachment device is attached from at least one of the user terminal, the hub, and a cloud.

The method may further include transmitting information on an operation state of the electronic device to which the attachment device is attached to at least one of the user terminal, the hub, and a cloud.

The transmitting of the data configured in the second communication format to the electronic device to which the attachment device is attached may include transmitting the data configured in the second communication format to the electronic device to which the attachment device is attached based on an operation state of the electronic device.

The transmitting of the data configured in the second communication format to the electronic device may include transmitting the data configured in the second communication format to the electronic device to which the attachment device is attached based on surrounding environment information of the attachment device.

In accordance with another aspect of the present disclosure, a method for controlling an electronic device in a user terminal is provided. The method includes displaying a list of a plurality of attachment devices which are attachable to the electronic device, receiving a user input to select an attachment device to control the electronic device from the attachment device list, and, in response to the user input, controlling to transmit, to the selected attachment device, mapping information in which data configured in a first communication format and data configured in a second communication format in relation to one function of the electronic device are mapped.

The method may further include mapping identification information of the electronic device and identification information of the selected attachment device, and storing the mapping information.

The method may further include displaying information related to a function of the electronic device which is controllable by the attachment device.

The controlling to transmit the mapping information to the selected attachment device may include controlling, by at least one of the user terminal, the hub, and a cloud, to transmit the mapping information to the selected attachment device.

In accordance with another aspect of the present disclosure, an attachment device which controls an electronic device is provided. The attachment device includes a storage configured to store mapping information in which data configured in a first communication format and data configured in a second communication format in relation to one function of the electronic device to which the attachment device is attached are mapped, a communication unit configured to receive the data configured in the first communication format from a user terminal or a hub which is communicably connected with the attachment device, and a processor configured to acquire the data configured in the second communication format corresponding to the data configured in the first communication format based on the mapping information stored in the storage, and control the communication unit to transmit the data configured in the second communication format to the electronic device to which the attachment device is attached.

The attachment device may further include an attachment part which is attachable to the electronic device.

The attachment device may be formed of a plurality of layers which are stacked, and at least one of the communication unit, the processor, and the storage unit of the attachment device may be included in at least one of the plurality of layers.

In response to the attachment device being selected from an attachment device list of the user terminal, the communication unit may be configured to receive, from at least one of the user terminal, the hub, and a cloud, the mapping information in which the data configured in the first communication format and the data configured in the second communication format in relation to the one function of the electronic device to which the attachment device is attached are mapped.

The communication unit may be configured to transmit information on an operation state of the electronic device to which the attachment device is attached to at least one of the user terminal, the hub, and a cloud.

The attachment device may further include a sensing unit configured to detect an operation state of the attachment device, and the communication unit may be configured to transmit the data configured in the second communication format to the electronic device to which the attachment device is attached based on an operation state of the electronic device.

The attachment device may further include a sensing unit configured to detect a surrounding environment of the attachment device, and the communication unit may be configured to transmit the data configured in the second communication format to the electronic device to which the attachment device is attached based on surrounding environment information of the attachment device.

In accordance with another aspect of the present disclosure, a user terminal which controls an electronic device is provided. The user terminal includes a display configured to display a list of a plurality of attachment devices which are attachable to the electronic device and a processor configured to, in response to a user input to select an attachment device to control the electronic device from the attachment device list, control to transmit, to the selected attachment device, mapping information in which data configured in a first communication format and data configured in a second communication format in relation to one function of the electronic device are mapped.

The user terminal may further include a storage configured to map identification information of the electronic device and identification information of the selected attachment device, and store the mapping information.

The display may be configured to display information related to a function of the electronic device which is controllable by the attachment device.

The processor may be configured to control at least one of the user terminal, the hub, and a cloud to transmit the mapping information to the selected attachment device.

According to various embodiments of the present disclosure described above, the user can establish a smart home environment including existing legacy devices using an attachment device, which can be simply installed with low cost.

In particular, the user can control electronic devices in user's house, and detect an environment, things, and electronic devices in the home using the attachment device. Accordingly, a secure environment can be established in the house.

In addition, the attachment device has a layered structure in which a plurality of layers including different function modules are formed. In this case, an area of the attachment device which is attached to a person or a thing is minimized, and thus a side effect caused by attaching can be reduced and various customized attachment devices can be manufactured according to a layered structure.

As described above, existing legacy devices can be included in the smart environment using the attachment device, and the functions of a normal smart device can be enhanced. Therefore, smart devices as well as legacy devices can be effectively utilized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a view showing an example of a table which is stored in at least one of an attachment device, a cloud, a hub, and a user terminal according to an embodiment of the present disclosure;

FIGS. 13, 14, 15A, 15B, 16, 17, and 18 are views showing a process of searching and matching an electronic device and an attachment device according to various embodiments of the present disclosure;

FIG. 37 is a view showing various examples of attaching an attachment device to a person according to an embodiment of the present disclosure;

Throughout the drawings, like reference numerals will be understood to refer to like parts, components, and structures.

DETAILED DESCRIPTION

Figure 1A:
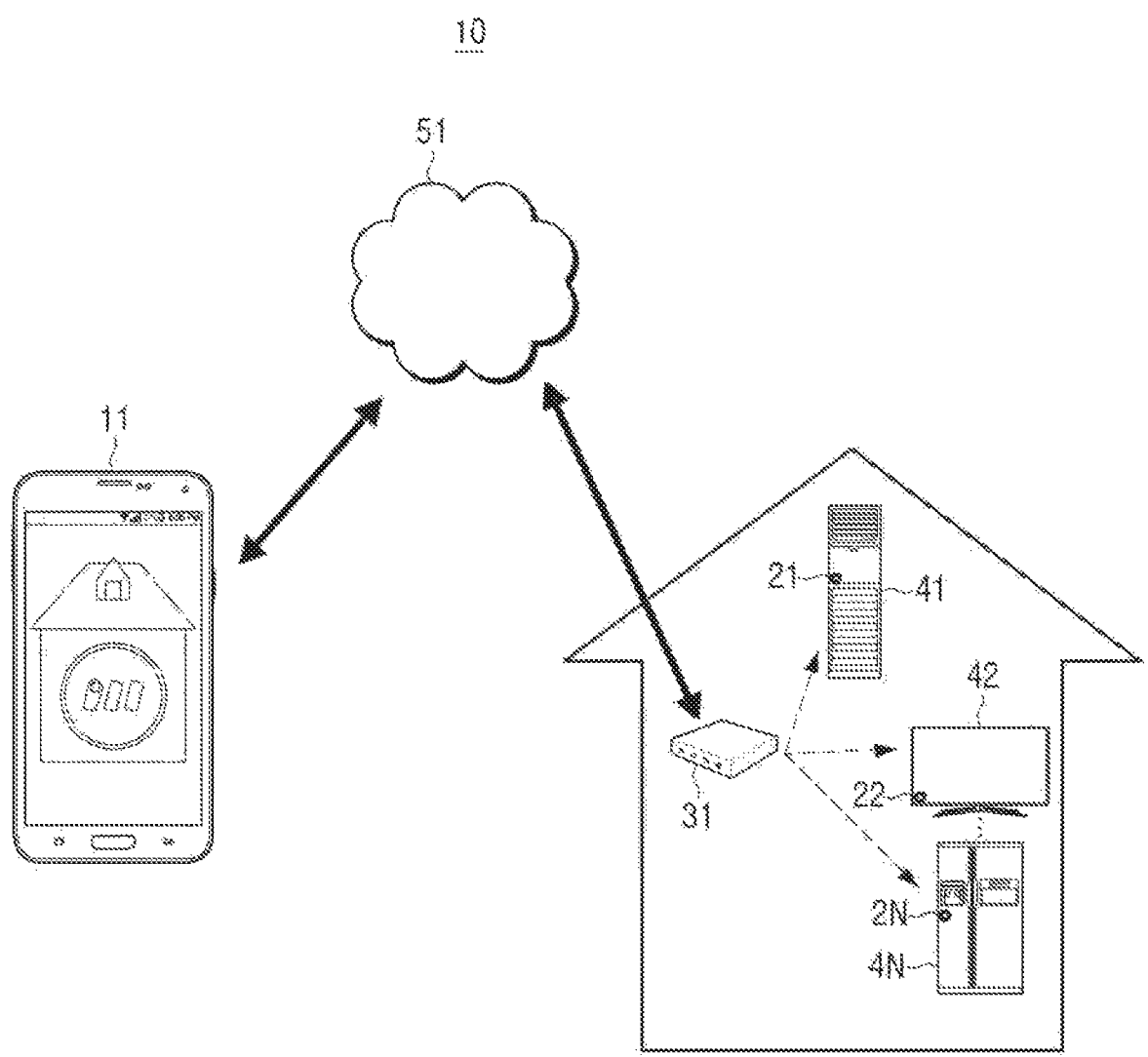
FIGS. 1A, 1B, 1C, and 1D are block diagrams showing a system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the various embodiments of the present disclosure are general terms which are widely used now and selected considering the functions of the present disclosure. However, the terms may vary depending on the intention of a person skilled in the art, a precedent, or the advent of new technology. In addition, in a specified case, the term arbitrarily selected by the applicant may be used. In this case, the meaning of the term will be explained in the corresponding description of the present disclosure. Therefore, the terms used in the present disclosure should be defined based on the meanings of the terms and the descriptions made herein, rather than the names of the terms.

The terms such as "first" and "second" may be used to describe various elements, but the elements should not be limited by these terms. These terms may be used for the purpose of distinguishing one element from another element.

In addition, it should be understood that the term "include" or "comprise" used in the various embodiments of the present disclosure is to indicate the presence of features, numbers, operations, elements, parts, or a combination thereof described in the specifications, and do not preclude the presence or addition of one or more other features, numbers, operations, elements, parts, or a combination thereof.

A "module" or "unit" used in the various embodiments of the present disclosure performs at least one function or operation, and may be implemented by hardware or software or a combination of hardware and software. In addition, a plurality of "modules" or a plurality of "units" may be integrated into at least one module and may be implemented as at least one processor (not shown), except for a "module" or "unit" which needs to be implemented by specific hardware.

It will be understood that, when an element is "connected" with another element, the element may be "directly connected" with another element, and also, the element may be "electrically connected" with another element with an intervening element therebetween. In addition, it will be understood that, when a certain part "includes" a certain element, the certain part may not exclude another element and may further include another element unless this term is defined otherwise.

Hereinafter, the various embodiments of the present disclosure will be described in greater detail with reference to the accompanying drawings, so that a person skilled in the art can easily implement the various embodiments of the present disclosure. The various embodiments of the present disclosure may, however, be embodied in many different forms and should not be construed as limited to the various embodiments of the present disclosure set forth herein. In addition, illustration of parts having nothing to do with the explanation of the present disclosure is omitted from the drawings to clearly explain the present disclosure. Throughout the specification, similar reference numerals are used for similar elements.

In addition, in the various embodiments of the present disclosure, a user input may include, but not limited to, at least one of a touch input, a bending input, a voice input, a button input, and a multimodal input.

In addition, in the various embodiments of the present disclosure, the "touch input" refers to a user input which is performed by a user on a display and a cover to control a device. In addition, the "touch input" may include a touch which is not performed in contact with the display and is performed at a predetermined distance or more from the display (for example, floating or hovering). The touch input may include, but not limited to, a touch & hold gesture, a tap gesture which is made by lightly touching and then releasing the touch, a double tap gesture, a panning gesture, a flick gesture, a touch and drag gesture which is made by touching and then moving in one direction, a pinch gesture, etc.

In addition, in the various embodiments of the present disclosure, the "button input" refers to an input which is performed by a user using a physical button attached to a device to control the device.

In addition, in the various embodiments of the present disclosure, the "motion input" refers to a motion which is made by a user to control a device. For example, the motion input may include a user's input of rotating or tilting a device or moving a device vertically and horizontally.

In addition, in the various embodiments of the present disclosure, the "multimodal input" refers to a combination of at least two input methods. For example, a device may receive user's touch input and motion input, or may receive user's touch input and voice input.

In addition, in the various embodiments of the present disclosure, an "application" refers to a set of computer programs which are designed to perform a specific job. In the various embodiments of the present disclosure, various applications may be provided. For example, the application may include, but not limited to, a game application, a moving image reproduction application, a map application, a memo application, a calendar application, a phone book application, a broadcasting application, an exercise supporting application, a payment application, a photo folder application, etc.

In addition, in the various embodiments of the present disclosure, "application identification information" may be unique information for distinguishing an application from another application. For example, the identification information of an application may be, but not limited to, an icon, an index item, link information, etc.

In addition, in the various embodiments of the present disclosure, a user interface (UI) element refers to an element which can interact with a user and provide visual, auditory, and olfactory feedback in response to a user input. The UI element may be expressed in at least one form of an image, a text, and a moving image. In addition, an area which does not display the above-described information but can provide feedback in response to a user input may be referred to as an UI element. In addition, the UI element may be the above-described application identification information.

Hereinafter, various embodiments of the present disclosure will be explained in detail with reference to the accompanying drawings.

FIGS. 1A to 1D are block diagrams showing a system 10 according to various embodiments of the present disclosure.

Referring to FIG. 1A, the system 10 may include a user terminal 11, a cloud 51 including at least one external server, and a hub 31, at least one electronic device 41-4N, and at least one attachment device 21-2N, which are located in user's house.

The user terminal 11 may provide a screen including a UI for connecting the at least one attachment device 21-2N and at least one electronic device 41-4N. In this case, the user terminal 11 may perform an initial setting process to connect the at least one attachment device 21-2N and the at least one electronic device 41-4N according to a user input through the UI.

In addition, the user terminal 11 may provide a screen including a UI for controlling the at least one electronic device 41-4N using the at least one attachment device 21-2N. In this case, the user terminal 11 may generate control data for controlling the at least one electronic device 41-4N according to a user input through the UI, and transmit the control data to the hub 31 or the at least one attachment device 21-2N. In this case, the above-described screens may be provided through a dedicated application or may be provided as a part of a screen of another application.

In addition, the user terminal 11 may determine a user's behavior pattern or a surrounding situation. For example, the user terminal 11 may determine whether the user is being near to user's house, going home, or going to work. The technique for determining the user's behavior pattern or surrounding situation by the user terminal 11 could be implemented by a person skilled in the art and thus a detailed description thereof is omitted.

The cloud 51 may include at least one server to provide various services. For example, the cloud 51 may manage user's accounts, acquire and analyze a user's current situation or behavior pattern, and store/manage/analyze user's log information (for example, content search information, movement information, function execution information, etc.)

In addition, the cloud 51 may store a data base related to identification information of the at least one electronic device 41-4N, and the control data. The control data may be mapped onto functions for controlling the at least one electronic device 41-4N, and may be configured in various communication formats according to communication protocols. For example, the control data may include data which is configured in a communication format according to a Bluetooth (BT) communication protocol or an infrared (IR) communication protocol.

The hub 31, the at least one electronic device 41-4N, and the at least one attachment device 21-2N are included in user's house. However, the present disclosure is not limited to devices located in a house and may be applied to an open environment.

The hub 31 may manage the at least one attachment device 21-2N. In addition, the hub 31 may be connected with the user terminal 11 to receive control data to be transmitted to the at least one attachment device 21-2N.

The hub 31 may store mapping information in which identification information of the at least one attachment device 21-2N is mapped onto identification information of the at least one electronic device 41-4N. In addition, the hub 31 may store mapping information for converting data configured in a first communication format, which is received from the user terminal 11, into data configured in a second communication format, which is to be transmitted to the attachment device 21.

The at least one attachment device 21-2N may store mapping information in which the data configured in the first communication format and the data configured in the second communication format are mapped.

In response to the data configured in the first communication format being received from the hub 31, the at least one attachment device 21-2N may acquire the data configured in the second communication format using the mapping information. In this case, the acquiring the data configured in the second communication format corresponding to the data configured in the first communication format based on the mapping information may include searching and acquiring the data configured in the second communication format corresponding to the data configured in the first communication format using a mapping table. In addition, the acquiring may include converting the data configured in the first communication format into the data configured in the second communication format using a conversion equation or a conversion table. In this case, the mapping information may be information for mapping and may be a conversion equation or a conversion table.

FIG. 2 is a view showing an example of a table which is stored in at least one of the attachment device 21, the cloud 51, the hub 31, and the user terminal 11 according to an embodiment of the present disclosure.

Referring to FIG. 2, reference numeral 201 in FIG. 2 indicates a table in which the identification information of the electronic device 41 and the identification information of the attachment device 21 are mapped.

In response to the attachment device 21 being selected by the user to control the electronic device 41, the user terminal 11 may generate a table in which the identification information of the electronic device 41 and the identification information of the attachment device 21 are mapped. When there exist a plurality of electronic devices 41-4N and a plurality of attachment devices 21-2N, the identification information of the respective attachment devices 21-2N are mapped onto the identification information of the respective electronic devices 41-4N in the table. Alternatively, when the plurality of attachment devices 21-2N are attached to the single electronic device 41, the identification information of the plurality of attachment devices 21-2N may be mapped onto the identification information of the single electronic device 41. The user terminal 11 may share the table with the hub 31.

In another example, in response to the attachment device 21 being selected by the user to control the electronic device 41, the user terminal 11 may transmit the identification information of the attachment device 21 to the hub 31. The hub 31 which has received the identification information of the attachment device 21 may generate the table in which the identification information of the electronic device 41 and the identification information of the attachment device 21 are mapped.

Reference numerals 202 and 203 in FIG. 2 indicate tables in which data configured in a plurality of communication formats in relation to the functions of the electronic device 41 are mapped.

In response to the attachment device 21 being selected by the user to control the electronic device 41, the user terminal 11 may acquire a table in which the data configured in the first communication format and the data configured in the second communication format in relation to the plurality of functions of the electronic device 41 are mapped. For example, the first communication format may be an IR communication format, and the second communication format may be a BT communication format.

The table may be pre-stored in the user terminal 11 or may be acquired by the user terminal 11 from a recording medium which is provided when the cloud 51 or the attachment device 21 is purchased. The user terminal 11 may transmit the acquired table to the attachment device 21 via the hub 31 or may directly transmit the table to the attachment device 21.

For example, table 202 in FIG. 2 may include data configured in the first communication format and data configured in the second communication format in relation to the functions of an air conditioner as the electronic device 41. For example, the table may include data configured in the IR communication format and data configured in the BT communication format in relation to the functions of turning on power or increasing temperature from among the functions of the air conditioner.

In addition, table 203 in FIG. 2 may include data configured in the first communication format and data configured in the second communication format in relation to the functions of a digital television (TV) as the electronic device 42. For example, the table may include data configured in the IR communication format and data configured in the BT communication format in relation to the functions of turning on power or increasing channel from among the functions of the digital TV.

Figure 1B:
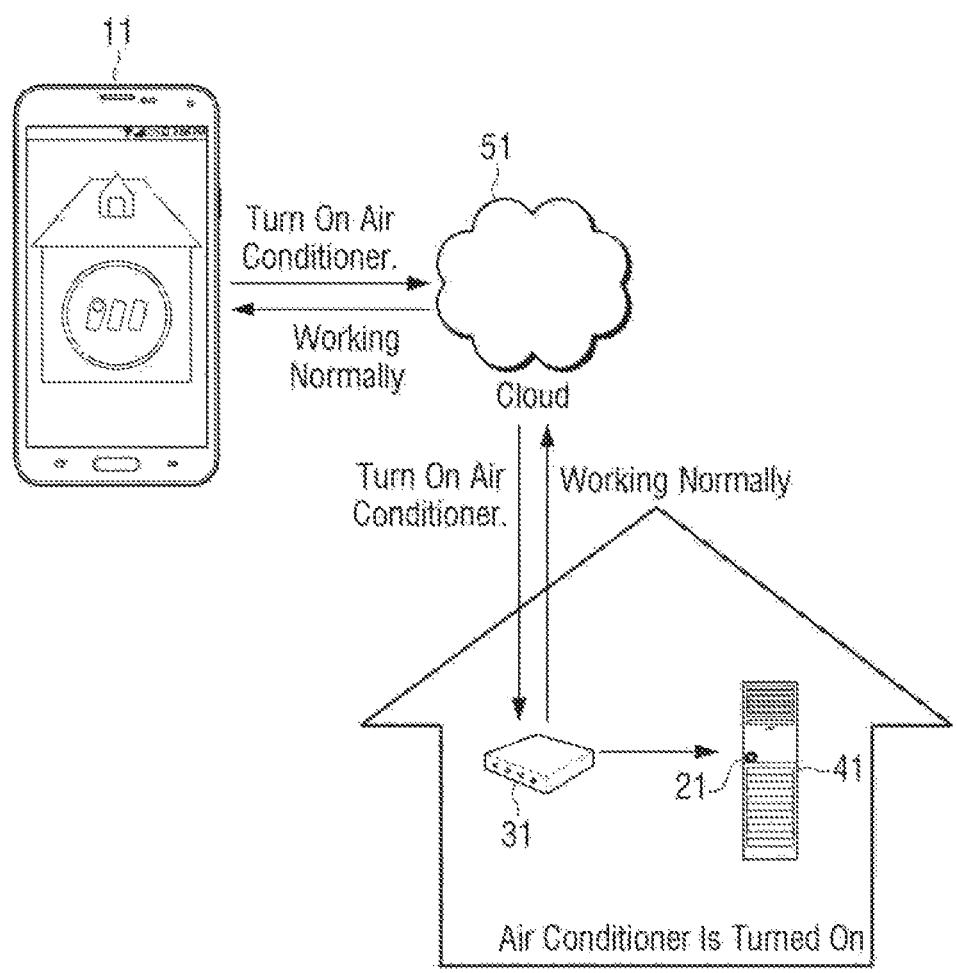

FIG. 1B is a view showing an operating process of the system 10 according to an embodiment of the present disclosure.

FIG. 1B shows an example of controlling the function of an electronic device remotely.

Referring to FIG. 1B, the user terminal 11 may detect a user input to control the electronic device 41 (for example, an air conditioner). In response to the user input, the user terminal 11 may transmit data configured in the first communication format (for example, Wi-Fi, $3^{rd}$ generation (3G), etc.) in relation to one function (for example, an ON function) of the electronic device (for example, an air conditioner) to the indoor hub 31 via the cloud 51.

The hub 31 may acquire data configured in the second communication format (for example, BT, BT low energy (BLE), ZigBee, etc.) corresponding to the data configured in the first communication format, and transmit the data to the attachment device 21 attached to the electronic device 41.

In another example, the first communication format and the second communication format may be the same communication format. For example, when the user terminal 11 is located in the user's house, the user terminal 11 may transmit data configured in the BT communication format to the hub 31. In this case, the hub 31 may transmit the data configured in the BT communication format to the attachment device 21.

The attachment device 21 may receive the data configured in the second communication format from the user terminal 11 or the hub 31, acquire data configured in a third communication format (for example, an IR communication format) corresponding to the data configured in the second communication format, and transmit the data to the electronic device 41 to which the attachment device 21 is attached.

In response to the data configured in the third communication format, the electronic device 41 may control itself to perform one function (for example, an ON function).

Meanwhile, the hub 31 may determine whether the electronic device 41 performs an operation corresponding to a control signal or not, based on information which is detected by the attachment device 21 regarding the electronic device 41. As a result of the determining, when the electronic device 41 normally operates, the hub 31 may transmit information indicating that the operation state of the electronic device 41 is normal to the user terminal 11 via the cloud 51.

Figure 1C:
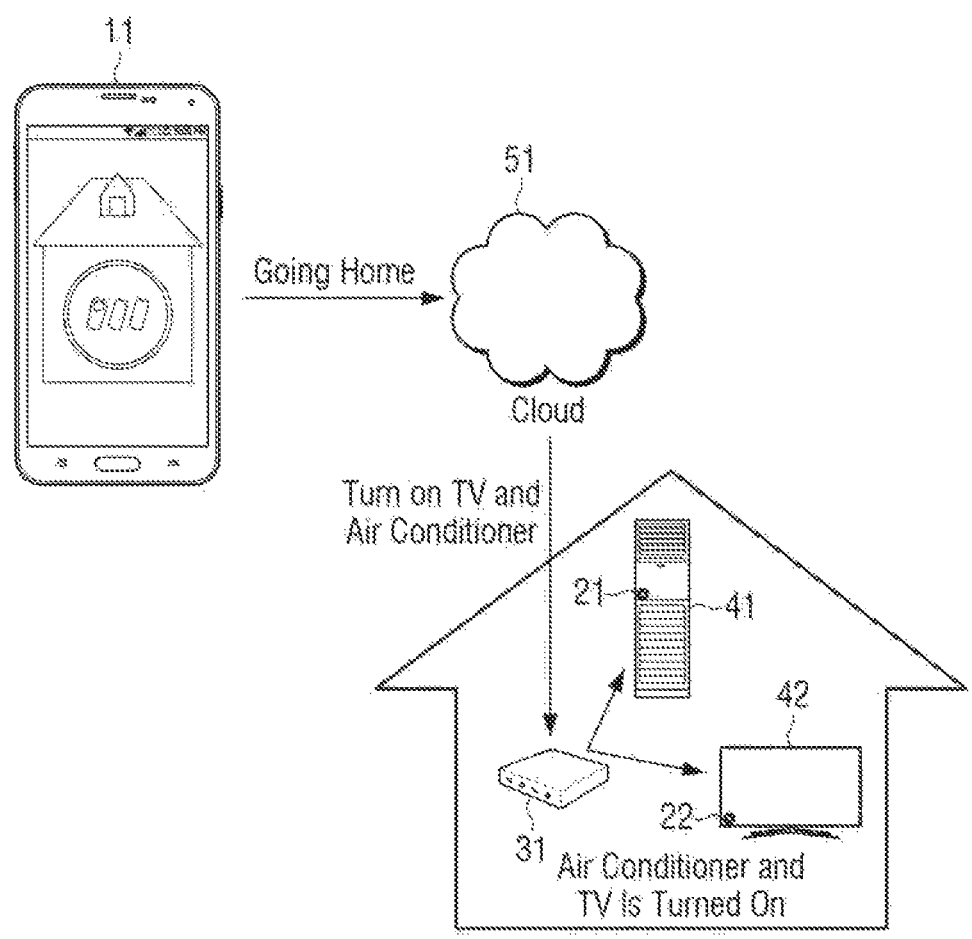

FIG. 1C is a view showing an operating process of the system 10 according to an embodiment of the present disclosure.

Referring to FIG. 1C, the user terminal 11 may determine a user's behavior pattern. Next, the user terminal 11 may transmit data configured in the first communication format in relation to one function (for example, an ON function) of a plurality of electronic devices 41, 42 (for example, an air conditioner and a digital TV) based on the user's behavior pattern to the indoor hub 31 via the cloud 51.

For example, in response to the user being determined as going home, the user terminal 11 may transmit the data of the first communication format related to one function to the indoor hub 31 via the cloud 51, so that the electronic device 41 performs the function which has been learned according to the user's behavior of going home.

The hub 31 may acquire data configured in the second communication format corresponding to the data configured in the first communication format, and transmit the data to the plurality of attachment devices 21, 22 attached to the plurality of electronic devices 41, 42.

The attachment devices 21, 22 acquire data configured in the third communication format corresponding to the data configured in the second communication format, and transmit the data configured in the third communication format to the electronic devices 41, 42 to which the attachment devices 21, 22 are attached. In response to the data configured in the third communication format, the electronic devices 41, 42 may control themselves to control one function (for example, an ON function).

As described above, it is possible to control the indoor electronic devices 41, 42 using the attachment devices 21, 22 in a manner customized for the user.

Figure 1D:
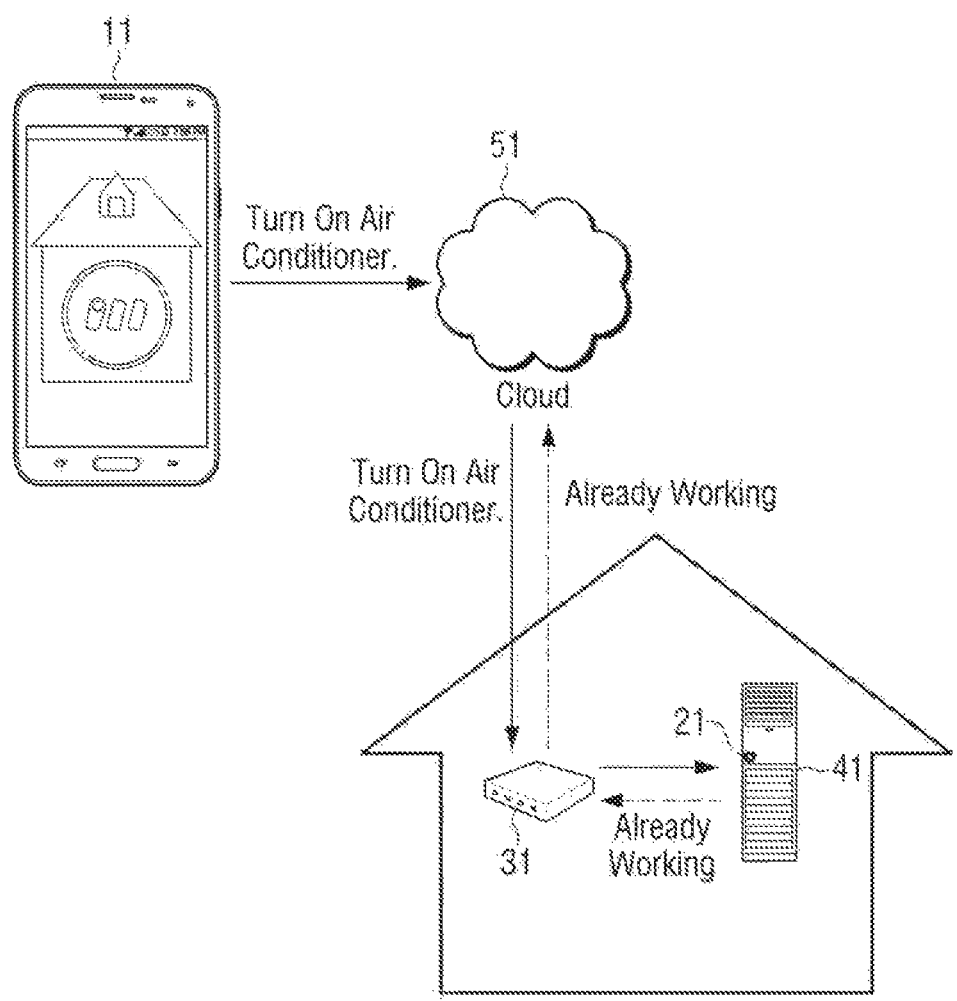

FIG. 1D is a view showing an operating process of the system 10 according to an embodiment of the present disclosure.

Referring to FIG. 1D, the user terminal 11 may detect a user input or a user's behavior pattern. Next, a processor 190 of the user terminal 11 may control a communication unit 140 of the user terminal 11 to transmit data configured in the first communication format in relation to one function (for example, an ON function) of the electronic device 41 (for example, an air conditioner) based on the user input or user's behavior pattern to the indoor hub 31 via the cloud 51.

The hub 31 may acquire data configured in the second communication format corresponding to the data configured in the first communication format, and transmit the data to the attachment device 21 attached to the electronic device 41.

In response to the data configured in the second communication format being acquired, the attachment device 21 may determine the operation state of the electronic device 41. In this case, the determining the operation state of the electronic device 41 may include determining, by a processor 190 of the attachment device 21, the operation state of the electronic device 41 using information pre-stored regarding the operation state of the electronic device 41, prior to acquiring the data configured in the second communication format.

For example, the attachment device 21 may detect an electromagnetic field, a sound, a motion, vibration, etc. from the electronic device 41. The attachment device 21 may determine the operation state of a product using the detected information.

When the electronic device 41 is performing an operation related to one function as a result of the determining, the attachment device 21 may transmit notification information indicating that one function is being performed to the hub 31. In addition, the hub 31 may transmit the received notification information to the user terminal 11.

On the other hand, when the electronic device 41 is not performing the operation related to one function as a result of the determining, the attachment device 21 may acquire data configured in the third communication format corresponding to the data configured in the second communication format, and transmit the data to the electronic device 41 to which the attachment device 21 is attached. Then, the electronic device 41 may control itself to perform one function (for example, an on function) in response to the data configured in the third communication format.

As described above, the operation state of the electronic device 41 may be identified using the attachment device 21, and malfunction can be prevented.

In addition, there may be an operating process of the system 10 according to various embodiments of the present disclosure.

For example, when the user terminal 11 provides an if this, then that (IFTTT) mode to automatically execute a specific function according to a situation, the user terminal 11 may control the electronic devices 41-4N by transmitting control data for controlling the attachment devices 21-2N according to the respective operations of the IFTTT.

For example, using the IFTTT mode of the user terminal 11, the user may set a lamp and a digital TV to be turned on automatically when the user enters user's house, and set an air conditioner and a heating system to be turned on after a predetermined time. In this state, when the user enters user's house, the user terminal 11 may automatically transmit control data to the attachment devices 21, 22 attached to the lamp and the digital TV, and, after a predetermined time, transmit control data to the attachment devices 23, 24 attached to the air conditioner and the heating system. Alternatively, when the user enters user's house, the user terminal 11 may automatically transmit control data to the attachment devices 21, 22 attached to the lamp and the digital TV, and, after a predetermined time, at least one of the attachment devices 21, 22 attached to the lamp or the digital TV may transmit control data to the attachment devices 23, 24 attached to the air conditioner or the heating system. In this case, a process of intimately transmitting/receiving control data between the attachment devices may be performed.

Figure 3:
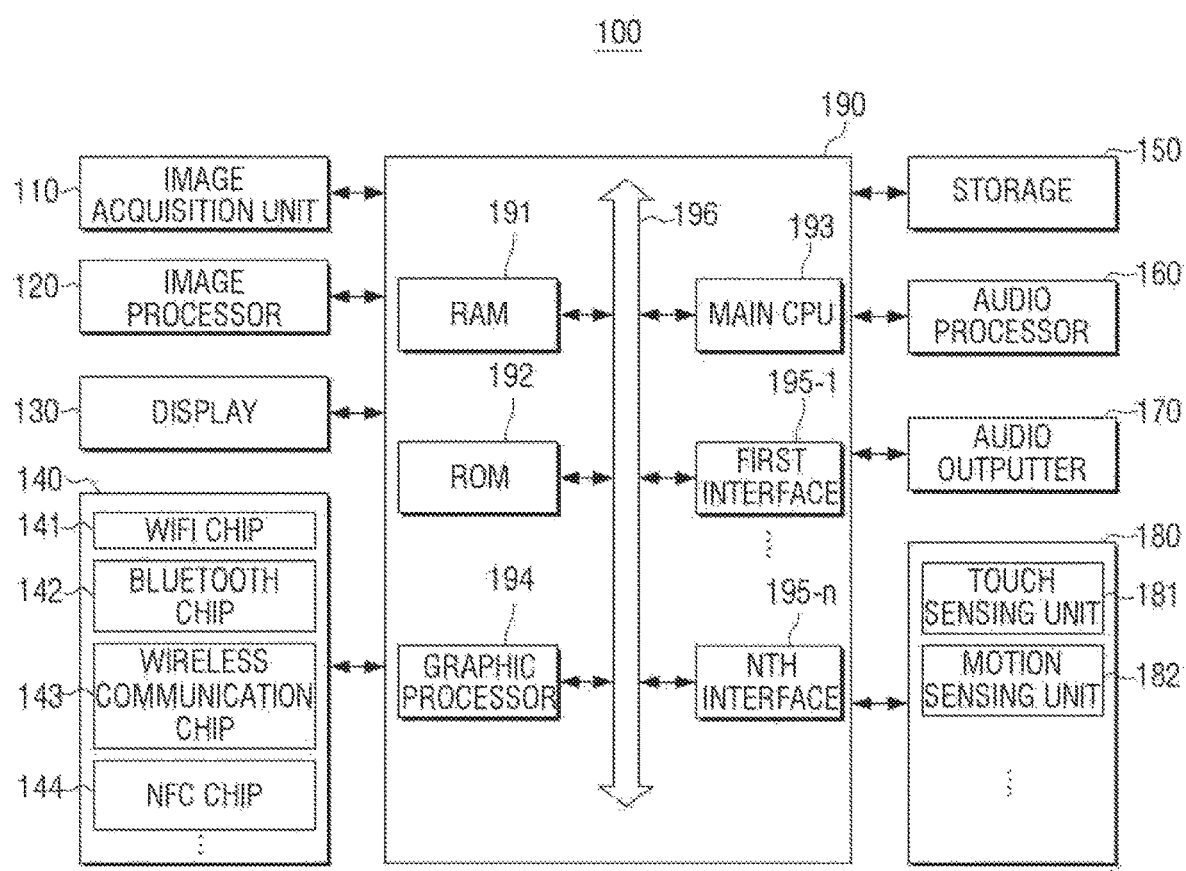
FIG. 3 is a block diagram showing a configuration of a user terminal according to an embodiment of the present disclosure.

FIG. 3 is a block diagram showing a configuration of a user terminal 11 according to an embodiment of the present disclosure.

Referring to FIG. 3, the user terminal may include at least one of an image acquisition unit 110, an image processor 120, a display 130, a communication unit 140, a storage 150, an audio processor 160, an audio outputter 170, a sensing unit 180, and a processor 190. The configuration of the user terminal 11 shown in FIG. 3 is merely an example and thus is not limited to the above-described block diagram. Therefore, some of the elements may be omitted or changed or another element may be added according to the type of the user terminal 11 or the purpose of the user terminal 11.

The image acquisition unit 110 may acquire image data through various sources. For example, the image acquisition unit 110 may receive broadcast data from an external broadcasting station, receive video on demand (VOD) data from an external server in real time, and receive image data from an external device.

In addition, the image acquisition unit 110 may acquire image data by photographing an external environment. For example, the image acquisition unit 110 may be implemented by using a camera which photographs the external environment of the user terminal 11. In this case, the image acquisition unit 110 may include a lens (not shown) through which an image passes, and an image sensor (not shown) to detect the image passing through the lens. The image sensor (not shown) may be implemented by using a charge coupled device (CCD) image sensor or a complementary metal-oxide semiconductor (CMOS) image sensor. The image data acquired through the image acquisition unit 110 may be processed by the image processor 120.

The image processor 120 is an element for processing the image data received from the image acquisition unit 110. The image processor 120 may perform various image processing operations such as decoding, scaling, noise filtering, frame rate conversion, resolution conversion, etc. with respect to the image data.

The display 130 may display a video frame which is a result of processing the image data by the image processor 120, or at least one of various screens generated in a graphic processor 193.

The implementing method of the display 130 is not limited. For example, the display 130 may be implemented by using various types of displays such as a liquid crystal display (LCD), an organic light emitting diode (OLED) display, an active-matrix (AM)-OLED, a plasma display panel (PDP), etc.

The display 130 may further include an additional element according to an implementing method thereof. For example, when the display 130 employs a liquid crystal method, the display 130 may include an LCD panel (not shown), a backlight unit (not shown) to provide light to the LCD panel, and a panel driving substrate (not shown) to drive the LCD panel (not shown). The display 130 may be combined with a touch sensing unit 181 of the sensing unit 180 to be provided as a touch screen.

The display 130 may be connected with at least one of a front area, a side area, and a rear area of the user terminal 11 in the form of a bended display. The bended display may be implemented by using a flexible display, or may be implemented by using a normal display which is not flexible. For example, the bended display may be implemented by interconnecting a plurality of flat displays.

When the bended display is implemented by using a flexible display, the flexible display may be bended, crooked or rolled without damage through a substrate which is thin and flexible like paper. The flexible display may be manufactured using a generally used glass substrate or a plastic substrate. When the plastic substrate is used, a low-temperature manufacturing process rather than an existing manufacturing process may be used in forming the flexible display in order to prevent damage to the substrate. In addition, the flexible display may be flexible enough to be folded and unfolded by replacing the glass substrate enclosing liquid crystals in the LCD, OLED display, AM-OLED, PDP, etc. with a plastic film. The flexible display is thin and light, is resistant to a shock, and can be bended or crooked and manufactured in various forms.

The communication unit 140 is an element for communicating with various kinds of external devices according to various kinds of communication methods. The communication unit 140 may include at least one of a Wi-Fi chip 141, a BT chip 142, a wireless communication chip 143, a near field communication (NFC) chip 144. The processor 190 may communicate with various external devices using the communication unit 140.

In particular, the Wi-Fi chip 141 and the BT chip 142 may communicate in the Wi-Fi method and the BT method, respectively. When the Wi-Fi chip 141 or the BT chip 142 is used, a variety of connectivity information such as service set identifier (SSID) and a session key may be transmitted and received first, and communication is established using the connectivity information, and then a variety of information may be transmitted and received. The wireless communication chip 143 refers to a chip which performs communication according to various communication standards such as Institute of Electrical and Electronics Engineers (IEEE), Zigbee, 3G, 3G partnership project (3GPP), long term evolution (LTE), etc. The NFC chip 144 refers to a chip which operates in the NFC method using a band of 13.56 MHz from among various radio frequency ID (RF-ID) frequency bands such as 135 kHz, 13.56 MHz, 433 MHz, 860-960 MHz, 2.45 GHz, etc.

The storage 150 may store various programs and data used for the operations of the user terminal 11. The storage 150 may be implemented by using a non-volatile memory, a volatile memory, a flash memory, a hard disk drive (HDD), a solid state drive (SSD), etc. The storage 150 may be accessed by the processor 190 and controlled by the processor 190 to read out/record/correct/delete/update data. The term "storage" in the present disclosure may include the storage 150, a read only memory (ROM) in the processor 190, a random access memory (RAM) (not shown), or a memory card (not shown) mounted in the user terminal 11 (for example, a micro secure digital (SD) card or a memory stick). Specifically, the storage 150 may store programs and data for configuring various screens to be displayed on a display area.

Hereinafter, a structure of software stored in the user terminal 11 will be explained with reference to FIG. 4.

Figure 4:
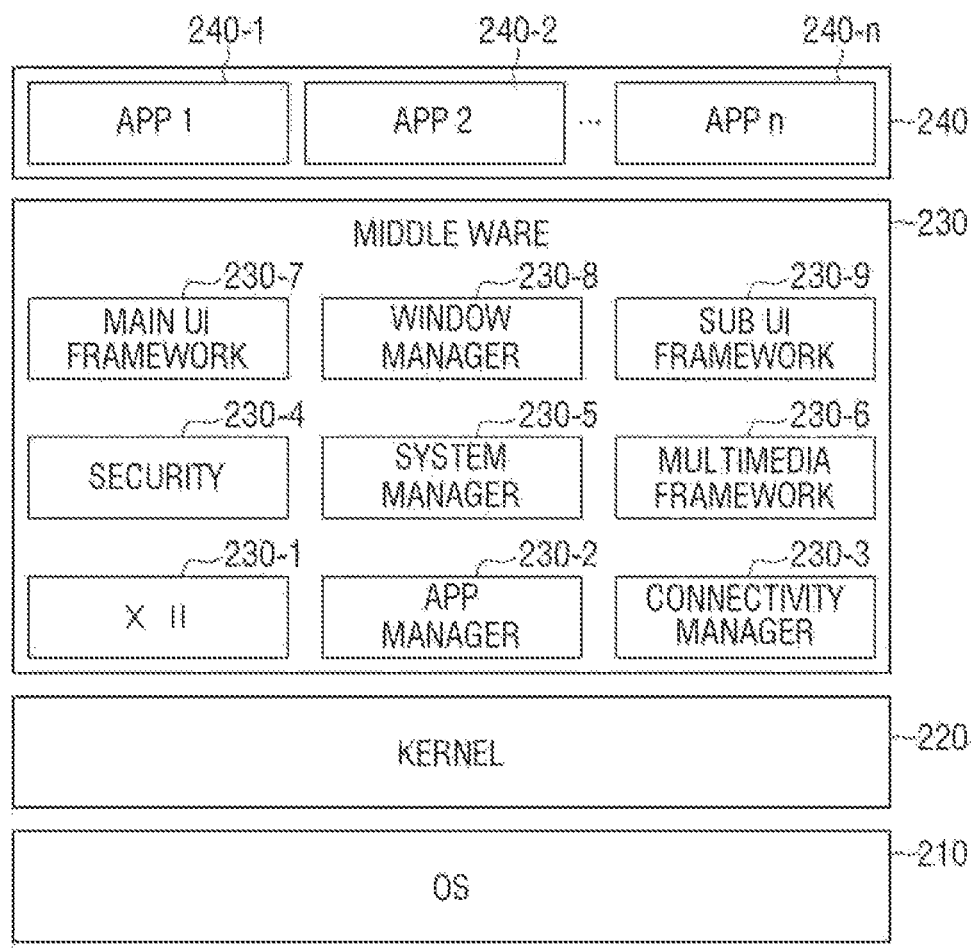
FIG. 4 is a view showing a structure of software which is stored in a user terminal according to an embodiment of the present disclosure.

FIG. 4 is a view showing a structure of software which is stored in a user terminal according to an embodiment of the present disclosure.

Referring to FIG. 4, the storage 150 may store software including an operating system (OS) 210, a kernel 220, middleware 230, an application 240, etc.

The OS 210 performs a function of controlling and managing the overall operations of hardware. That is, the OS 210 is a layer which is responsible for basic functions such as hardware management, a memory, security, etc.

The kernel 220 serves as a passage for transmitting various signals including a touch signal, etc., which are detected by the sensing unit 180, to the middleware 230.

The middleware 230 includes various software modules for controlling the operation of the user terminal 11. Referring to FIG. 4, the middleware 230 includes an X11 module 230-1, an APP manager 230-2, a connectivity manager 230-3, a security module 230-4, a system manager 230-5, a multimedia framework 230-6, a main UI framework 230-7, a window manager 230-8, and a sub UI framework 230-9.

The X11 module 230-1 is a module which receives various event signals from a variety of hardware provided in the user terminal 11. The event recited herein may be set variously like an event in which a user gesture is detected, an event in which a system alarm occurs, an event in which a specific program is executed or finished, etc.

The APP manager 230-2 is a module which manages the execution states of various applications 240 installed in the storage 150. In response to an application execution event being detected from the X11 module 230-1, the APP manager 230-2 may call an application corresponding to the event and execute the application.

The connectivity manager 230-3 is a module for supporting wire or wireless network connection. The connectivity manager 230-3 may include various specific modules such as a DNET module, a universal plug and play (UPnP) module, etc.

The security module 230-4 is a module for supporting certification of hardware, permission, secure storage, etc.

The system manager 230-5 monitors the states of the respective elements in the user terminal 11, and provides the result of the monitoring to the other modules. For example, when battery power is low, an error occurs, or communication is disconnected, the system manager 230-5 may provide the result of the monitoring to the main UI framework 230-7 and the sub UI framework 230-9, and may output a notification message or a notification sound.

The multimedia framework 230-6 is a module for reproducing multimedia contents which are stored in the user terminal 11 or provided from an external source. The multimedia framework 230-6 may include a player module, a camcorder module, a sound processing module, etc. Accordingly, the multimedia framework 230-6 may reproduce various multimedia contents to generate and reproduce a screen and a sound.

The main UI framework 230-7 is a module for providing various UIs to be displayed on a main area of the display 130, and the sub UI framework 230-9 is a module for providing various UIs to be displayed on a sub area. The main UI framework 230-7 and the sub UI framework 230-9 may include an image compositor module for configuring various UI elements, a coordinate compositor module for calculating coordinates at which an UI element is displayed, a rendering module for rendering the configured UI element at the calculated coordinates, and a two-dimensional (2D)/three-dimensional (3D) UI toolkit for providing a tool for configuring a UI in the form of 2D or 3D.

The window manager 230-8 may detect a touch event using a user's body or a pen or other input events. In response to such an event being detected, the window manager 230-8 may transmit an event signal to the main UI framework 230-7 or the sub UI framework 230-9, so that an operation corresponding to the event is performed.

In addition, various program modules, for example, a hand-writing module for drawing a line by tracing a dragging operation when the user touches and drags on the screen, or an angle calculation module for calculating a pitch angle, a roll angle, and a yaw angle based on a sensor value detected by a motion sensing unit 182, may be stored.

The application module 240 includes applications 240-1 to 240-n to support various functions. For example, the application module 240 may include a program module for providing various services, such as a navigation program module, a game module, an electronic book module, a calendar module, a notification management module, etc. The applications may be installed as default or may be arbitrarily installed by the user during use and used. In response to a UI element being selected, a main central processing unit (CPU) 194 may execute an application corresponding to the selected UI element using the application module 240.

The software structure shown in FIG. 4 is merely an example and the software is not limited to this structure. Therefore, some of the software elements may be omitted or changed or another element may be added according to the type of the user terminal 11 or the purpose of the user terminal 11.

Referring back to FIG. 3, the audio processor 160 is an element which processes audio data of an image content. The audio processor 160 may perform various processing operations such as decoding, amplification, noise filtering, etc. with respect to the audio data. The audio data processed by the audio processor 160 may be outputted to the audio outputter 170.

The audio outputter 170 is configured to output various notification sounds or voice messages as well as audio data which have been processed by the audio processor 160 in various ways, such as decoding, amplification, noise filtering, etc. In particular, the audio outputter 170 may be implemented by using a speaker. However, this is merely an example and the audio outputter 170 may be implemented by using an output terminal which outputs audio data.

The sensing unit 180 detects various user interactions. The sensing unit 180 may include various sensors, and may be configured by including at least one device from among all types of sensing devices which can detect a change in the state of the user terminal 11. For example, the sensing unit 180 may be configured by including at least one of various sensing devices, such as a touch sensor, an acceleration sensor, a gyro sensor, an illuminance sensor, a proximity sensor, a pressure sensor, a noise sensor (for example, a microphone), a video sensor (for example, a camera module), and a timer.

The sensing unit 180 may be divided into the touch sensing unit 181 and the motion sensing unit 182 according to a sensing purpose as shown in FIG. 2. However, this should not be considered as limiting. The sensing unit 180 may be divided according to other purposes. This does not mean physical division and at least one sensor may be combined to perform the functions of the sensing units 181, 182. In addition, some of the elements or functions of the sensing unit 180 may be included in the processor 190 according to an implementing method.

For example, the touch sensing unit 181 may detect a user's touch input using a touch sensor attached to the rear surface of the display panel. The processor 190 may acquire information on touch coordinates, touching time, etc. from the touch sensing unit 181, and determine the type of touch input (for example, a tap gesture, a double tap gesture, a panning gesture, a flick gesture, a touch and drag gesture, etc.) In addition, the processor 190 may directly determine the type of touch input using the touch coordinates, the touching time, etc. acquired by the touch sensing unit 181.

The motion sensing unit 182 may detect the motion of the user terminal 11 (for example, a rotating motion, a tilting motion, etc.) using at least one of an acceleration sensor, a tilt sensor, a gyro sensor, a 3-axis magnetic sensor, etc. In addition, the motion sensing unit 182 may transmit a generated electric signal to the processor 190. For example, the motion sensing unit 182 may measure acceleration of the user terminal 11 added with acceleration of gravity, or may measure only the acceleration of gravity when there is no motion in the user terminal 11.

The processor 190 may control the overall operations of the user terminal 11 using various programs stored in the storage 150.

The processor 190 may include a RAM 191, a ROM 192, a graphic processor 193, a main CPU 194, first to n-th interfaces 195-1 to 195-n, and a bus 196. The RAM 191, the ROM 192, the graphic processor 193, the main CPU 194, and the first to n-th interfaces 195-1 to 195-n may be connected with one another via the bus 196.

The RAM 191 stores an OS and an application program. Specifically, the RAM 191 may store the OS when the user terminal 11 is booted, and may store various application data selected by the user.

The ROM 192 may store a set of instructions for booting a system. In response to a turn on command being inputted and power being supplied, the main CPU 194 may copy the OS stored in the storage 150 into the RAM 191 according to a command stored in the ROM 192, and boot the system by executing the OS. In response to the booting being completed, the main CPU 194 may copy various application programs stored in the storage 150 into the RAM 191, and perform various operations by executing the application programs copied into the RAM 191.

The graphic processor 193 may generate a screen including various objects such as an icon, an image, a text, etc., using a calculator (not shown) and a renderer (not shown). The calculator (not shown) may calculate attribute values of objects to be displayed according to a layout of the screen, such as a coordinate value, a shape, a size, a color, etc., based on a control command received from the sensing unit 180. The renderer (not shown) may generate the screen of various layouts including objects based on the attribute values calculated by the calculator (not shown). The screen generated by the renderer (not shown) may be displayed in the display area of the display 130.

The main CPU 194 may access the storage 150 and perform booting using the OS stored in the storage 150. In addition, the main CPU 194 may perform various operations using various programs, content, data, etc. which are stored in the storage 150.

The first to n-th interfaces 195-1 to 195-*n* may be connected with the above-described various elements. One of the first to n-th interfaces 195-1 to 195-*n* may be a network interface which is connected with an external device via a network.

In particular, the processor 190 may control the display 130 to display a list of a plurality of attachment devices. In response to a user input to select an attachment device to control an electronic device from the list of the attachment devices 21-2N being detected by the sensing unit 180, the processor 190 may control the communication unit 140 to transmit, to the selected attachment device 21, mapping information in which data configured in a first communication format and data configured in a second communication format in relation to one function of the electronic device are mapped.

For example, the processor 190 may transmit the mapping information to the attachment device 21 via the communication unit 140.

In addition, the processor 190 may control the communication unit 140 to transmit, to the hub 31, request information for requesting the hub 31 to transmit the mapping information to the attachment device 21. In this case, the hub 31 which has received the request information may transmit the mapping information to the attachment device 21.

In addition, the processor 190 may control the communication unit 140 to transmit, to the cloud 51, requesting information for requesting the cloud 51 to transmit the mapping information to the attachment device 21. In addition, the processor 190 may control the communication unit 140 to transmit, to the cloud 51, request information for requesting the cloud 51 to transmit the mapping information to the hub 31. In this case, the hub 31 which has received the request information may transmit the received mapping information to the attachment device 21.

Figure 5:
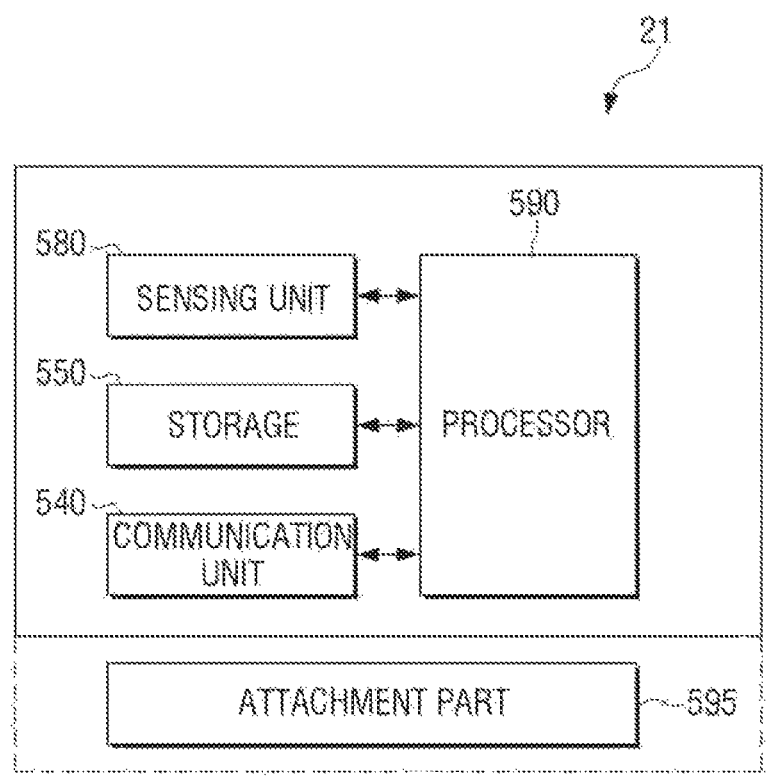
FIG. 5 is a block diagram showing a configuration of an attachment device according to an embodiment of the present disclosure.

FIG. 5 is a block diagram showing a configuration of an attachment device 21 according to an embodiment of the present disclosure.

Referring to FIG. 5, the attachment device 21 may include at least one of a sensing unit 580, a storage 550, a communication unit 540, and an attachment part 595. The configuration of the attachment device 21 shown in FIG. 5 is merely an example and is not limited to the above-described block diagram. Therefore, some of the elements of the attachment device 21 may be omitted or changed or another element may be added according to the type of the attachment device 21 or the purpose of the attachment device 21.

The storage 550 of the attachment device 21 may store various programs and data necessary for the operation of the attachment device 21. The storage 550 may be implemented by using a non-volatile memory, a volatile memory, a flash memory, etc., and the storage 550 may store mapping information in which data configured in a first communication format and data configured in a second communication format are mapped.

In addition, the attachment device 21 may include the sensing unit 580 to detect the operation state of the electronic device 41. The sensing unit 580 of the attachment device 21 may include at least one of an acceleration sensor, a geomagnetic sensor, a sound sensor, a motion sensor, a gyro sensor, a pressure sensor, an illuminance sensor, a proximity sensor, a touch sensor, a temperature sensor, a bio sensor, a vibration sensor, etc. In addition, the sensing unit 580 of the attachment device 21 may further include an image acquisition unit (for example, a camera) for acquiring surrounding images of the attachment device.

In addition, the communication unit 540 of the attachment device 21 may communicate with an external device according to various kinds of communication methods. The communication unit 540 may communicate with external devices in various communication methods such as an IR method, a BT method, a Wi-Fi method, an RFID method, an NFC method, a ZigBee method, a BLE method, etc.

In addition, according to an embodiment of the present disclosure, the communication unit 540 of the attachment device 21 may include a reception module (not shown) and a transmission module (not shown). The reception module may receive data from an external device (for example, the hub 31, the user terminal 11, the electronic device 41, or the cloud 51), and the transmission module may transmit data to an external device (for example, the hub 31, the user terminal 11, the electronic device 41, or the cloud 51).

When the attachment device 21 is formed of a plurality of layers, the reception module and the transmission module may be included in a single layer or may be included in different layers. When the reception module and the transmission module are included in the different modules, the reception module may be included in an external layer to easily communicate with the outside of the attachment device 21, and the transmission module may be included in an internal layer to easily control the electronic device 41 attached to the attachment device 21.

In addition, according to an embodiment of the present disclosure, the communication unit 540 of the attachment device 21 may include a plurality of modules according to a communication method. For example, the communication unit 540 may include a first communication module to receive or transmit data from or to an external device (for example, the hub 31, the user terminal 11, the electronic device 41, or the cloud 51) in a first communication format, and a second communication module to receive or transmit data from or to an external device (for example, the hub 31, the user terminal 11, the electronic device 41, or the cloud 51) in a second communication format. For example, the first communication module may be a module which communicates with an external device in a BT communication format in the communication unit 540 (or a BT communication module), and the second communication module may be a module which communicates with an external device in an IR communication format (or an IR communication module).

In addition, the communication unit 540 of the attachment device 21 may be divided into a logical module or a physical module according various functions, purposes, or arrangement patterns. However, in the present disclosure, the communication unit 540 will be explained without distinguishing between modules for the sake of easy explanation, and, when it is meaningful that the modules are distinguished, the communication unit 540 will be explained by distinguishing between the modules.

The processor 590 of the attachment device 21 may control the overall operation of the attachment device 21 using various programs stored in the storage 550.

For example, in response to the data configured in the first communication format being received from the hub 31, the processor 590 of the attachment device 21 may change the data to data configured in the second communication format using the mapping information. In this case, the changing the data configured in the first communication format to the data configured in the second communication format may include acquiring the data configured in the second communication format corresponding to the data configured in the first communication format with reference to the mapping information.

When the attachment device 21 is formed of a plurality of layers, the processor 590 of the attachment device 21 may be included in one of the plurality of layers. In addition, the processor 590 of the attachment device 21 may be included in the external cloud 51 or the user terminal 11 to perform a specific service or function using the information detected in the attachment device 21.

In addition, the attachment device 21 may further include a battery. The battery of the attachment device 21 may supply power to the attachment device 21. When the attachment device is formed of the plurality of layers, one of the plurality of layers may include the battery. In this case, the battery may be replaced by replacing the layer. When the battery is of a charging type, the battery may be charged in a wireless charging method, etc.

The attachment device 21 refers to a device which can be attached to a thing or a person, and may include or may not include the attachment part 595. In addition, the attachment part 595 may be sold as an integrated part of the attachment device 21 or may be sold separately from the attachment device 21. The attachment part 595 may be formed of, but not limited to, an adhesive, a magnet, Velcro®, etc. The attachment part 595 is configured to be securely attached to a thing or a person or may be formed of material which can be easily attached or detached according to a purpose.

When the adhesion of the attachment part 595 is strong, the attachment device 21 may be used to continue detecting the state of a person or a thing. On the other hand, when the adhesion of the attachment part 595 is weak, the attachment device 21 may be used to give temporary identification information to an object to be attached, or may be used to provide a visual effect considering a fashion.

Figure 6:
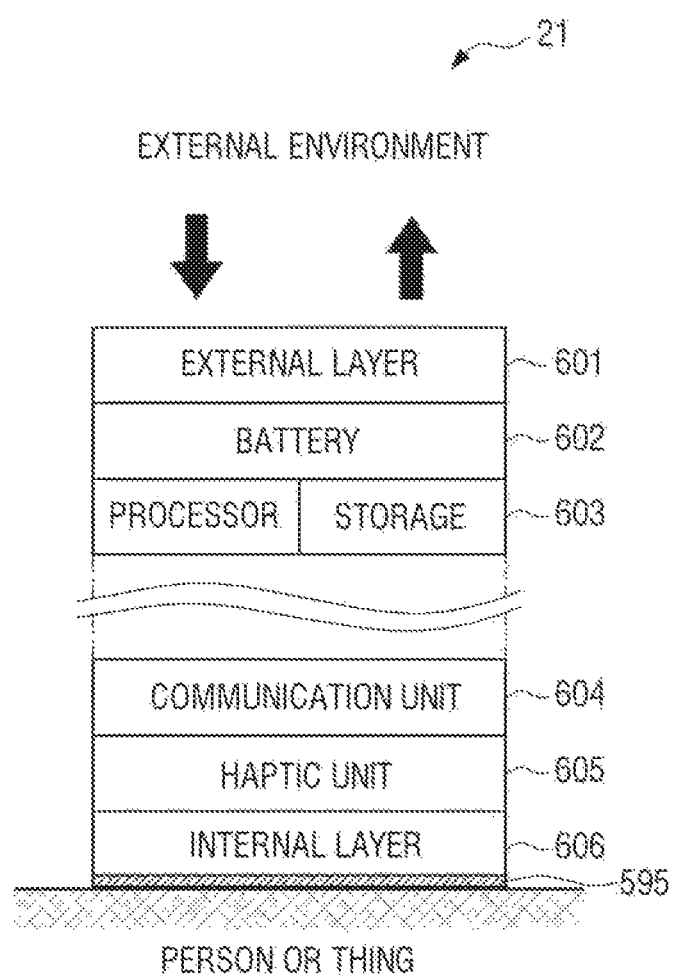
FIG. 6 is a view showing an example of an attachment device according to an embodiment of the present disclosure.

FIG. 6 is a view showing an example of an attachment device 21 according to an embodiment of the present disclosure.

Referring to FIG. 6, the attachment device 21 may be formed of a plurality of layers 601-606.

The order of stacking the plurality of layers 601-606 may be defined according to a purpose or function.

In addition, some of the plurality of layers 601-606 may be provided in a horizontal structure. For example, one layer may be stacked on a plurality of layers arranged horizontally, and a plurality of layers arranged horizontally may be stacked on one layer. In addition, a plurality of layers arranged horizontally may be stacked on a plurality of layers arranged horizontally. That is, the plurality of layers 601-606 may be arranged in the following structures: an 1:1:1 structure in which the layers are stacked one on another; an 1:2:1 structure in which two layers are arranged on one layer horizontally and one layer is stacked on the two layers; and an 2:2:2 structure in which two layers are arranged horizontally, two layers are arranged on those two layers horizontally, and two layers are arranged on those two layers horizontally.

One of the plurality of layers 601-606 may be attachable, flexible, or stretchable. In particular, to make the attachment device 21 attachable, flexible, or stretchable, the plurality of layers 601-606 each may have a different modulus of elasticity. In addition, the plurality of layers 601-606 may be attachable to one another and may be configured in a customized type so that the layers can be added or removed.

The plurality of layers 601-606 may transmit/receive data or transmit power therebetween using a wire/wireless communication method. The wire/wireless communication method may include a short-distance wireless communication method such as such as RFID, NFC, ZigBee, BLE, Wi-Fi, etc., a wire communication method such as a bus, plugging, etc., and other communication methods such as a human body communication method.

In this case, one of the plurality of layers 601-606 may serve as a hub for managing transmitted/received data, and information detected by each of the plurality of layers 601-606 may be transmitted to the layer serving as the hub.

For example, one layer may transmit data to the other layers 601-606 in a broadcasting communication method. In another example, when one of the plurality of layers 601-606 receives data, the data may be transmitted to another layer located on or under one layer in sequence. For example, data may be transmitted from one layer to another layer using a contact terminal between the plurality of layers 601-606. When the modules included in the attachment device 21 are managed in the unit of a service or a function, and the service or the function is performed, the layers including corresponding modules may communicate with one another.

Power may be selectively supplied to the plurality of layers. For example, when only the function of one layer from among the plurality of layers is required, power is supplied to one layer and is blocked for the other layers. Accordingly, the power efficiency of the plurality of layers can be enhanced.

In FIG. 6, the attachment device 21 may include an external layer 601, a battery layer 602, a control layer 603, a communication layer 604, a haptic layer 605, an internal layer 606, and an attachment part 595. The configuration of the attachment device 21 shown in FIG. 5 is merely an example and is not limited to the above-described block diagram. Therefore, some of the above-described elements may be omitted or changed or another element may be added according to the type of the attachment device 21 or the purpose of the attachment device 21.

The external layer 601 is a layer which is exposed to the outside, and may include at least one of the sensing unit 580, a display, and a light emitter. The sensing unit 580 of the external layer 601 may detect an external environment.

The control layer 603 may include the processor 590 and the storage 550.

The communication layer 604 may include the communication unit 540 to communicate with an external device of the attachment device 21 in various kinds of communication methods. For example, the communication layer 604 may communicate with external devices in various communication methods, such as an IR method, a BT method, a Wi-Fi method, an RFID method, an NFC method, a ZigBee method, a BLE method, etc.

The haptic layer 605 may include a haptic unit (not shown) and serve as a module for transmitting an electric or physical signal, typically, vibration, to a thing or a person. In this case, the intensity or pattern of the vibration generated by the haptic unit may be controlled. For example, different vibrations may be combined and outputted, or may be outputted in sequence.

The internal layer 606 is a layer which is attached to a thing or a person including the electronic device 41, and may include at least one of the sensing unit 580 and the haptic unit (not shown). In this case, the haptic unit may generate various effects, such as an effect caused by a pin array which vertically moves with respect to a contact skin surface, a jet force or a suction force of air through a spray hole or a suction inlet, touch on a skin surface, contact with an electrode, and a stimulus of electrostatic force, and an effect caused by reproduction of cold and warmth using a heat absorbing or heating element.

In addition, the internal layer 606 may include a dose adjustment device to administer medicine to a person.

The attachment part 595 is an element which includes an attachment component to be attached to a thing or a person, and for example, may include an adhesive or a magnetic component.

Figure 7:
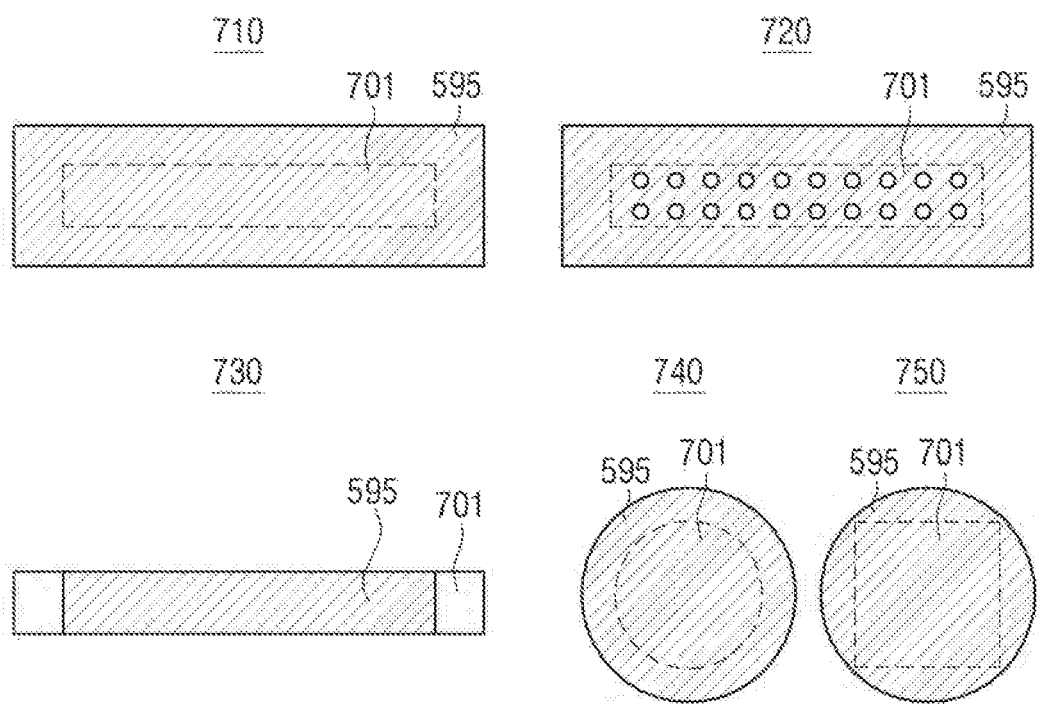
FIG. 7 is a view showing various attachment shapes of an attachment device according to an embodiment of the present disclosure.

FIG. 7 is a view showing various attachment shapes of an attachment device 21 according to an embodiment of the present disclosure.

FIG. 7 is a view as viewed from the attachment part 595 in the direction of an internal layer 701 when the internal layer 701 is vertically attached to the attachment part 595.

Referring to view 710 of FIG. 7, the area of the attachment part 595 may be larger than or equal to the area of the internal layer 701.

As shown in view 720 of FIG. 7, the attachment part 595 may have at least one hole. In this case, the internal layer 701 is in contact with a thing or a person through the hole, such that the internal layer 701 detects the state of the thing or the person or transmits an electric or physical signal to the person or the thing.

In addition, in view 730 of FIG. 7, the area of the attachment part 595 may be smaller than the area of the internal layer 701. In this case, the internal layer 701 coming out of the attachment part 595 is in contact with the thing or person such that the internal layer 701 detects the state of the thing or the person or transmits an electric or physical signal to the person or the thing.

View 740 of FIG. 7 shows the attachment part 595 and the internal layer 701 which have a circular shape. In addition, view 750 of FIG. 7 shows the attachment part 595 and the internal layer 701 which have a different shape.

As described above, the attachment part 595 and the internal layer 701 may have various shapes so that they are easy to attach to a person or a thing, and are not limited to the above-described examples.

Figure 8:
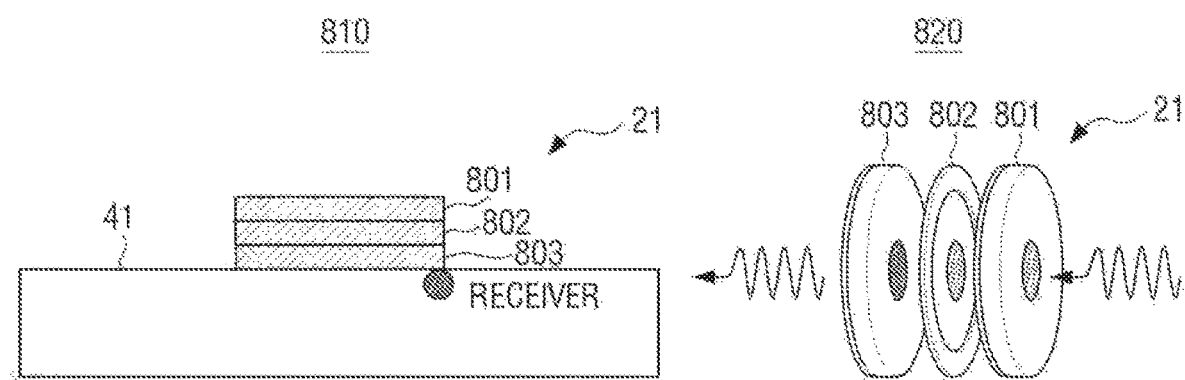
FIG. 8 is a view showing another example of an attachment device according to an embodiment of the present disclosure.

FIG. 8 is a view showing another example of the attachment device 21 according to an embodiment of the present disclosure.

Referring to view 810 of FIG. 8, the attachment device 21 may be formed of a plurality of layers 801, 802, 803. The attachment device 21 may be attached in the proximity of a receiver of the electronic device 41. In this case, when the attachment device 21 transmits control data for controlling the electronic device 41, the electronic device 41 may receive the control data.

For example, referring to view 820 of FIG. 8, the first layer 801 of the attachment device 21 may receive control data which is configured in a first communication format. For example, the attachment device 21 may receive the control data which is formed in the first communication format from the hub 31 or the user terminal 11. In addition, the second layer 802 of the attachment device 21 may convert the control data configured in the first communication format into control data configured in a second communication format. Next, the third layer 803 of the attachment device 21 may transmit the control data configured in the second communication format to the receiver of the electronic device 41.

Figure 9:
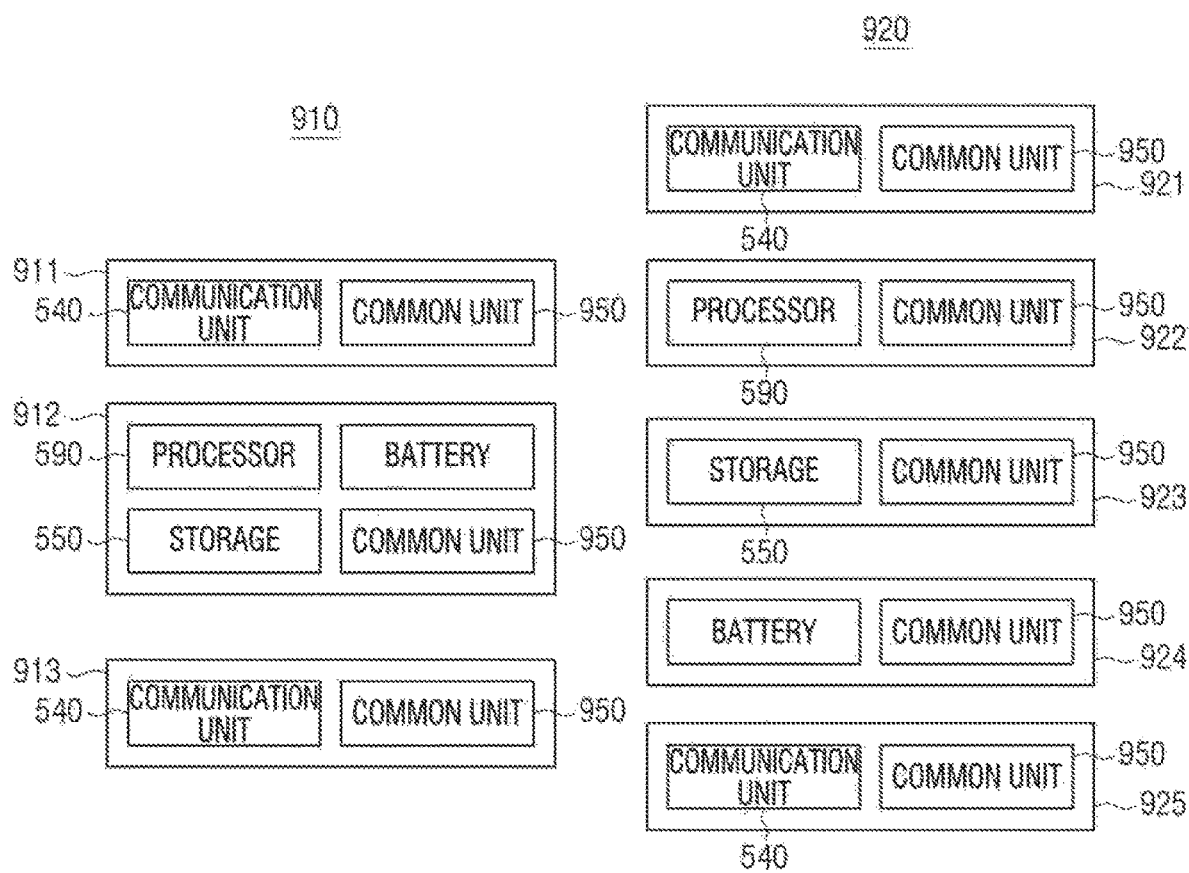
FIG. 9 is a view showing another example of an attachment device according to an embodiment of the present disclosure.

FIG. 9 is a view showing another example of the attachment device 21 according to an embodiment of the present disclosure.

Referring to FIG. 9, the attachment device 21 may be formed a plurality of layers 911, 912, 913 which are stacked vertically.

For example, in view 910 of FIG. 9, the first layer 911 may include a communication unit 540 and a common unit 950 to receive a control data signal. The common unit 950 may serve to transmit/receive data or transmit power between the layers.

In addition, the second layer 912 may include a processor 590, a storage 550, a battery, and a common unit 950 to change the communication format of the control data. In addition, the third layer 913 may include a communication unit 540 and a common unit 950 to transmit the control data the communication format of which is changed.

In another example, as shown in view 920 of FIG. 9, a first layer 921 may include a communication unit 540 and a common unit 950 to receive a control data signal. In addition, a second layer 922 may include a processor 590 and a common unit 950 to change the communication format of the control data. In addition, a third layer 923 may include a storage 550 and a common unit 950 to store mapping information between data of different communication formats. In addition, a fourth layer 924 may include a battery and a common unit 950. In addition, a fifth layer 925 may include a communication unit 540 and a common unit 950 to transmit the control data the communication format of which is changed.

Figure 10:
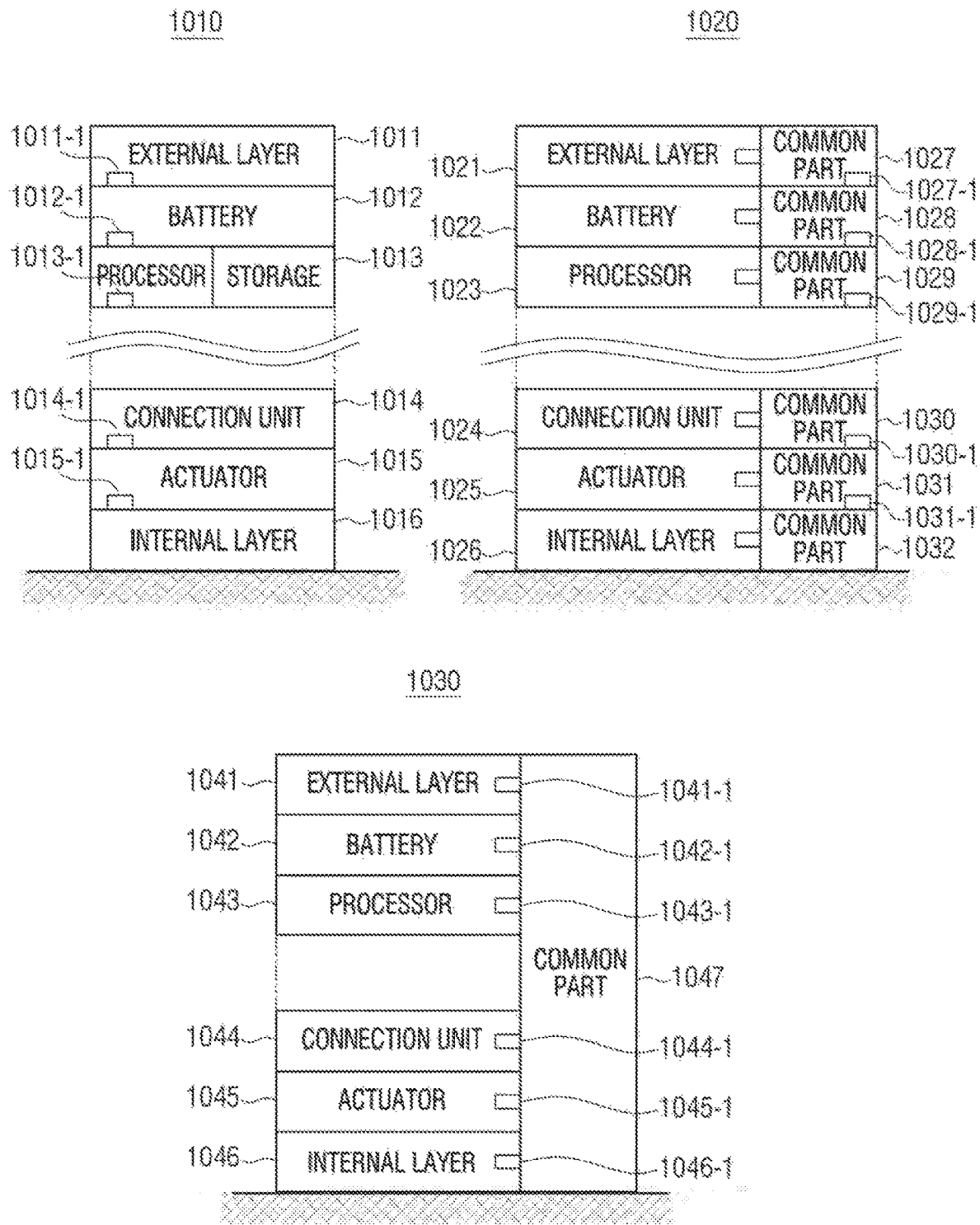
FIG. 10 is a view showing another example of an attachment device according to an embodiment of the present disclosure.

FIG. 10 is a view showing another example of the attachment device 21 according to an embodiment of the present disclosure.

Referring to view 1010 of FIG. 10, the attachment device 21 may be formed of a plurality of layers 1011-1016 which are stacked. In this case, the plurality of layers 1011-1016 may be connected with one another via contact terminals 1011-1 to 1015-1. That is, data may be transmitted/received between the layers via the contact terminals 1011-1 to 1015-1. The locations of the contact terminals 1011-1 to 1015-1 may be standardized and may be implemented at predetermined locations of the respective layers.

In another example, as shown in view 1020 of FIG. 10, the attachment device 21 may be formed of a plurality of layers 1021-1026, and the plurality of layers 1021-1026 may be connected with common units 1027-1032 via contact terminals 1021-1 to 1026-1. In addition, the plurality of layers 1021-1026 and the common unit 1027-1032 may be connected with each other via contact terminals 1027-1 to 1031-1. In this case, one of the plurality of layers 1021-1026 may transmit data to the common unit connected therewith, and the common unit which has received the data may transmit the data to another common unit connected with another layer. The common unit which has received the data may transmit the data to another layer connected therewith.

In another example, as shown in view 1030 of FIG. 10, the attachment device 21 may be formed of a plurality of layers 1041-1046 which are stacked, and includes a single common unit 1047 to connect all of the plurality of layers 1041-1046. In this case, the plurality of layers 1041-1046 and the common unit 1047 may be connected with each other via contact terminals 1041-1 to 1046-1.

The common unit may include modules which have little to do with the locations or order of the layers and does not need to be customized. For example, the common unit may include a processor, a storage, a bus, etc. which have little to do with the locations or order. The common unit may mainly serve to transmit/receive data and transmit power.

Figure 11:
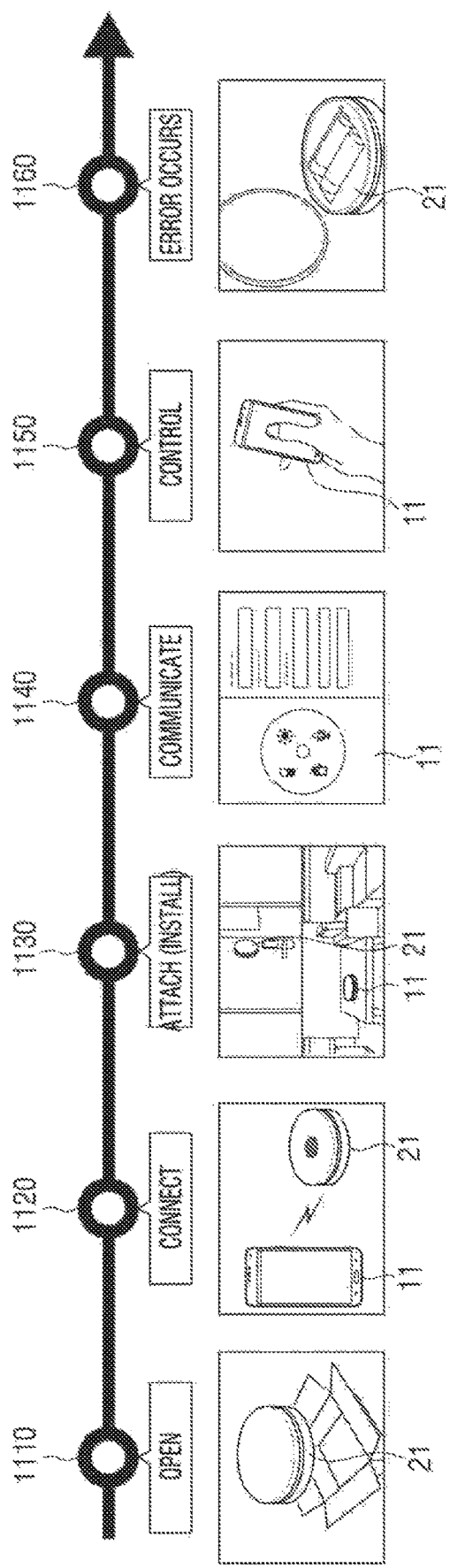
FIG. 11 is a view showing an overall process according to an embodiment of the present disclosure.

FIG. 11 is a view showing an overall process according to an embodiment of the present disclosure.

Referring to FIG. 11, the user may open a package and acquire a purchased attachment device 21 at operation 1110.

Next, the user may connect the user terminal 11 and the attachment device 21 at operation 1120. For example, the user terminal 11 and the attachment device 21 may be connected with each other using a short-distance communication method (for example, a BLE communication method).

Next, the user may attach the attachment device 21 connected with the user terminal 11 to a thing at operation 1130. The thing may be the electronic device 41, furniture in a house, etc. The attachment device 21 has an attachment part such as an adhesive, a magnet, Velcro®, and thus the user may attach the attachment device 21 to a desired place regardless of attachment location.

Next, communication is performed between the user terminal 11 and the attachment device 21 attached to the thing at operation 1140. In this case, communication may be performed when necessary so that power consumption of the attachment device 21 can be minimized. For example, communication may be performed when the attachment device 21 is initially attached or when the user terminal 11 requests communication, or at regular intervals.

Next, the attachment device 21 may be controlled at operation 1150. For example, the attachment device 21 may be controlled in response to control data received from the user terminal 11, the hub 31, or the cloud 51. In addition, the attachment device 21 may be controlled according to the operation state of the thing to which the attachment device 21 is attached. In addition, the attachment device 21 may be controlled in response to control data which is sent by another attachment device 22. In addition, the attachment device 21 may be controlled considering a surrounding situation. The attachment device 21 may be controlled to transmit the control data to the thing. In addition, the attachment device 21 may transmit the result of the controlling to the user terminal 11, the hub 31, or the cloud 51.

Next, the attachment device 21 may determine whether an error occurs or not by detecting the operation state of the thing at operation 1160. For example, the processor 590 of the attachment device 21 may determine the operation state of the thing based on information detected from electromagnetism, a sound, etc. generated in the thing, and may transmit additional control data according to the result of the determining to the object. In addition, the attachment device 21 may transmit feedback data according to the result of the determining to the user terminal 11, the hub 31, or the cloud 51.

In addition, the attachment device 21 may determine whether an error occurs or not by detecting its own operation state at operation 1160. For example, when the battery of the attachment device 21 is lower than or equal to a predetermined threshold value, the attachment device 21 may transmit the result of determining its own operation state to the user terminal 11, the hub 31, or the cloud 51.

Figure 12:
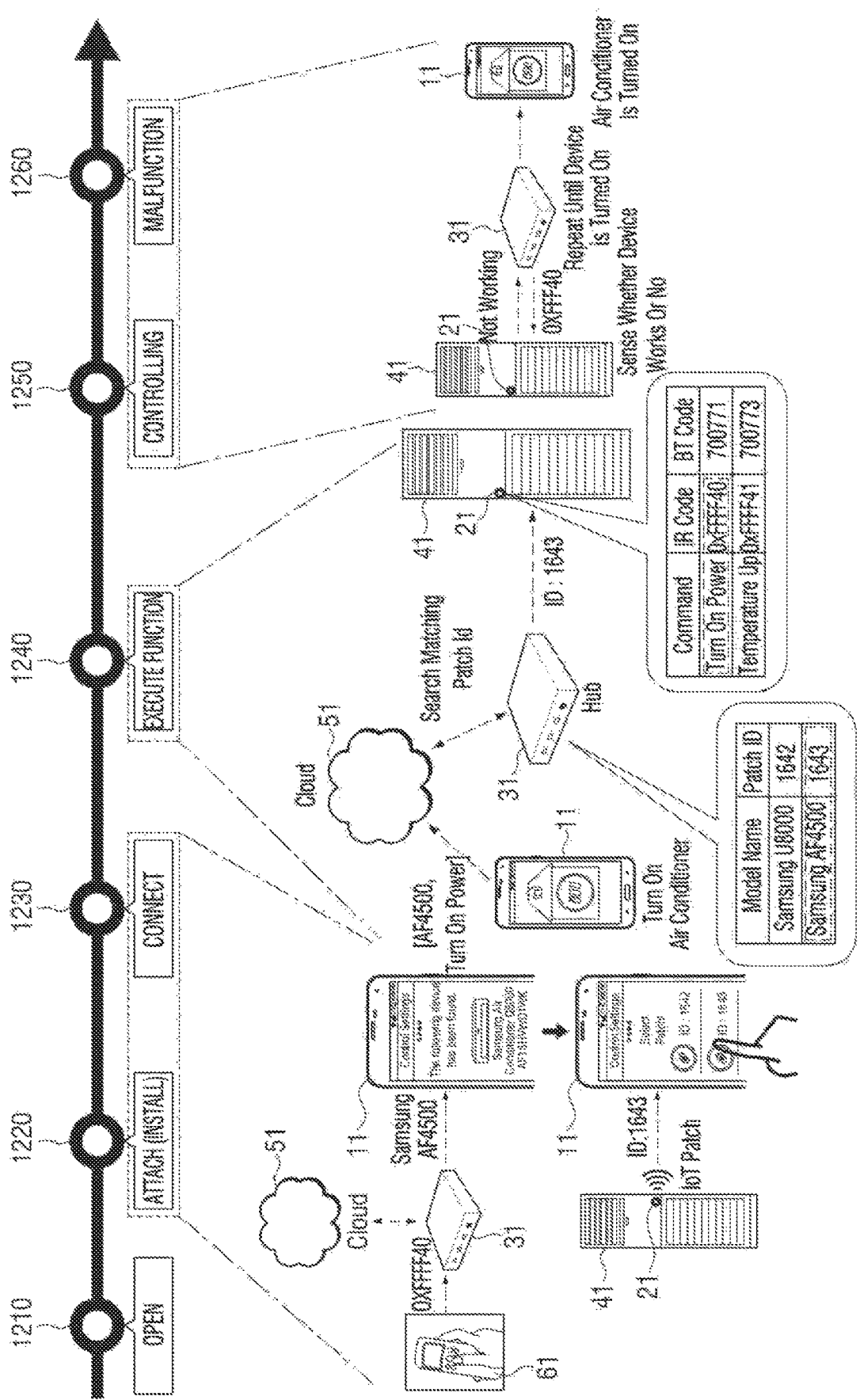
FIG. 12 is a view showing an overall process according to an embodiment of the present disclosure.

FIG. 12 is a view showing an overall process according to an embodiment of the present disclosure.

Referring to FIG. 12, the user may open a package and acquire a purchased attachment device 21 at process 1210.

Next, the user may attach the attachment device 21 to an electronic device at process 1220.

Next, the electronic device 41 and the attachment device 21 to be connected may be searched and a matching process therebetween may be performed at process 1230. Process 1230 in FIG. 12 will be explained in detail below with reference to FIGS. 13 to 18.

Next, a process of controlling to execute one function of the electronic device 41 using the attachment device 21 may be performed at process 1240. Process 1240 in FIG. 12 will be explained in detail below with reference to FIGS. 19 and 20.

The electronic device 41 may malfunction when the electronic device 41 is controlled using the attachment device 21 at processes 1250 and 1260. In this case, a process of preventing malfunction of the electronic device 41 may be performed. Processes 1250 and 1260 in FIG. 12 will be explained in detail below with reference to FIGS. 21 and 22.

FIGS. 13 to 18 are views showing a process of searching and matching the electronic device 41 and the attachment device 21 according to various embodiments of the present disclosure.

Figure 13:
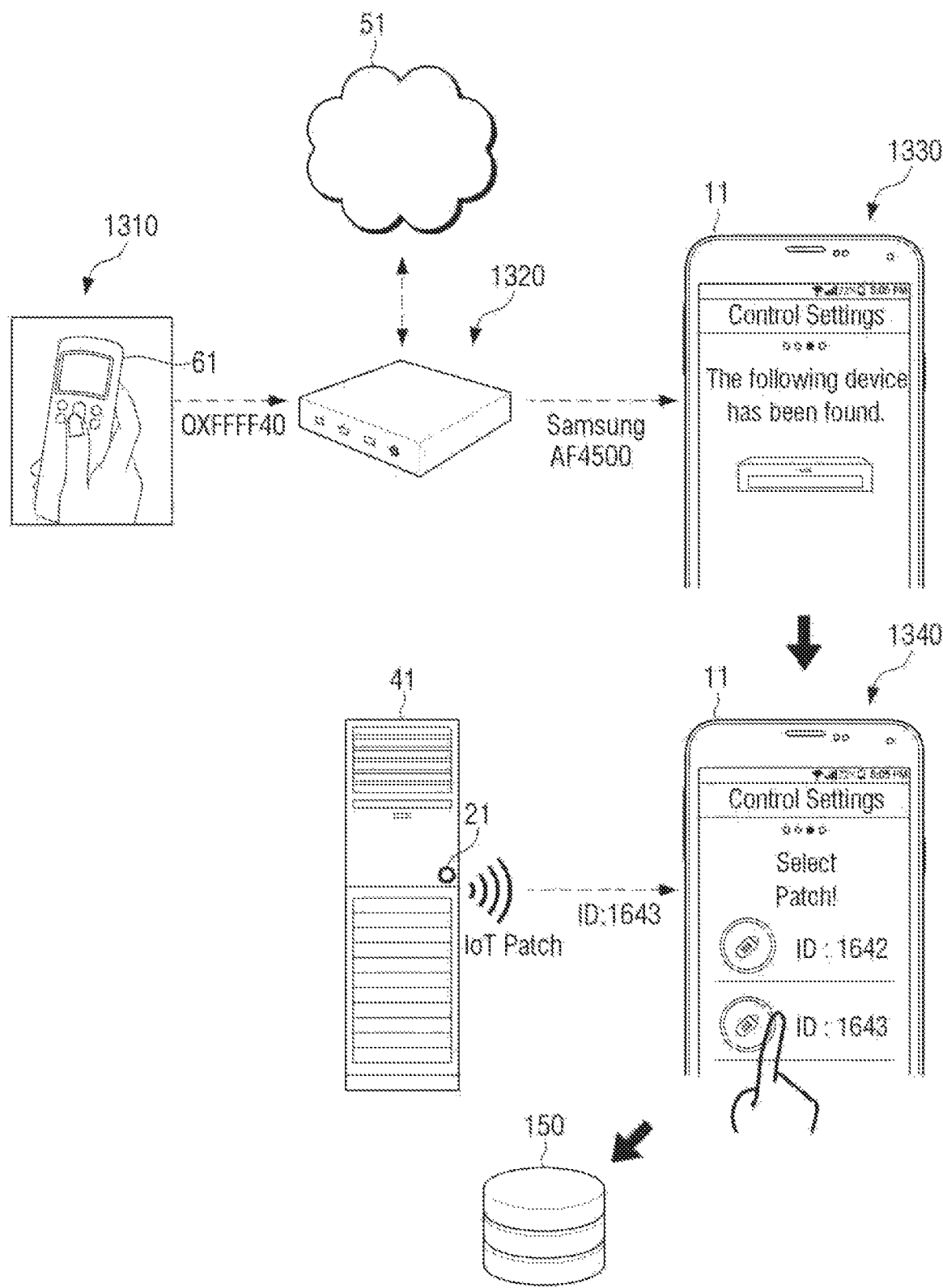

Referring to view 1310 of FIG. 13, when the user points toward the hub 31 and presses an on button on a remote controller 61, the remote controller 61 may transmit IR code data to the hub 31.

Next, in view 1320 of FIG. 13, the hub 31 which has received the IR code data may search the IR code data and identification information of the electronic device 41 from the cloud 51. In addition, the hub 31 may transmit the identification information of the electronic device 41 to the user terminal 11.

Next, in view 1330 of FIG. 13, in response to the identification information of the electronic device 41 being received, the processor 190 of the user terminal 11 may control the display 130 to display the identification information.

Next, in view 1340 of FIG. 13, the processor 190 of the user terminal 11 may control the display 130 to display a list of attachment devices 21-2N. The list of the attachment devices 21-2N may include identification information of the attachment device 21 which is received from at least one attachment device 21 located in the proximity of the user terminal 11.

In addition, the sensing unit 180 of the user terminal 11 may detect a user input to select the attachment device 21 to control the electronic device 41 from the list of the attachment devices 21-2N. In response to the user input to select the attachment device 21, the processor 190 of the user terminal 11 may map the identification information of the attachment device 21 and the identification information of the electronic device 41, and store mapping information.

Figure 14:
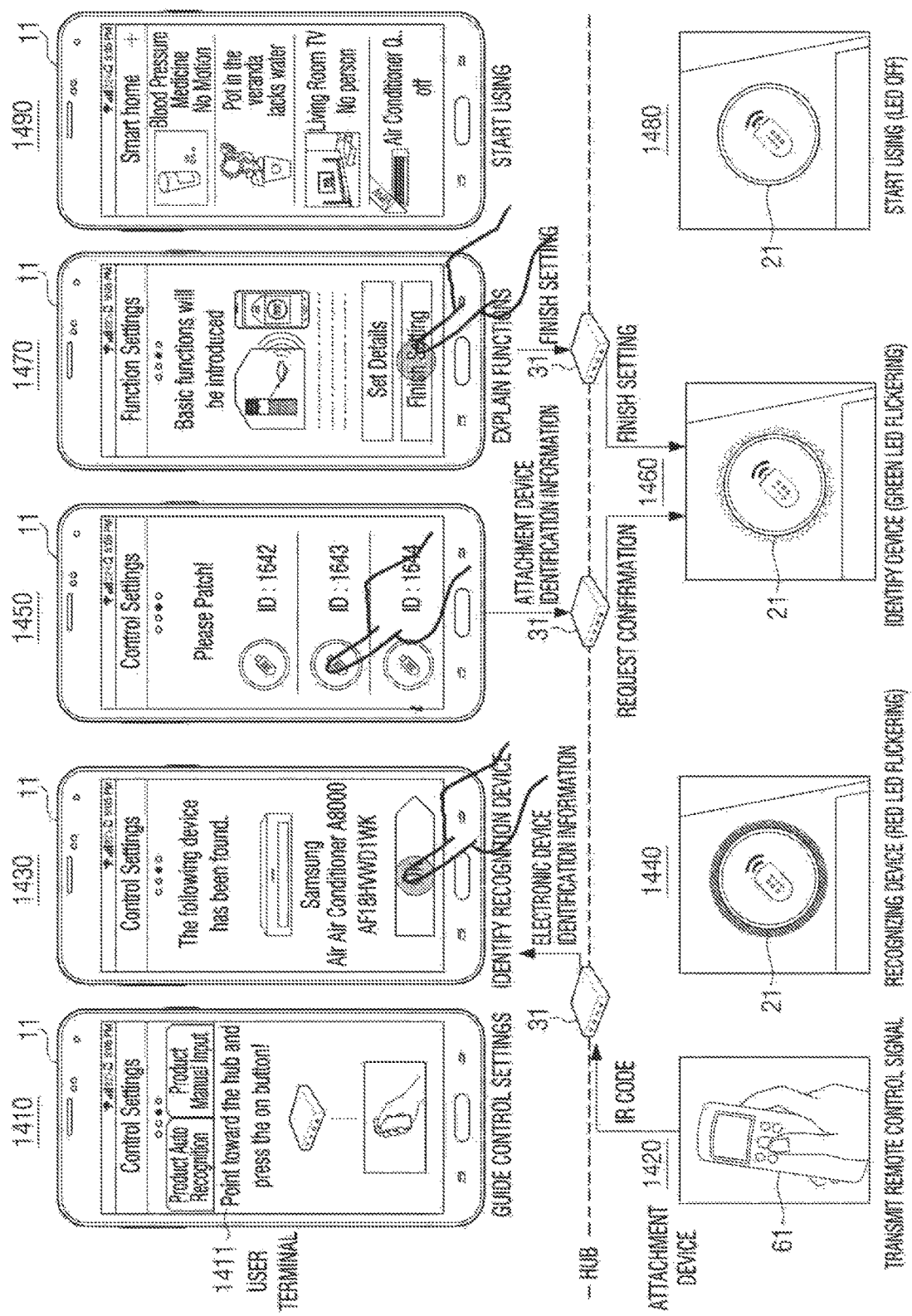

Referring to view 1410 of FIG. 14, according to an embodiment of the present disclosure, the user terminal 11 may display an attachment device setting screen. In view 1410 of FIG. 14, the attachment device setting screen may provide guide information 1411 for guiding the user to search the hub.

In this state, in response to the user pointing toward the hub 31 and pressing the on button of the remote controller 61 as shown in view 1420 of FIG. 14, the remote controller 61 may transmit IR code data to the hub 31.

Next, the hub 31 may recognize the electronic device 41 controlled by the remote controller 61 using the received IR code data. For example, the hub 31 may acquire the identification information of the electronic device 41 corresponding to the IR code data from the storage of the hub 31 or the cloud 51. In addition, the hub 31 may transmit the identification information of the electronic device to the user terminal 11. The processor 190 of the user terminal 11 may receive the identification information of the electronic device 41 through the communication unit 140, and may control the display 130 to display the identification information of the electronic device 41 as shown in view 1430 of FIG. 14. For example, the processor 190 of the user terminal 11 may control the display 130 to display an image, unique ID (for example, a media access control (MAC) address), a product name, a model name, etc. of the searched electronic device 41.

In this case, the attachment device 21 attached to the electronic device 41 may make a predetermined color light (for example, a red light) flicker through a light emitting unit of the attachment device 21 to indicate that the electronic device 41 is being recognized, as shown in view 1440 of FIG. 14.

Next, as shown in view 1450 of FIG. 14, the processor 190 of the user terminal 11 may control the display 130 to display the list of the attachment devices. In addition, the sensing unit 180 of the user terminal 11 may detect a user input to select the attachment device 21 to control the electronic device 41 from the list of the attachment devices 21-2N. In response to the user input, the communication unit 140 of the user terminal 11 may transmit the identification information of the selected attachment device 21 to the hub 31. The hub 31 which has received the identification information of the attachment device 21 may transmit notification information for requesting confirmation to the selected attachment device 21. In response to the notification information being received, the attachment device 21 may make a predetermined color light (for example, a green light) flicker through the light emitting unit of the attachment device 21 as shown in view 1460 of FIG. 14.

In response to the user input to select the attachment device 21, the processor 190 of the user terminal 11 may control the display 130 to display at least one function for controlling the electronic device 41 using the attachment device 21 as shown in view 1470 of FIG. 14. For example, the function for controlling the electronic device 41 may be a function of turning on or off the electronic device 41 outside user's house, a function of turning on or off the electronic device 41 at a pre-set time, a function of turning on or off the electronic device 41 automatically by detecting whether the user enters or leaves user's house.

The user may set details with reference to the displayed at least one function. In this case, the user may separately list only frequently used functions. Next, the sensing unit 180 of the user terminal 11 may detect a user input to select a setting finish button. In response to the user input, the communication unit 140 of the user terminal 11 may transmit notification information indicating that the setting of the attachment device 21 is finished to the hub 31. The hub 31 which has received the notification information may transmit the notification information indicating that the setting is finished to the attachment device 21. In response to the notification information being received, the attachment device 21 may finish making the predetermined light (for example, the green light) flicker through the light emitting unit of the attachment device 21, and enter a use standby state as shown in view 1480 of FIG. 14.

In response to the setting of the attachment device 21 being finished, the processor 190 of the user terminal 11 may control the display 130 to display an attachment device utilization screen as shown in view 1490 of FIG. 14. The attachment device utilization screen may display a list of the electronic devices 41-4N or things to which the attachment devices 21-2N are attached. In this case, a visual effect (for example, highlighting, marking, etc.) may be applied to the electronic device 41 or thing to which the attachment device 21 is attached most recently, and displayed to distinguish the electronic device 41.

Next, in response to the user selecting one electronic device or thing from the list, the processor 190 of the user terminal 11 may control the display 130 to display a function for controlling the selected electronic device or thing.

Figure 15A:
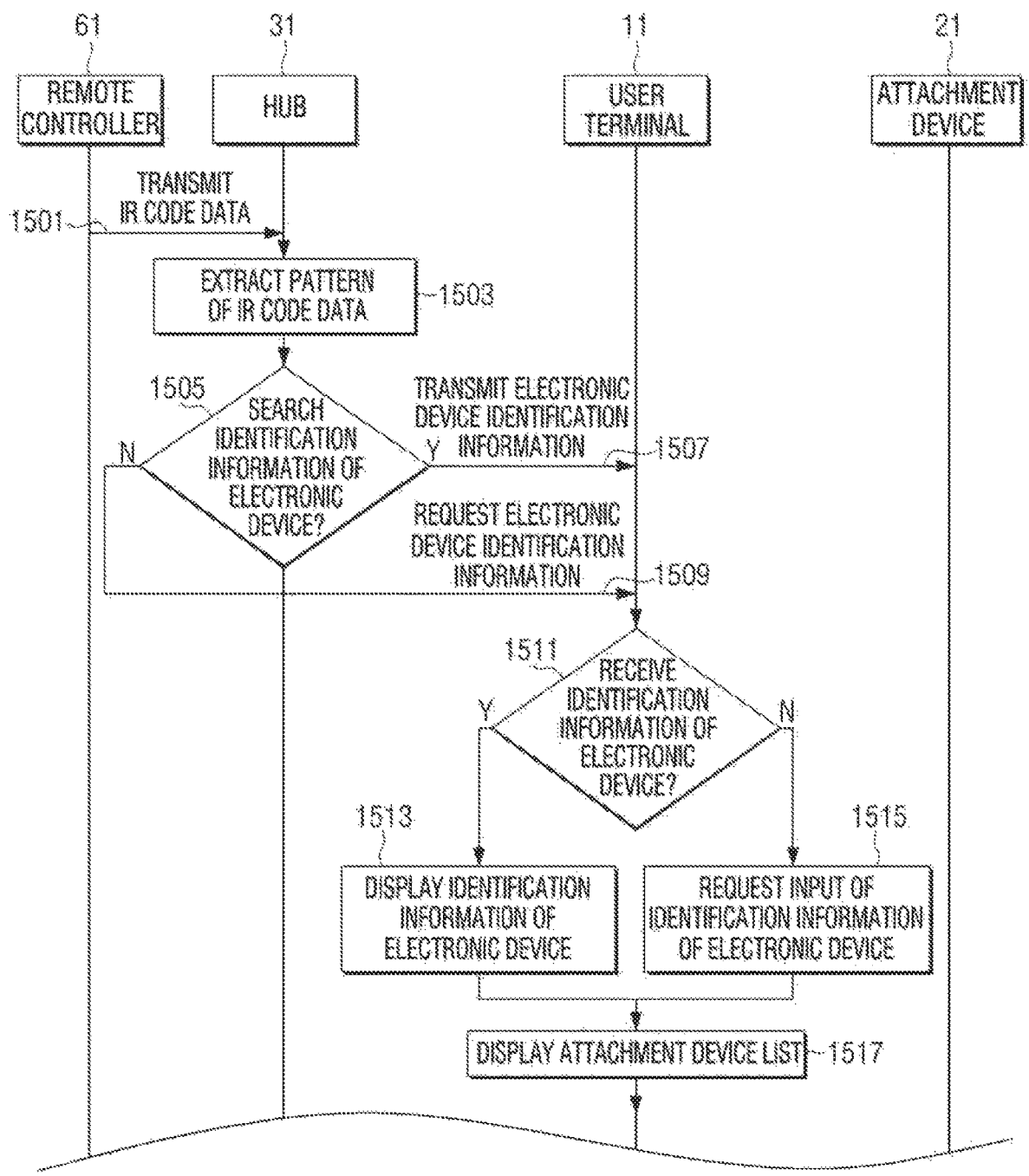
Figure 15B:
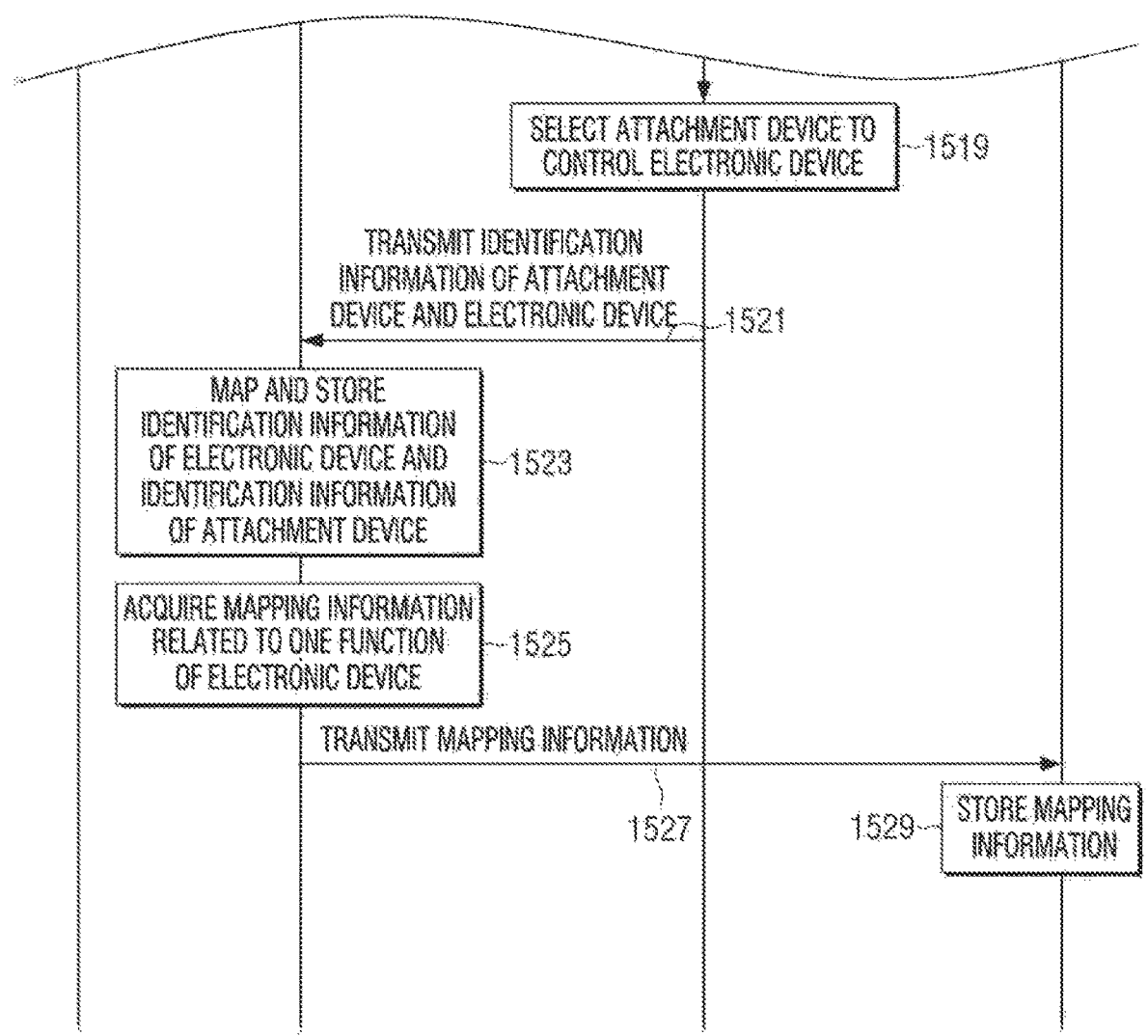

According to an embodiment of the present disclosure, as shown in FIG. 15, the electronic device 41 is searched based on the IR code data provided from the remote controller 61, and the identification information of the searched electronic device 41 and the identification information of the attachment device 21 are matched and stored.

Referring to FIG. 15, in response to the user pointing toward the hub 31 and pressing the on button of the remote controller 61, the remote controller 61 may transmit the IR code data to the hub 31 at operation 1501. The hub 31 which has received the IR code signal may extract a pattern of the IR code data from the IR code data at operation 1503. Next, the hub 31 may search the identification information of the electronic device 41 related to the pattern of the IR code data extracted from the storage of the hub 31 or the cloud 51 at operation 1505. The identification information of the electronic device 41 may be an image, unique ID (for example, a MAC address), a product name, a model name, etc. of the electronic device 41.

In response to the identification information of the electronic device 41 corresponding to the IR code pattern being searched at operation 1505-Y, the hub 31 may transmit the identification information of the electronic device 41 to the user terminal 11 at operation 1507. On the other hand, in response to the identification information of the electronic device 41 not being searched at operation 1505-N, the hub 31 may request the identification information of the electronic device 41 from the user terminal at operation 1509.

Next, the user terminal 11 determines whether the identification information of the electronic device 41 is received or not at operation 1511. In response to the identification information of the electronic device 41 being received at operation 1511-Y, the processor 190 of the user terminal 11 may control the display 130 to display the identification information at operation 1513. On the other hand, in response to the request for the identification information of the electronic device 41 being received at operation 1511-N, the processor 190 of the user terminal 11 may control the display 130 to display a screen for requesting the user to input the identification information of the electronic device 41 at operation 1515.

Next, the processor 190 of the user terminal 11 may control the display 130 to display the list of the attachment devices at operation 1517. The sensing unit 180 of the user terminal 11 may detect a user input to select the attachment device 21 to control the electronic device 41 from the list of the attachment devices 21-2N at operation 1519.

Next, the communication unit 140 of the user terminal 11 may transmit the identification information of the selected attachment device 21 to the hub 31 at operation 1521. In addition, in response to the identification information of the electronic device 41 being inputted by the user, the communication unit 140 of the user terminal 11 may transmit the identification information of the electronic device 41 to the hub 31 at operation 1521.

The hub 31 which has received the identification information of the attachment device 21 or the identification information of the electronic device 41 may map the identification information of the attachment device 21 and the identification information of the electronic device 41 and store the mapping information at operation 1523. In addition, the hub 31 may acquire mapping information in which data configured in a first communication format and data configured in a second communication format in relation to one function of the electronic device are mapped, and store the mapping information at operation 1525. In this case, the mapping information may be pre-stored in the storage of the hub 31 or may be acquired by the hub 31 from the external cloud 51 or the user terminal 11. Next, the hub 31 may transmit the mapping information to the attachment device 21 at operation 1527.

The attachment device 21 which has received the mapping information may store the mapping information at operation 1529.

Referring to view 1610 of FIG. 16, according to an embodiment of the present disclosure, the user may manipulate the user terminal 11 to display the attachment device utilization screen. As shown in view 1610 of FIG. 16, the list of the things to which the attachment devices are attached (for example, a medicine container, a pot, a digital TV, etc.) may be displayed on the attachment device utilization screen. In this case, the list may be displayed with state information on the things which is based on sensing information received by the attachment devices 21-2N. In this state, the sensing unit 180 of the user terminal 11 may detect a user input to select an UI element 1601 to set a new attachment device.

To set the new attachment device, the user may open a package and acquire new attachment devices 21-27 as shown in view 1620 of FIG. 16.

In response to the user input, the processor 190 of the user terminal 11 may control the display 130 to display the attachment device setting screen as shown in view 1630 of FIG. 16. The attachment device setting screen may provide guide information 1631 for guiding the user to turn on the power of the attachment device 21.

The user may detach the attachment device 21 from an attachment object with reference to the guide information 1631 as shown in view 1640 of FIG. 16. As a result of the detaching, the attachment device 21 may be turned on. In addition, the light emitting unit of the attachment device 21 may flicker in predetermined color (for example, blue). In another example, when the attachment device 21 is detached from the attachment object and then is attached to a thing, the attachment device 21 may be turned on.

Next, the sensing unit 180 of the user terminal 11 may detect a user input to select the next button. In response to the user input, the communication unit 140 of the user terminal 11 may request the hub 31 to search the attachment device 21. The hub 31 may search the neighboring attachment device 21. In addition, in response to identification information being received from the attachment device 21 as a result of the searching, the hub 31 may transmit the identification information of the attachment device 21 to the user terminal 11. In addition, the communication unit 140 of the user terminal 11 may search the attachment device 21 which is connectable with the user terminal 11. For example, the communication unit 140 of the user terminal 11 may search the at least one attachment device 21 using the BLE communication method. In this case, the light emitting unit of the attachment device 21 may flicker in predetermined color (for example, red) to indicate that the attachment device 21 is being connected with the user terminal 11 as shown in view 1650 of FIG. 16.

In response to the attachment device 21 being searched, the user terminal 11 may control the display 130 to display the identification information 1661 of the searched attachment device as shown in view 1660 of FIG. 16.

Next, in response to a user input to select the next button being detected by the sensing unit 180 of the user terminal 11, the communication unit 140 of the user terminal 11 may connect with the attachment device 21. For example, in response to the communication unit 140 of the user terminal 11 requesting the hub 31 to connect with the attachment device 21, the hub 31 may request the attachment device 21 to connect with the user terminal 11.

In response to the attachment device 21 accepting the connection with the user terminal 11, the light emitting unit of the attachment device 21 may flicker in predetermined color (for example, green) as shown in view 1670 of FIG. 16.

In addition, as shown in view 1680 of FIG. 16, the processor 190 of the user terminal 11 may control the display 130 to display notification information 1681 indicating that the attachment device 21 is connected and registered at the user terminal 11.

Figure 17:
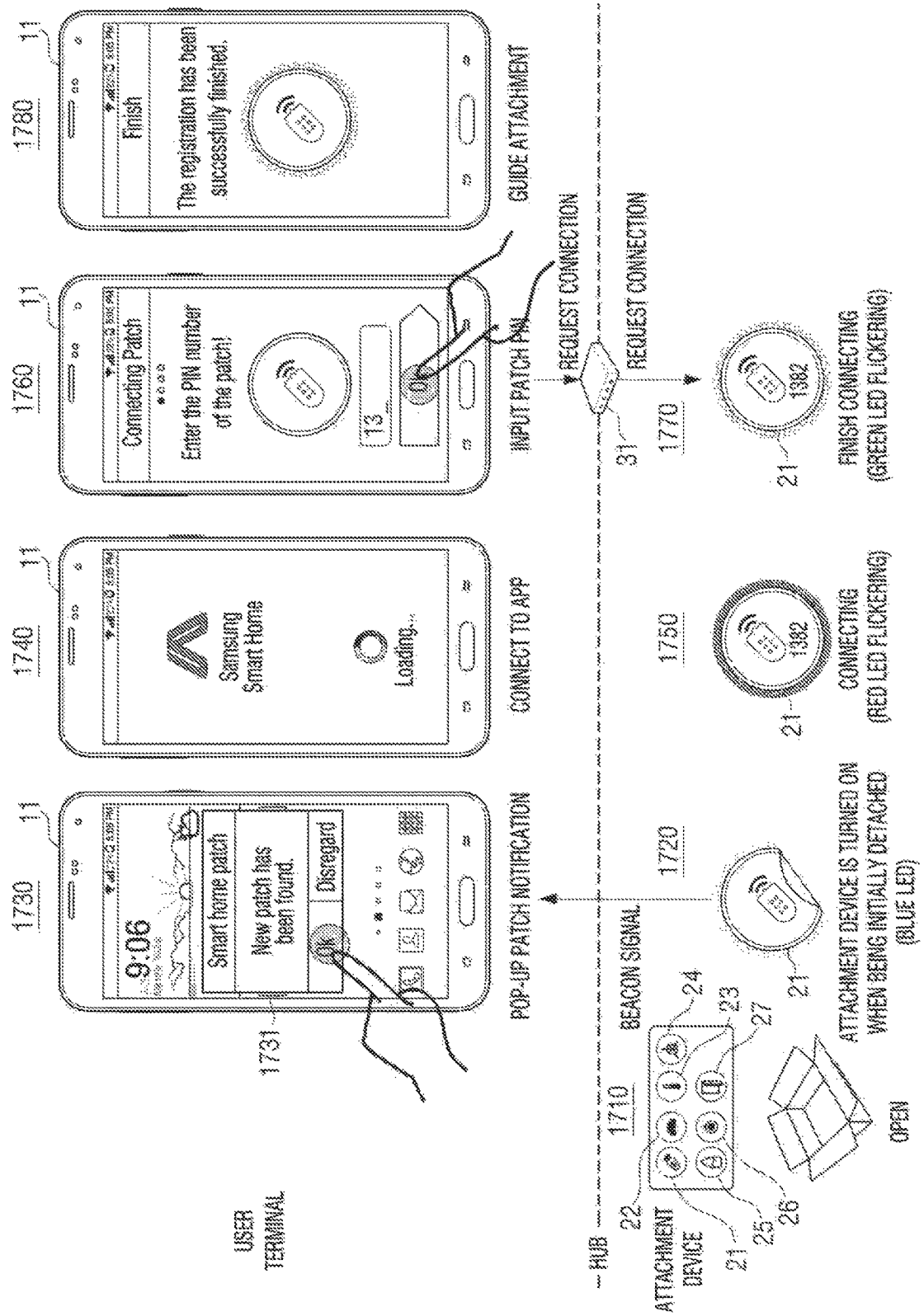

Referring to view 1710 of FIG. 17, according to an embodiment of the present disclosure, the user may open a package and acquire attachment devices 21 to 27. Next, in response to the user detaching the attachment device 21 from an attachment object as shown in view 1720 of FIG. 17, the attachment device 21 may broadcast a beacon signal in the BLE communication method. In this case, the attachment device 21 may be turned on as a result of the detaching. In addition, the light emitting unit of the attachment device 21 may flicker in predetermined color (for example, blue). In another example, when the attachment device 21 is detached from the attachment object and then is attached to a thing, the attachment device 21 may be turned on.

In response to a broadcasting signal (for example, the beacon signal) being detected by the communication unit 140 of the user terminal 11, the processor 190 of the user terminal 11 may control the display 130 to display notification information 1731 indicating that the new attachment device 21 is detected as shown in view 1730 of FIG. 17. Next, the sensing unit 180 of the user terminal 11 may detect a user input to select an OK button to connect with the attachment device 21.

In response to the user input, the processor 190 of the user terminal 11 may execute an application to provide an attachment device setting screen as shown in view 1740 of FIG. 17. In this case, the light emitting unit of the attachment device 21 may flicker in predetermined color (for example, red) to indicate that the attachment device 21 is being connected with the user terminal 11 as shown in view 1750 of FIG. 17.

Next, as a result of executing the application, the processor 190 of the user terminal 11 may control the display 130 to display the attachment device setting screen to register the attachment device 21 as shown in view 1760 of FIG. 17. While the attachment device setting screen is displayed, the sensing unit 180 of the user terminal 11 may detect a user input to enter the identification number of the attachment device 21 and select the next button to register the attachment device.

Next, in response to the user input to select the OK button being detected by the sensing unit 180 of the user terminal 11, the communication unit 140 of the user terminal 11 may connect with the attachment device 21. For example, in response to the communication unit 140 of the user terminal 11 requesting the hub 31 to connect with the attachment device 21, the hub 31 may request the attachment device 21 to connect with the user terminal 11.

In response to the attachment device 21 accepting the connection with the user terminal 11, the light emitting unit of the attachment device 21 may flicker in predetermined color (for example, green) as shown in view 1770 of FIG. 17.

In addition, as shown in view 1780 of FIG. 17, the processor 190 of the user terminal 11 may control the display 130 to display notification information indicating that the attachment device 21 is connected and registered at the user terminal 11.

Figure 18:
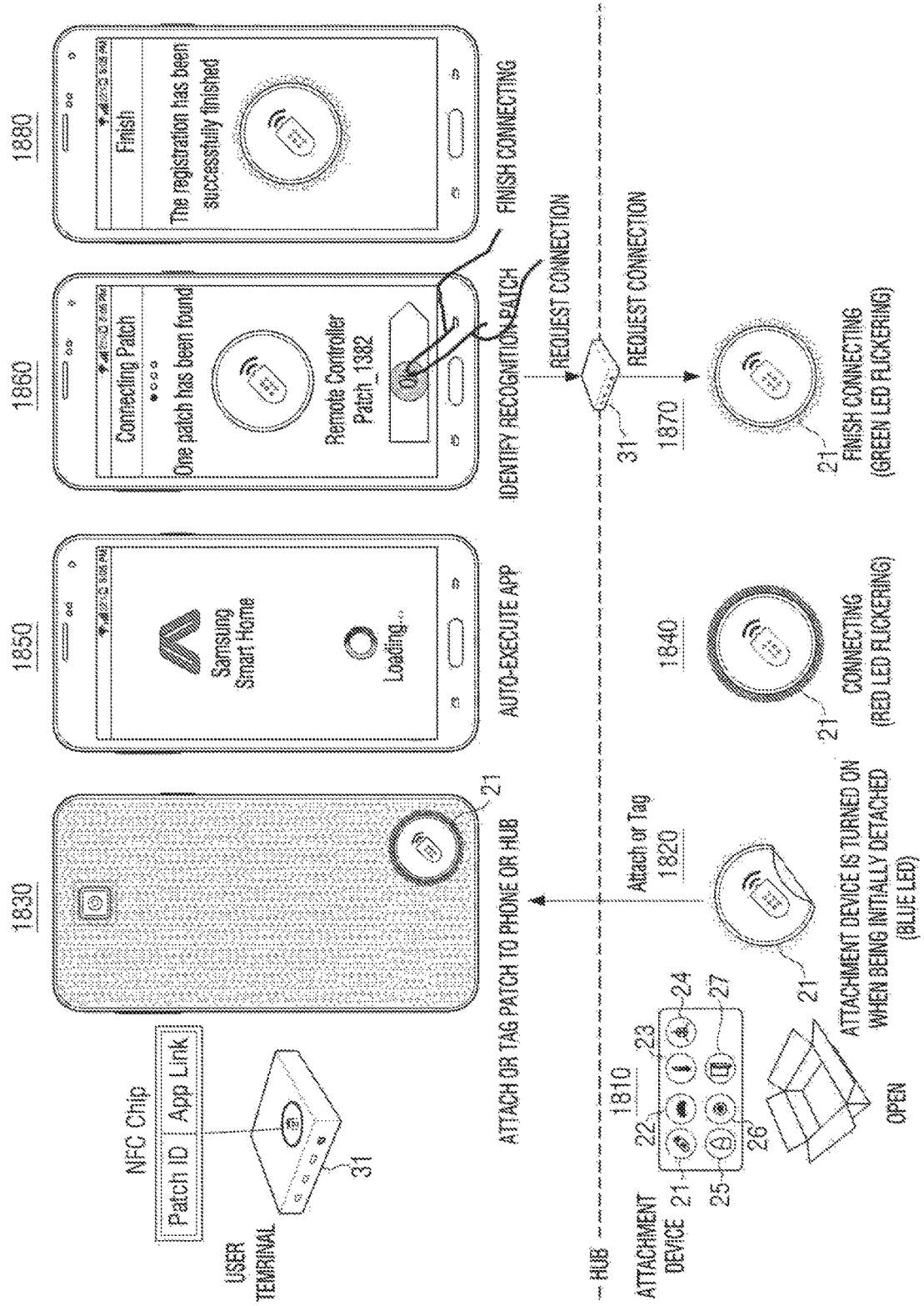

Referring to view 1810 of FIG. 18, according to an embodiment of the present disclosure, the user may open a package and acquire attachment devices 21 to 27. Next, the user may detach the attachment device 21 from an attachment object as shown in view 1820 of FIG. 18. As a result of the detaching, the attachment device 21 may be turned on. In addition, the light emitting unit of the attachment device 21 may flicker in predetermined color (for example, blue). In another example, when the attachment device 21 is detached from the attachment object and then is attached to a thing, the attachment device 21 may be turned on.

Next, the user may attach the attachment device 21 to the hub 31 or the user terminal 11 as shown in view 1830 of FIG. 18. In addition, the user may tag the hub 31 or the user terminal 11 on the attachment device 21. In this case, the hub 31 or the user terminal 11 may acquire the identification information of the attachment device 21 and application identification information related to the attachment device 21 from the attachment device 21 using the NFC communication method. In addition, the hub 31 or the user terminal 11 may acquire a link address to acquire the identification information of the attachment device 21 and the application identification information related to the attachment device 21.

In addition, as shown in view 1850 of FIG. 18, the processor 190 of the user terminal 11 may automatically execute an application providing an attachment device setting screen. When the application is not installed in the user terminal 11, the processor 190 of the user terminal 11 may access a server to acquire the application. In this case, the light emitting unit of the attachment device 21 may flicker in predetermined color (for example, red) to indicate that the attachment device 21 is being connected with the user terminal 11 as shown in view 1840 of FIG. 18.

Next, as a result of executing the application, the processor 190 of the user terminal 11 may control the display 130 to display the attachment device setting screen to register the attachment device 21 as shown in view 1860 of FIG. 18. While the attachment device setting screen is displayed, the sensing unit 180 of the user terminal 11 may detect a user input to enter the identification number of the attachment device 21 and select the next button to register the attachment device.

Next, in response to the user input to select the OK button being detected by the sensing unit 180 of the user terminal 11, the communication unit 140 of the user terminal 11 may connect with the attachment device 21. For example, in response to the communication unit 140 of the user terminal 11 requesting the hub 31 to connect with the attachment device 21, the hub 31 may request the attachment device 21 to connect with the user terminal 11.

In response to the attachment device 21 accepting the connection with the user terminal 11, the light emitting unit of the attachment device 21 may flicker in predetermined color (for example, green) as shown in view 1870 of FIG. 18.

In addition, as shown in view 1880 of FIG. 18, the processor 190 of the user terminal 11 may control the display 130 to display notification information indicating that the attachment device 21 is connected and registered at the user terminal 11.

In another example, the electronic device 41 may recognize the attachment device 21 in various methods, such as the above-described NFC communication method or the BLE communication method, or by recognizing the image of the attachment device 21 or the barcode of the attachment device 21 in addition to a manual input. However, this should not be considered as limiting.

Figure 19:
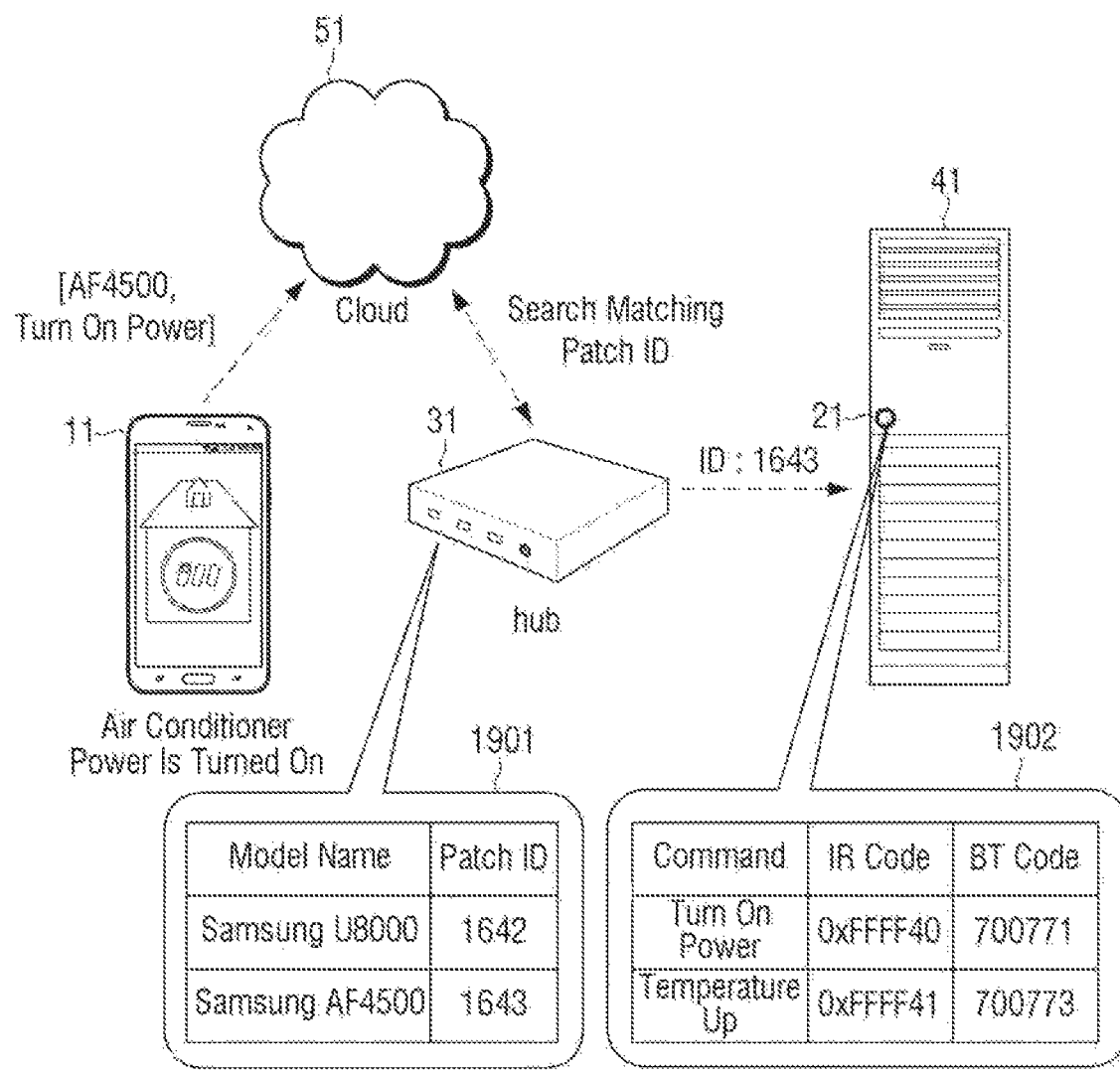
FIGS. 19 and 20 are views showing a process of controlling an electronic device according to various embodiments of the present disclosure.
Figure 20:
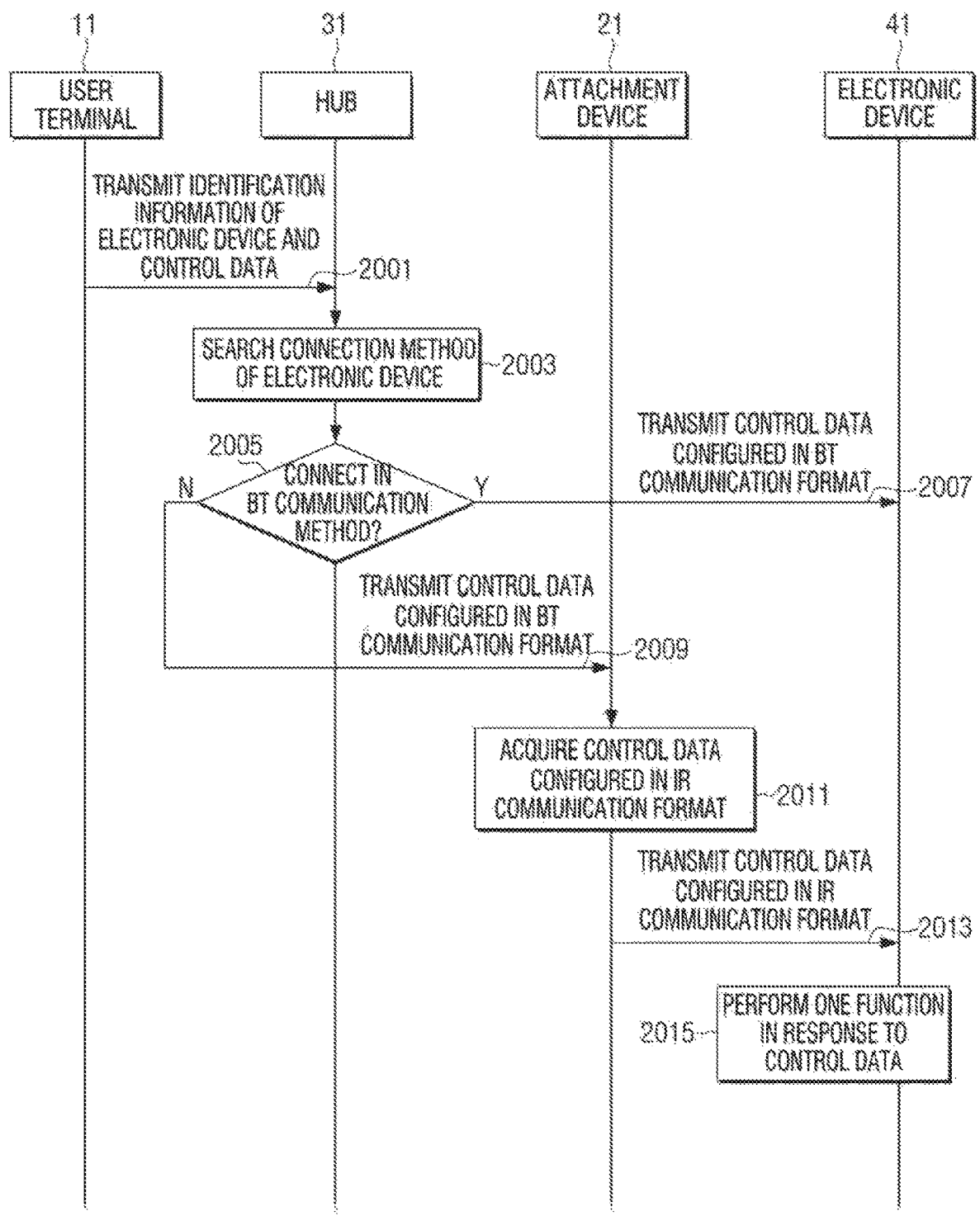

FIGS. 19 to 20 are views showing a process of controlling an electronic device according to various embodiments of the present disclosure.

Referring to FIGS. 19 to 20, when the attachment device 21 and the electronic device 41 are matched with each other, the sensing unit 180 of the user terminal 11 may detect a user input to control the electronic device (for example, an air conditioner). In response to the user input, the processor 190 of the user terminal 11 may control the communication unit 140 of the user terminal 11 to transmit the identification information of the electronic device 41 and data configured in a first communication format (for example, an format of Wi-Fi, 3G, LTE, etc.) in relation to one function (for example, an ON function) of the electronic device (for example, an air conditioner) to the indoor hub 31 via the cloud 51. The hub 31 may acquire the identification information of the attachment device 21 corresponding to the identification information of the electronic device 41 using a mapping table 1901 in which the identification information of each of the attachment devices 21, 22 is mapped onto each of the plurality of electronic devices 41, 42. Next, the hub 31 may transmit data configured in a second communication format (for example, a BT format) corresponding to the data configured in the first communication formation in relation to one function to the identified attachment device 21.

The processor 590 of the attachment device 21 may control the communication unit 540 to transmit data configured in a third communication format (for example, a BT format) in relation to one function of the electronic device to the electronic device 41 to which the attachment device 21 is attached, using a mapping table 1902 in which data configured in the second communication format (for example, the BT format) in relation to the plurality of functions of the electronic device 41 are mapped onto the data configured in the third communication format (for example, the IR format).

In response to the data configured in the third communication format, the electronic device 41 may control itself to perform one function (for example, an ON function).

Referring to FIG. 20, according to an embodiment of the present disclosure, the sensing unit 180 of the user terminal 11 may detect a user input to control an electronic device. In response to the user input, the processor 190 of the user terminal 11 may control the communication unit 140 to transmit the identification information of the electronic device 41 and control data configured in the first communication format in relation to one function of the electronic device to the indoor hub 31 at operation 2001. Next, the hub 31 may search a connection method to connect with the electronic device 41 at operation 2003 For example, the hub 31 may determine whether the hub 31 is connectible with the electronic device 41 in the IR communication or BT communication method.

As a result of searching, the hub 31 determines whether the hub 31 is connectable with the electronic device 41 in the BT communication method or not at operation 2005. When the hub 31 is connectable with the electronic device 41 in the BT communication method at operation 2005-Y, the hub 31 may directly transmit data configured in the BT communication format to the electronic device 41 at operation 2007. In this case, in response to the control data configured in the BT communication format, the electronic device 41 may control itself to perform one function (for example, an ON or OFF function).

On the other hand, when the hub 31 is not connectable with the electronic device 41 in the BT communication method at operation 2005-N, the hub 31 may transmit control data configured in the BT communication format to the attachment device 21 matched with the electronic device 41 at operation 2009. The attachment device 21 which has received the control data configured in the BT communication format may acquire control data configured in the IR communication format corresponding to the control data configured in the BT communication format using mapping information at operation 2011. In addition, the attachment device 21 may transmit the control data configured in the IR communication format to the electronic device 41 at operation 2013. In this case, in response to the control data configured in the IR communication format, the electronic device 41 may control itself to perform one function (for example, an ON or OFF function) at operation 2015.

Figure 21:
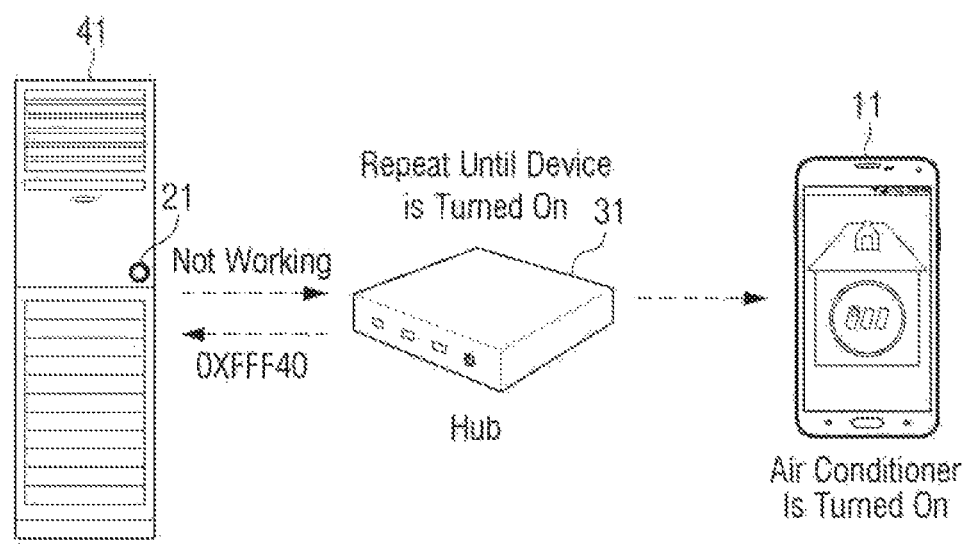
FIGS. 21 and 22 are views showing a process of preventing malfunction during use of an electronic device according to various embodiments of the present disclosure.
Figure 22:
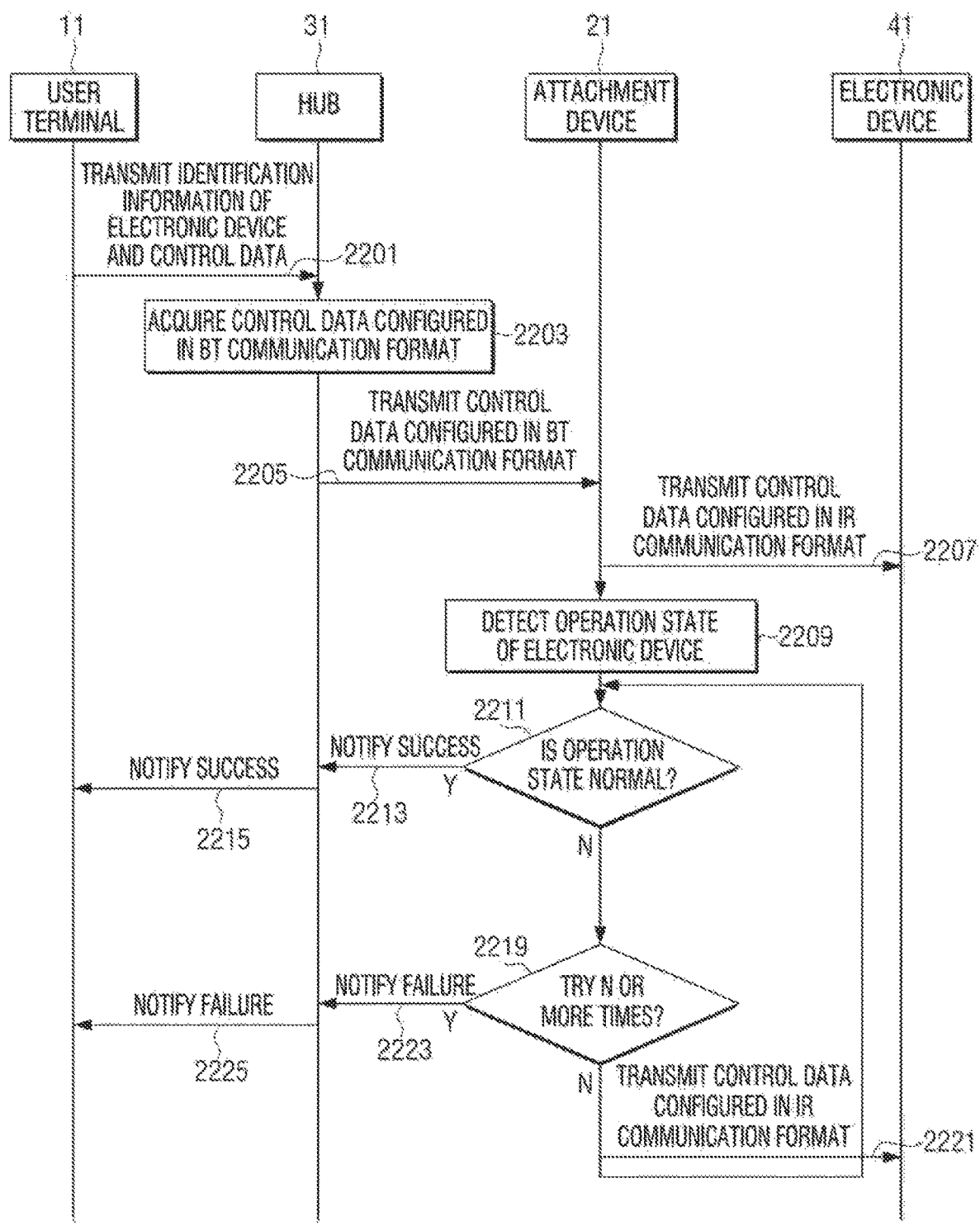

FIGS. 21 and 22 are views illustrating a process of preventing malfunction during use of the electronic device 41 according to various embodiments of the present disclosure.

Referring to FIG. 21, according to a user input, the processor 190 of the user terminal 11 may control the communication unit 140 of the user terminal 11 to transmit data configured in the first communication format in relation to one function (for example, an ON function) of the electronic device (for example, an air conditioner) to the indoor hub 31.

The hub 31 may acquire data configured in the second communication format corresponding to the data configured in the first communication format, and transmit the data to the attachment device 21 attached to the electronic device 41.

In response to the data configured in the second communication format being acquired, the processor 590 of the attachment device 21 may acquire data configured in the third communication format corresponding to the data configured in the second communication format based on the mapping information, and control the communication unit 540 to transmit the data to the electronic device 41 to which the attachment device 21 is attached.

Next, the attachment device 21 may determine the operation state of the electronic device 41. For example, the sensing unit 580 of the attachment device 21 may detect at least one of an electromagnetic field, a sound, a motion, and vibration from the electronic device 41. In addition, the processor 590 of the attachment device 21 may determine the operation state of the product using the detected information. In addition, when the sensing unit 580 of the attachment device 21 is provided with an image sensor, the attachment device 21 may determine the operation state of the product based on photographed image data As a result of determining, when the electronic device 41 is performing an operation related to one function, the processor 590 of the attachment device 21 may control the communication unit 540 to transmit feedback information indicating that one function is being performed to the hub 31. In addition, the hub 31 may transmit the received feedback information to the user terminal 11.

On the other hand, when the electronic device 41 is not performing the operation related to one function as a result of determining, the processor 590 of the attachment device 21 may control the communication unit 540 to transmit the data configured in the third communication format in relation to one function to the electronic device 41 again. This process may be repeated until the operation related to one function of the electronic device 41 is performed.

Referring to FIG. 22, according to an embodiment of the present disclosure, the processor 190 of the user terminal 11 may control the communication unit 140 to transmit the identification information of the electronic device 41 and control data configured in the first communication format in relation to one function of the electronic device to the indoor hub 31 at operation 2201.

The hub 31 may acquire data configured in the BT communication format corresponding to the data configured in the first communication format at operation 2203. Next, the hub 31 may transmit the data configured in the BT communication format to the attachment device at operation 2205.

The processor 590 of the attachment device 21 may acquire data configured in the third communication format corresponding to the data configured in the second communication format based on the mapping information, and may control the communication unit 540 to transmit the data to the electronic device 41 to which the attachment device 21 is attached at operation 2207.

Next, the attachment device 21 may detect the operation state of the electronic device 41 at operation 2209, and determine whether the operation state of the electronic device 41 is normal or not at operation 2211.

For example, when the attachment device 21 detects whether the electronic device 41 is turned on or off, the sensing unit 580 of the attachment device 21 may detect the operation state of the electronic device 41 by detecting a change in the electromagnetic field with reference to a predetermined threshold value when the electronic device 41 is turned on or off using the geomagnetic sensor. In addition, the sensing unit 580 of the attachment device 21 may detect the operation state of the electronic device 41 by detecting a sound which is generated when the electronic device 41 is turned on or off using the sound sensor. In addition, the sensing unit 580 of the attachment device 21 may detect the operation state of the electronic device 41 by detecting the degree of vibration of the electronic device which is generated when the electronic device 41 is turned on or off using the motion sensor. In addition, the sensing unit 580 of the attachment device 21 may detect the operation state of the electronic device 41 by detecting the intensity of light which is generated in the display of the electronic device 41 when the electronic device 41 is turned on or off using the illuminance sensor.

As a result of determining, when the electronic device 41 is normally operated at operation 2211-Y, the attachment device 21 may transmit success notification information indicating that the electronic device 41 is performing one function to the hub 31 at operation 2213. In addition, the hub 31 may transmit the success notification information to the user terminal 11 at operation 2215.

On the other hand, when the electronic device 41 is not normally operated at operation 2211-Y, the attachment device 21 may determine whether the data configured in the third communication format in relation to one function is transmitted N or more times at operation 2219. As a result of determining, when the data is transmitted less than N times at operation 2219-N, the attachment device 21 may continue transmitting the data configured in the third communication format in relation to one function to the electronic device 41 at operation 2221. In addition, the attachment device 21 may determine the operation state of the electronic device 41 again.

On the other hand, when the data is transmitted N or more times at operation 2223-N, the attachment device 21 may transmit failure notification information indicating that the controlling of the electronic device 41 fails to the hub 31. In addition, the hub 31 may transmit the failure notification information to the user terminal 11 at operation 2225.

As described above, it is determined whether the electronic device 41 is normally operated or not using the attachment device 21, and, when the controlling of the electronic device 41 fails, the controlling of the electronic device 41 is continuously tried, so that the reliability of the user can be guaranteed.

Figure 23:
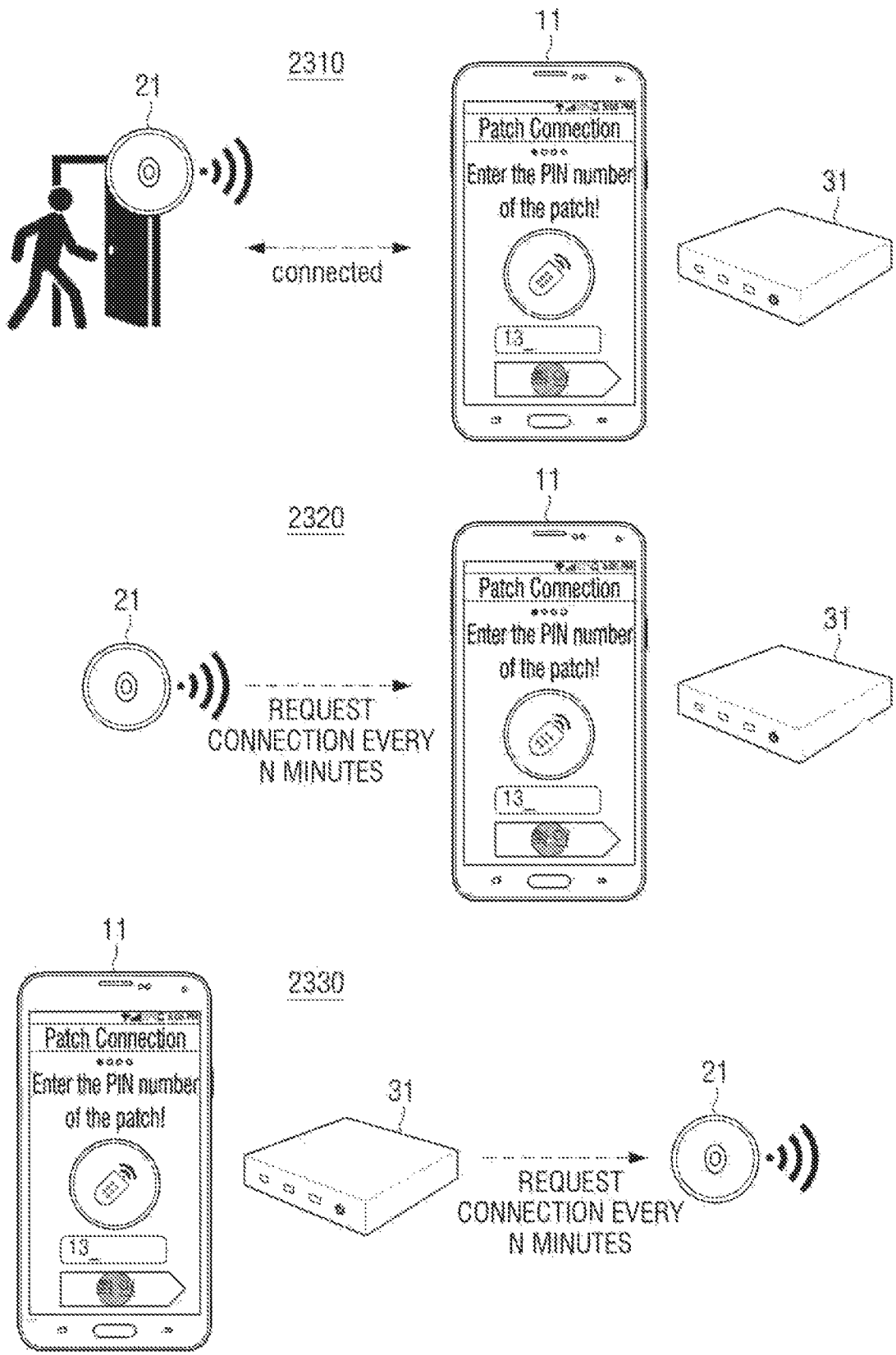
FIG. 23 is a view showing a process of managing power of an attachment device according to an embodiment of the present disclosure.

FIG. 23 is a view showing a process of managing the power of the attachment device 21 according to an embodiment of the present disclosure.

A subminiature device or a thin device such as the attachment device 21 has a limit to providing power due to the limited size of a battery.

Referring to view 2310 of FIG. 23, to solve this problem, the attachment device 21 may request the hub 31 to connect communication only when an event occurs. For example, when the attachment device 21 is attached to a thing (for example, a door, etc.), and the sensing unit 580 of the attachment device 21 detects the door being opened, the processor 590 of the attachment device 21 may control the communication unit 540 to request the hub 31 to connect communication.

Referring to view 2320 of FIG. 23, in another example, the attachment device 21 may periodically request the hub 31 to connect communication. For example, the attachment device 21 may request the hub 31 to connect communication every several seconds or several minutes.

Referring to view 2330 of FIG. 23, in another example, the hub 31 may periodically request the attachment device 21 to connect communication. For example, the hub 31 may request the attachment device 21 to connect communication every several seconds or several minutes.

As described above, the attachment device 21 is connected with other devices only when necessary, so that power consumption of the attachment device 21 can be reduced.

Figure 24:
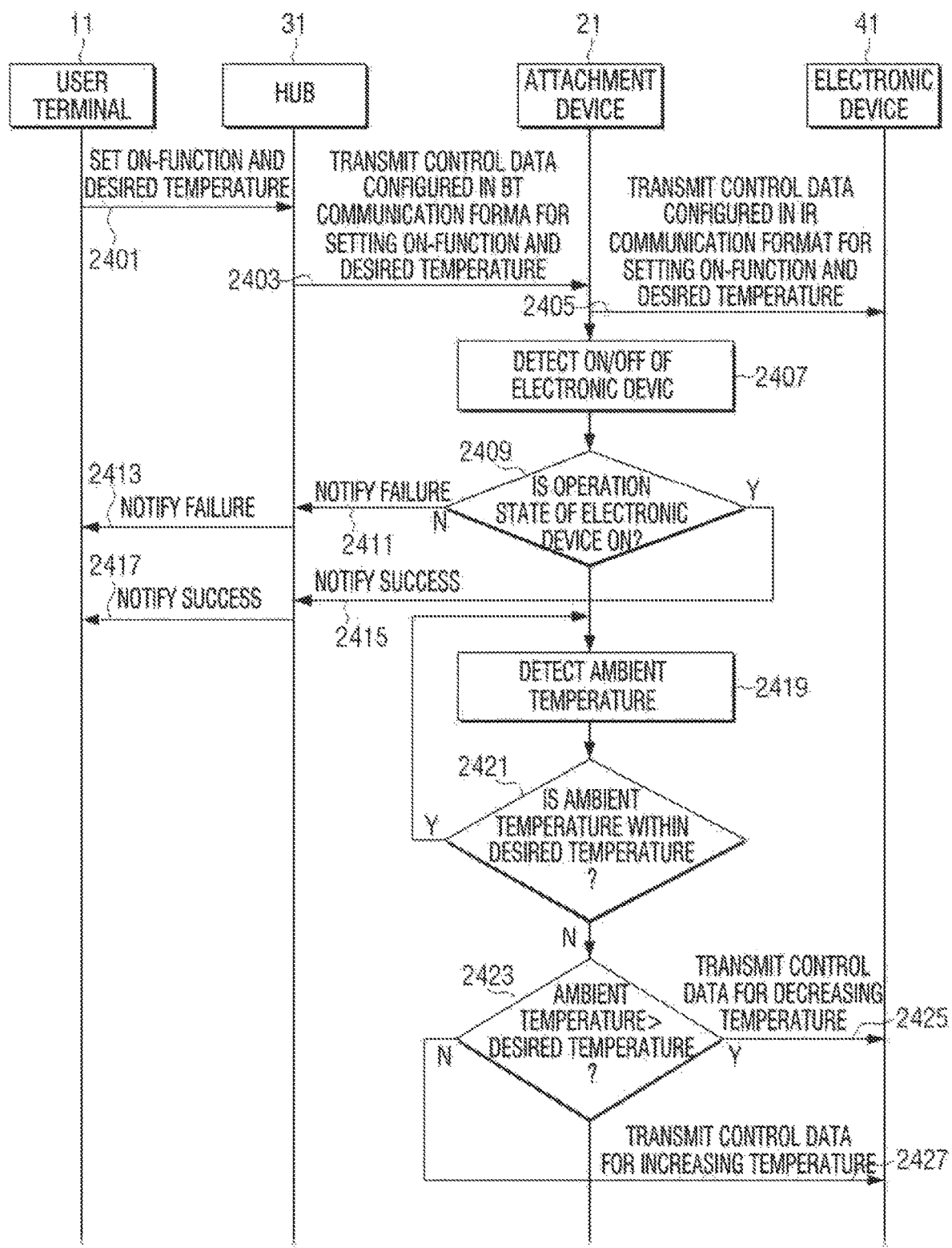
FIG. 24 is a view showing a process of controlling an electronic device according to an embodiment of the present disclosure.

FIG. 24 is a view showing a process of controlling the electronic device 41 according to an embodiment of the present disclosure.

Referring to FIG. 24, the processor 190 of the user terminal 11 may control the communication unit 140 to transmit control data configured in the first communication format (for example, formats of 3G, LTE, etc.) in relation to one function of the electronic device 41 to the indoor hub 31 at operation 2401. When the electronic device 41 is an air conditioner, one function may be a function of turning on or off the electronic device 41 or a function of setting target temperature of the electronic device 41.

The hub 31 may transmit control data configured in the second communication format (for example, a BT format, etc.) in relation to one function (for example, an ON function, a function of setting target temperature, etc.), which corresponds to the data configured in the first communication format, to the attachment device 21 at operation 2403.

Next, the processor 590 of the attachment device 21 may acquire control data configured in the third communication format (for example, an IR format, etc.) in relation to one function, and control the communication unit 540 to transmit the data to the electronic device 41 to which the attachment device 21 is attached at operation 2405.

Next, the sensing unit 580 of the attachment device 21 may detect the operation state of the electronic device 41. For example, the sensing unit 580 of the attachment device 21 may detect the on or off state of the electronic device 41 at operation 2407.

As a result of detecting, the operation state of the electronic device 41 may be determined at operation 2409, and, when the operation state of the electronic device 41 is not the on state at operation 2409-N, the attachment device 21 may transmit data configured in the second communication format in relation to failure notification information to the hub 31 at operation 2411. In addition, the hub 31 may transmit data configured in the first communication format in relation to the failure notification information to the user terminal 11 at operation 2413.

As a result of detecting, when the operation state of the electronic device 41 is the on state at operation 2409-Y, the attachment device 21 may transmit success notification information indicating that the electronic device 41 is performing one function to the hub 31 at operation 2415. In addition, the hub 31 may transmit the success notification information to the user terminal 11 at operation 2417.

In addition, the attachment device 21 may detect a surrounding environment. For example, the temperature sensor included in the sensing unit 580 of the attachment device 21 may detect ambient temperature of the electronic device 41 at operation 2419. Herein, the attachment device 21 may detect the surrounding environment of the electronic device 41 every several minutes (for example, every one minute or every 10 minutes).

Next, the attachment device 21 may determine whether the ambient temperature falls within a target temperature range pre-set by the user at operation 2421. When the ambient temperature falls within the target temperature range at operation 2421-Y, the sensing unit 580 of the attachment device 21 may continue detecting the surrounding environment.

On the other hand, when the ambient temperature falls out of the target temperature range at operation 2421-N, the attachment device 21 may determine whether the ambient temperature exceeds the target temperature at operation 2423.

As a result of determining, when the ambient temperature exceeds the target temperature at operation 2423-Y, the attachment device 21 may acquire control data configured in the third communication (for example, IR, etc.) in relation to a function of reducing temperature, and transmit the data to the electronic device 41 at operation 2425. In this case, the process may be repeated until the ambient temperature detected by the attachment device 21 falls within the pre-set target temperature range.

On the other hand, when the ambient temperature is less than or equal to the target temperature at operation 2423-N, the attachment device 21 may acquire control data configured in the third communication (for example, IR, etc.) in relation to a function of increasing temperature, and transmit the data to the electronic device 41 at operation 2427. In this case, the process may be repeated until the ambient temperature detected by the attachment device 21 exceeds the pre-set target temperature.

As described above, when the electronic device 41 is indirectly controlled using the attachment device 21, the user's availability on the electronic device 41 having no auto temperature adjustment function can be enhanced. That is, the attachment device 21 detects the ambient temperature and controls the temperature control function of the electronic device 41 (for example, an air conditioner), so that a smart temperature adjustment environment can be provided.

FIGS. 25A to 30 are views showing a process of attaching the attachment device 21 to a thing and utilizing the same according to various embodiments of the present disclosure.

Figure 25A:
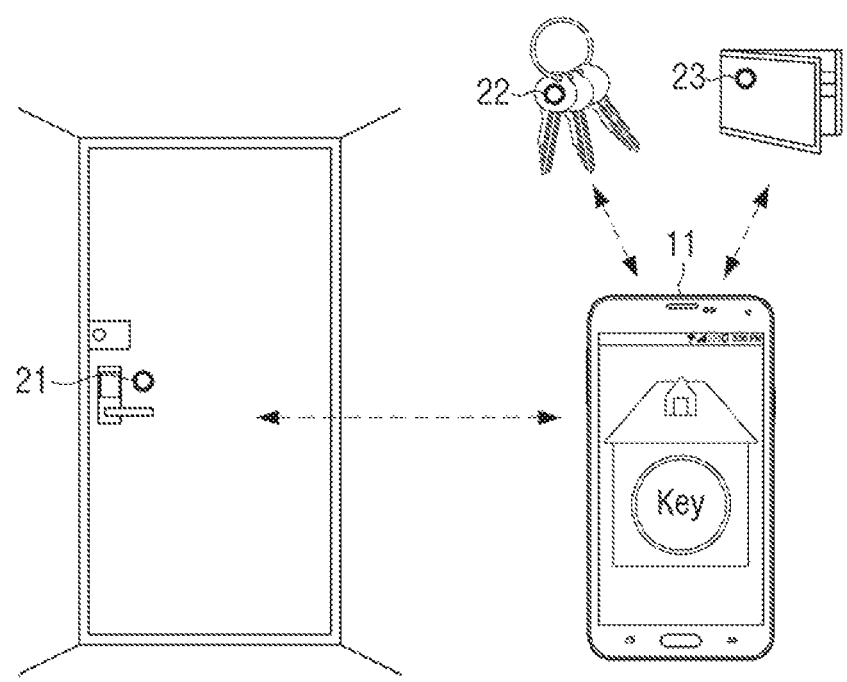
FIGS. 25A, 25B, 25C, 25D, 26A, 26B, 26C, 26D, 27A, 27B, 28A, 28B, 28C, 29, and 30 are views illustrating a process of attaching an attachment device to a thing and utilizing the same according to various embodiments of the present disclosure.

Referring to FIG. 25A, the user terminal 11 may determine the movement state of the user based on information on a distance between the attachment device 21 attached to an entrance and the user terminal 11. For example, when the distance between the attachment device 21 and the user terminal 11 is within a predetermined distance, the user terminal 11 may determine that the user is going to go out. In this state, when a distance between the attachment devices 22, 23 attached to user's belongings (for example, a key, a wallet, etc.) and the user terminal 11 is longer than a predetermined distance, the user terminal 11 may determine that the user forgets a part of the user's belongings. In addition, the user terminal 11 may provide notification information on the forgotten belongings to the user. For example, the user terminal 11 may display the locations of the forgotten belongings.

Figure 25B:
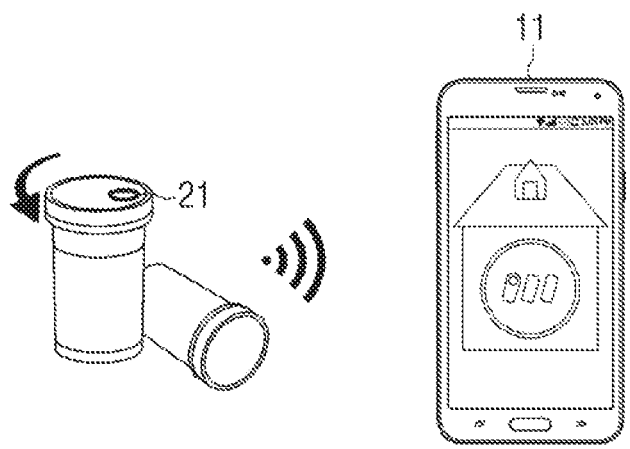

Referring to FIG. 25B, in another example, in response to motion information being received from the attachment device 21 attached to a medicine container according to a user's motion of opening the lid of the medicine container, the user terminal 11 may determine an amount of medicine remaining in the medicine container from the attachment device 21. For example, when the user terminal 11 pre-stores information on the number of pills, the user terminal 11 may determine the number of remaining pills based on the number of times the lid of the medicine container is opened and time at which the lid of the medicine container is opened. In addition, the user terminal 11 may display information related to the amount of remaining medicine. In addition, when the amount of remaining medicine is less than or equal to a predetermined value, the user terminal 11 may display information for guiding re-prescription.

Figure 25C:
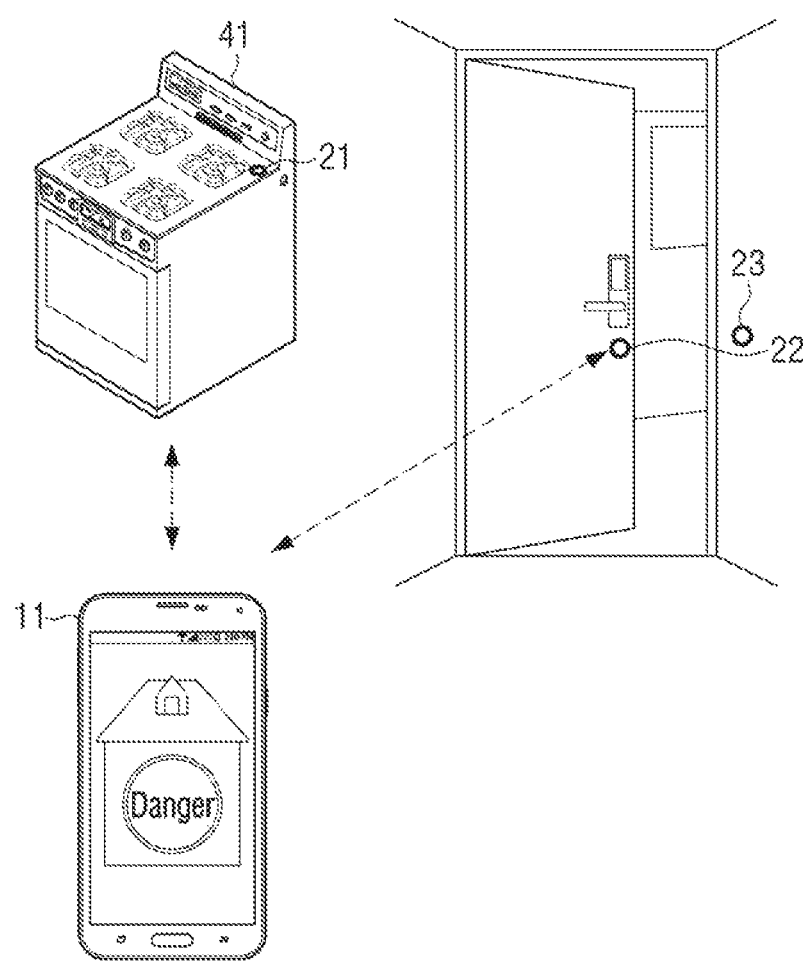

Referring to FIG. 25C, in another example, the user terminal 11 may determine whether a gas range 41 is operated or not based on heat information detected by the attachment device 21 attached to the gas range 41. When it is determined that the gas range 41 is being operated, and the user terminal 11 determines that the entrance is opened based on information detected by the attachment devices 22, 23 attached to the entrance (for example, a distance between the attachment devices 22, 23), the user terminal 11 may determine that the user went out with the gas range 41 being turned on, and provide notification information to the user.

Figure 25D:
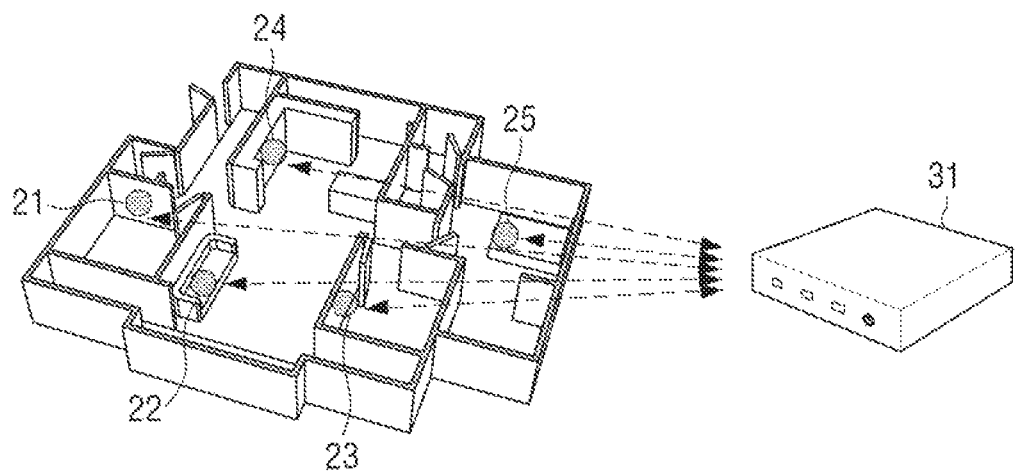

Referring to FIG. 25D, in another example, the user terminal 11 may determine a surrounding environment of user's house (for example, whether gas leaks or not, whether a power strip is overheated or not, whether heat is generated in a specific place, etc.) based on information detected from the attachment devices 21 to 25 attached to user's house. When it is determined that a fire breaks out in a specific place of the house, the user terminal 11 may provide notification information for alerting the user.

As described above, exact and diverse context information can be acquired based on sensor information detected by the attachment device 21, and the user's situation can be determined based on information acquired by the user terminal 11 or the cloud 51. In addition, notification information suitable for a situation is provided to the user, so that unnecessary spamming can be prevented and only essential information can be provided.

Figure 26A:
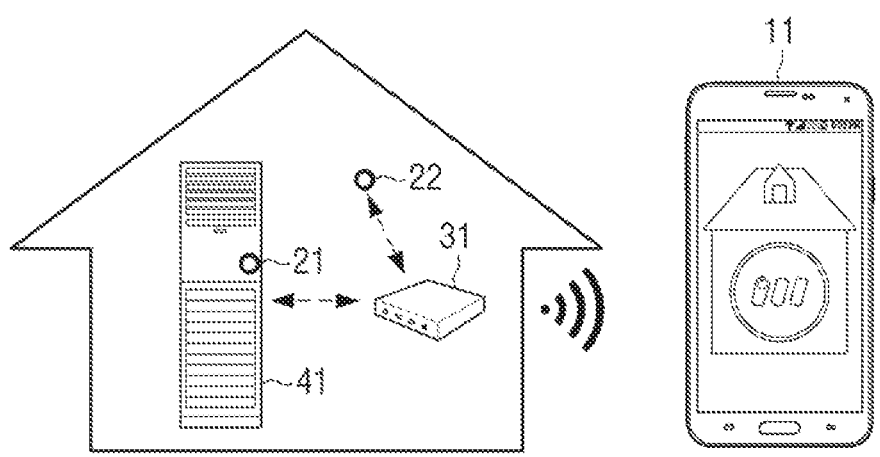

Referring to FIG. 26A, according to an embodiment of the present disclosure, the attachment devices 21, 22 attached to an air conditioner 41 or in user's house may detect information related to the surrounding environment (for example, temperature or humidity). In this case, the attachment device 21 or the hub 31 may control the air conditioner based on detected information. For example, the temperature, air volume, wind direction, etc. of the air conditioner 41 may be adjusted. In addition, the result of the adjusting may be provided to the user terminal 11. In response to the result of the adjusting being received, the user terminal 11 may display the result of the adjusting through the display.

Figure 26B:
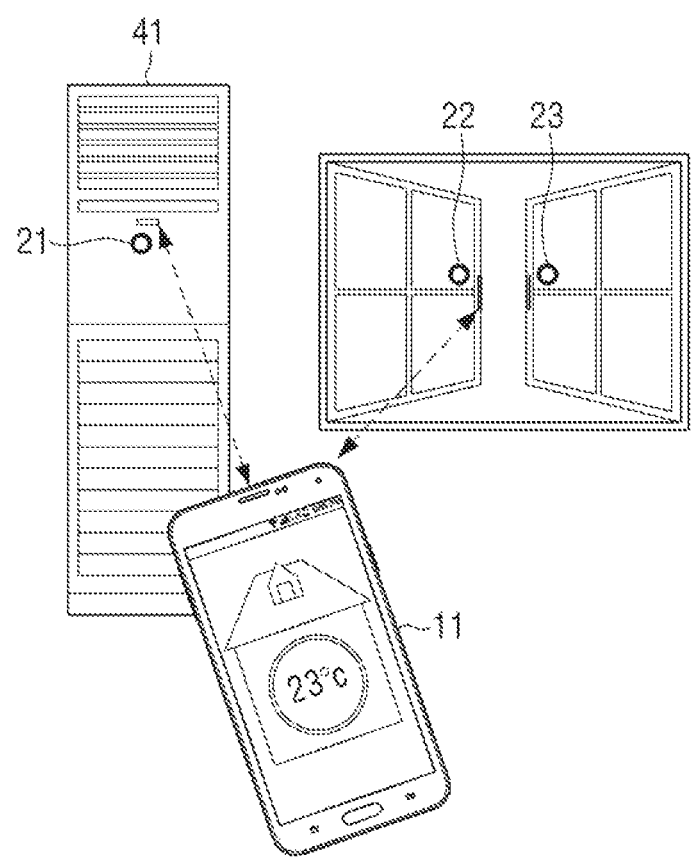

Referring to FIG. 26B, according to an embodiment of the present disclosure, when the user turns on the air conditioner 41 using the attachment device 21, the user terminal 11 may receive information related to the opening and closing of a window from the attachment devices 22, 23 attached to the window. For example, the user terminal 11 may determine whether the window is opened or not based on a distance between the attachment devices 22, 23. When it is determined that the window is opened, the user terminal 11 may display notification information requesting the user to close the window through the display.

Figure 26C:
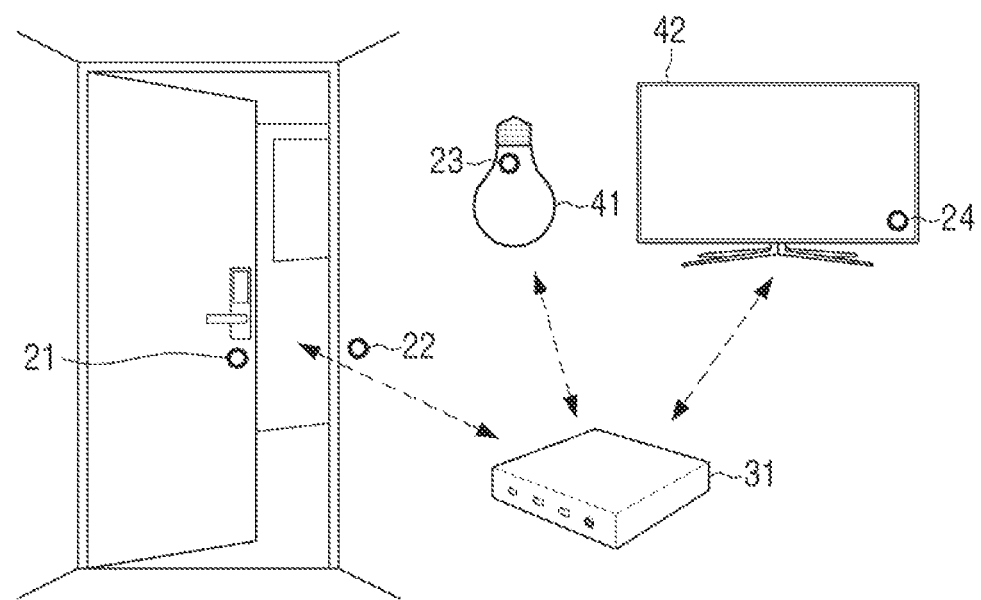

Referring to FIG. 26C, according to an embodiment of the present disclosure, the motion sensor of the attachment devices 21, 22 attached to the entrance may detect the motion of the attachment devices 21, 22. In addition, the proximity sensor of the attachment devices 21, 22 attached to the entrance may detect a distance between the attachment devices 21, 22. Next, the communication unit 540 of the attachment device 21 may transmit detected information to the hub 31 or the user terminal 11. The hub 31 or the user terminal 11 may determine whether the entrance is opened or not based on the information detected by the attachment devices 21, 22 attached to the entrance. For example, when the distance between the attachment devices 21, 22 is more than a predetermined distance, the hub 31 or the user terminal 11 may determine that the entrance is opened. In this case, the hub 31 or the user terminal 11 may transmit control data for controlling the peripheral devices 41, 42 in the house. For example, the hub 31 or the user terminal 11 may transmit control data to the attachment device 23 attached to a lamp 41, and control to turn on the lamp, or transmit control data to the attachment device 24 attached to a digital TV 42, and control to turn on the digital TV 42.

Figure 26D:
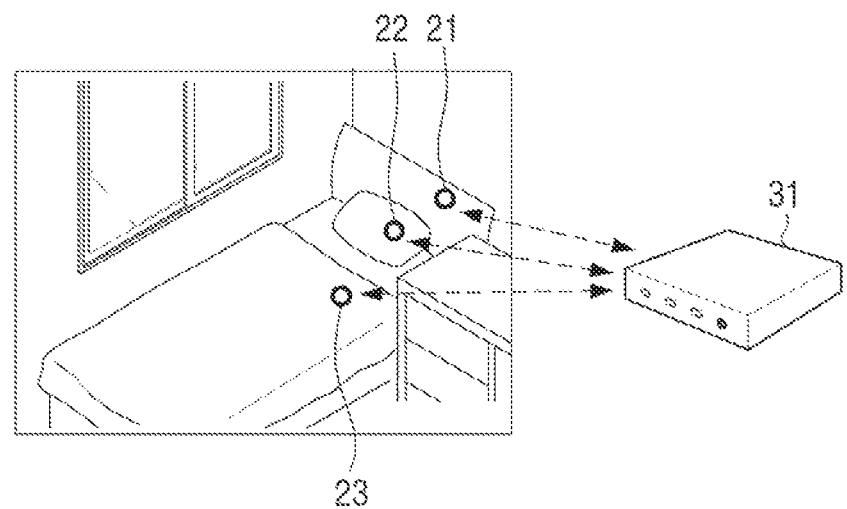

Referring to FIG. 26D, in an example, the hub 31 or the user terminal 11 may determine the operation state of the user based on information detected by the attachment devices 21, 22, 23 attached to user's bedding. For example, the hub 31 or the user terminal 11 may determine that the user gets up using information detected by the motion sensor of the attachment devices 21, 22, 23. In this case, the hub 31 or the user terminal 11 may visually or acoustically provide user-customized information such as news, schedule, traffic information, etc. In addition, the hub 31 or the user terminal 11 may control the peripheral devices to provide the above-described information.

As described above, the sensor information detected by the attachment device 21 may be analyzed and learned in the hub 31 or the user terminal 11, and thus the peripheral devices may be automatically controlled. That is, the peripheral devices are controlled and thus notification information that the user needs to be aware of may be provided.

Figure 27A:
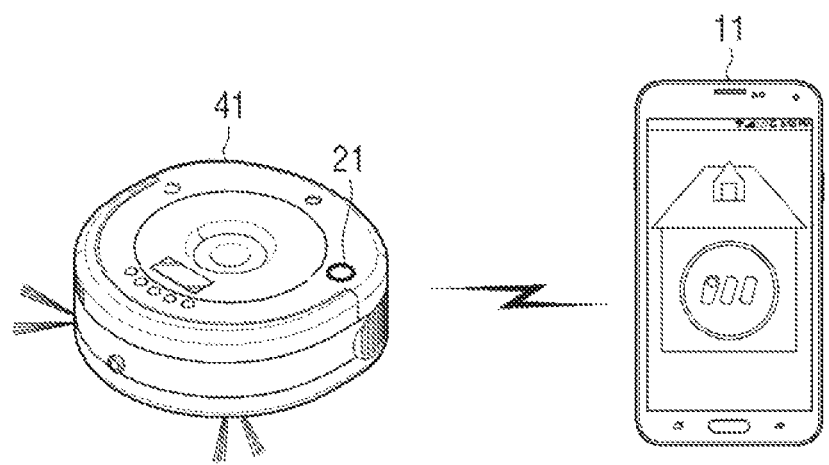

Referring to FIG. 27A, in another example, the user terminal 11 may transmit remote control data to the attachment device 21 attached to a movable peripheral device 41. In response to the control data, the attachment device 21 may control the movable peripheral device 41. For example, when the movable peripheral device 41 is provided with a communication unit, the attachment device 21 may transmit control data which is changed to another communication method to the movable peripheral device 41, and thus may control the peripheral device 41 to move. In addition, the attachment device 21 may control the peripheral device 41 to move using vibration, etc. outputted from the haptic unit of the attachment device 21.

Figure 27B:
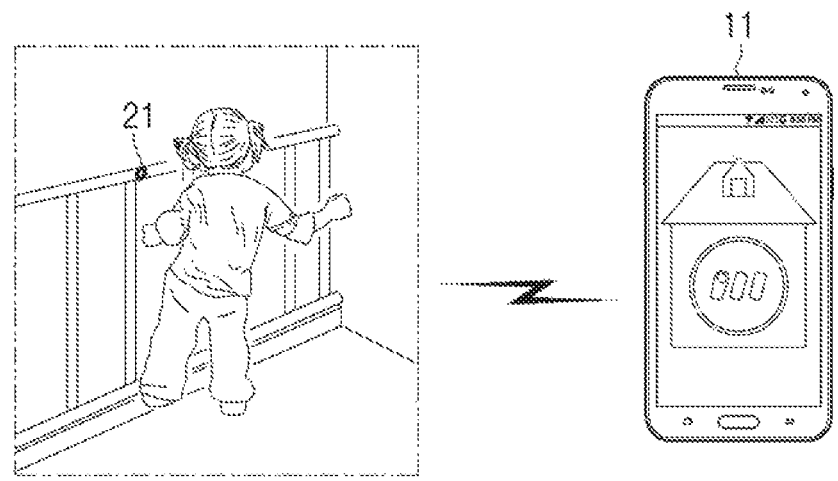

Referring to FIG. 27B, in another example, when the attachment device 21 is attached to the entrance of a dangerous space (for example, a veranda, stairs, a window, etc.), the attachment device 21 may determine whether a person approaches within a predetermined distance using the proximity sensor. As a result of determining, when a person approaches within the predetermined distance, the attachment device 21 may display notification information for alerting through the display. In addition, the attachment device 21 may transmit the information detected through the proximity sensor to the user terminal 11 or the hub 31. When it is determined that the person approaches within the predetermined distance based on the detected information, the user terminal 11 or the hub 31 may display the notification information for alerting through the display.

Figure 28A:
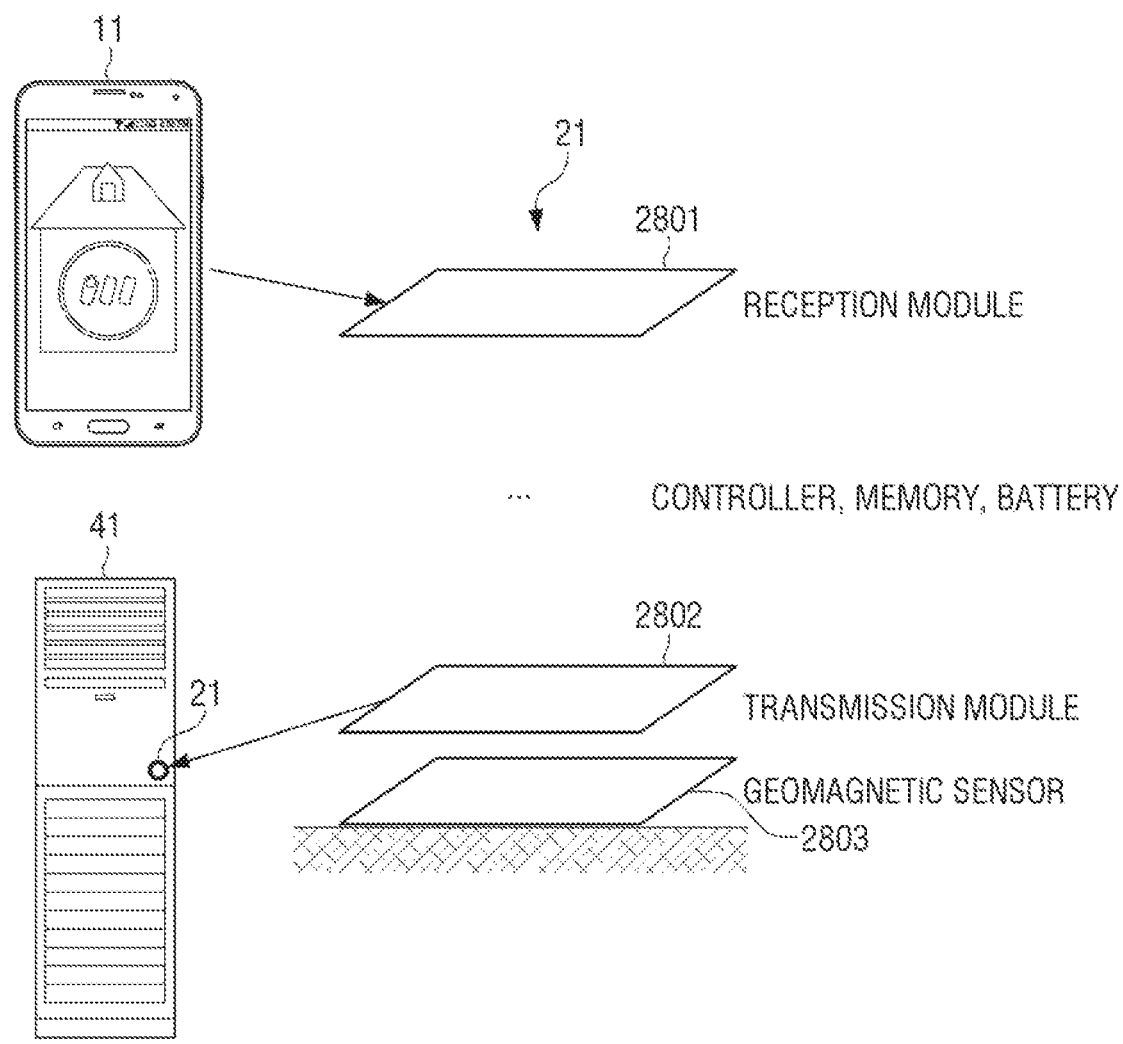

Referring to FIG. 28A, according to an embodiment of the present disclosure, the processor 190 of the user terminal 11 may control the communication unit 140 to transmit control data for turning on or off the air conditioner of the electronic device 41 to the attachment device 21. In response to the control data being received by the reception module of the communication unit 540 in the first layer 2801 of the attachment device 21, the processor 590 of the attachment device 21 may control the transmission module of the communication 540 in the second layer 2802 to transmit the control data which is changed in another communication format to the electronic device 41.

In addition, the processor 590 of the attachment device 21 may determine whether to detect the operation state of the air conditioner according to the type of control data. When it is determined that the operation state of the air conditioner will be detected, the geomagnetic sensor of the sensing unit 580 in the third layer 2803 of the attachment device 21 may transmit geomagnetic information of the air conditioner to the processor 590 of the attachment device 21. The processor 590 of the attachment device 21 may determine the operation state of the air conditioner based on the geomagnetic information, and may transmit notification information corresponding to the result of the determining to the user terminal 11 or the hub 31 through the transmission module of the communication unit 540 in the second layer 2802.

Figure 28B:
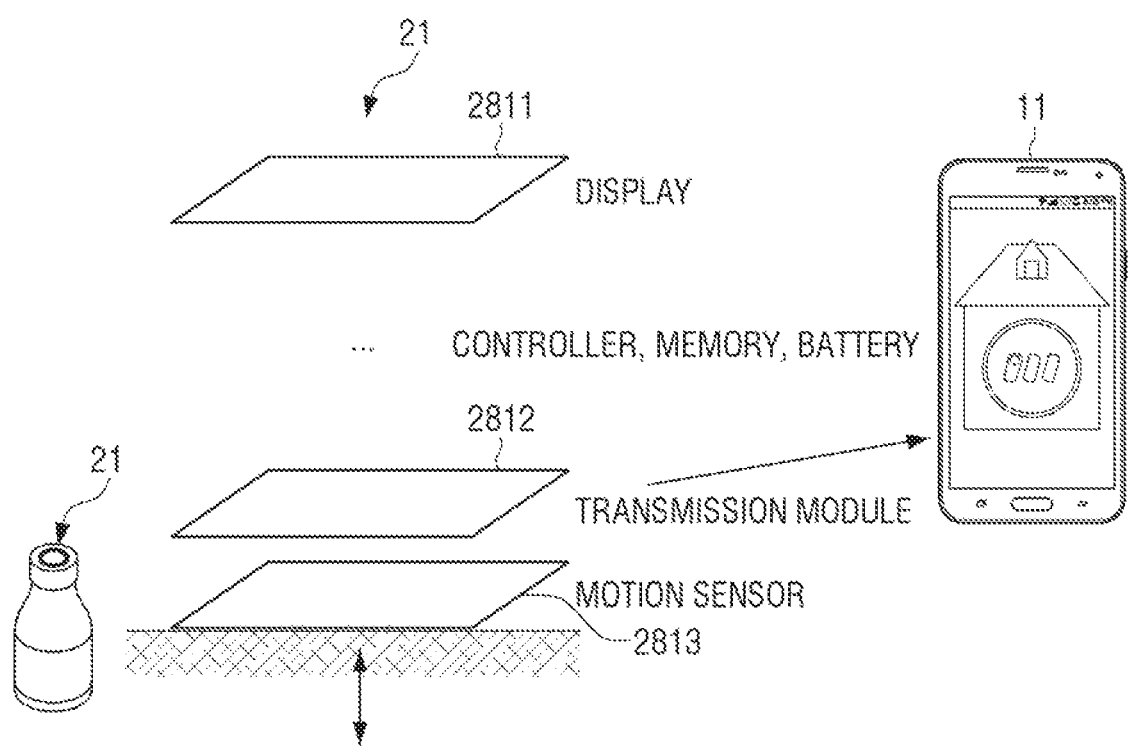

Referring to FIG. 28B, in another example, the motion sensor of the sensing unit 580 in the third layer 2813 of the attachment device 21, which is attached to the lid of the medicine container, may acquire motion information accompanied by the opening of the lid of the medicine container. In response to the motion information being acquired, the transmission module in the second layer 2812 of the attachment device 21 may transmit information on user's does to the user terminal 11. The processor 190 of the user terminal 11 may determine notification information on the medicine based on the information on the user's does. For example, when the number of pills is pre-stored in the storage 150 of the user terminal 11, the processor 190 of the user terminal 11 may determine the number of remaining pills and whether to re-prescribe or not based on the number of times the lid of the medicine container is opened and time at which the lid of the medicine container is opened. Next, the processor 190 of the user terminal 11 may control the display 130 to display the notification information on the medicine. In addition, the processor 190 of the user terminal 11 may control the communication unit 140 to transmit the notification information on the medicine to the attachment device 21. In response to the notification information on the medicine being received by the attachment device 21, the display in the first layer 2811 of the attachment device 21 may display the notification information on the medicine.

Figure 28C:
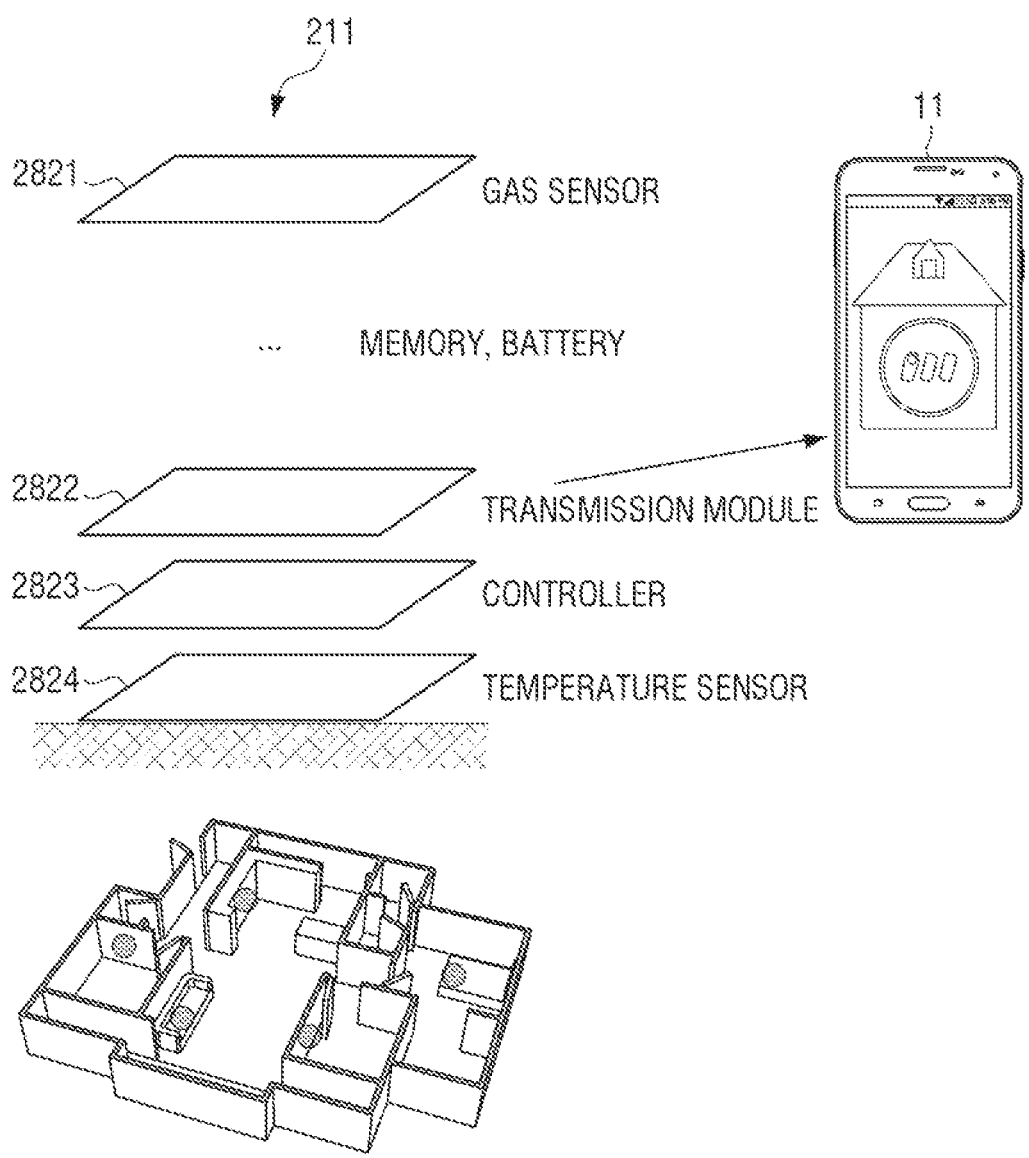

Referring to FIG. 28C, when gas leaks or a power strip is overheated, the temperature sensor of the sensing unit 580 in the fourth layer 2824 of the attachment device 21 attached to a thing in user's house may detect the temperature of the thing. In addition, the gas sensor of the sensing unit 580 in the first layer 2821 of the attachment device 21 may detect the gas leak in the surrounding environment. In this case, the processor 590 in the third layer 2823 of the attachment device 21 may determine whether a detected temperature value or gas concentration value exceeds a predetermined range or not. In addition, when the detected value exceeds the predetermined range, the processor 590 in the third layer 2823 of the attachment device 21 may control the transmission module of the communication unit 540 in the second layer 2822 to transmit the information for alerting to the user terminal 11.

As described above, the attachment device 21 may detect the vibration, sound, temperature, motion, etc. of the thing through the internal layer 2824, and determine the operation state of the thing based on the detected value. In addition, the attachment device 21 may transmit the result of the determining to the user terminal 11, or may directly control the thing based on the result of the determining.

In addition, the attachment device 21 may detect the ambient temperature, humidity, gas, illumination, etc. through the external layer 2821, and determine the operation state of the thing based on the detected value. In addition, the attachment device 21 may transmit the result of the determining to the user terminal 11, or may directly control the thing based on the result of the determining. In addition, the attachment device 21 may broadcast signals (for example, beacon signals) to the outside of the attachment device 21 through the communication unit 540 in the external layer 2821.

In other words, when the attachment device 21 is attached to a legacy device or a smart device, the attachment device 21 may control some of the devices remotely or may add a smart function to the devices.

Figure 29:
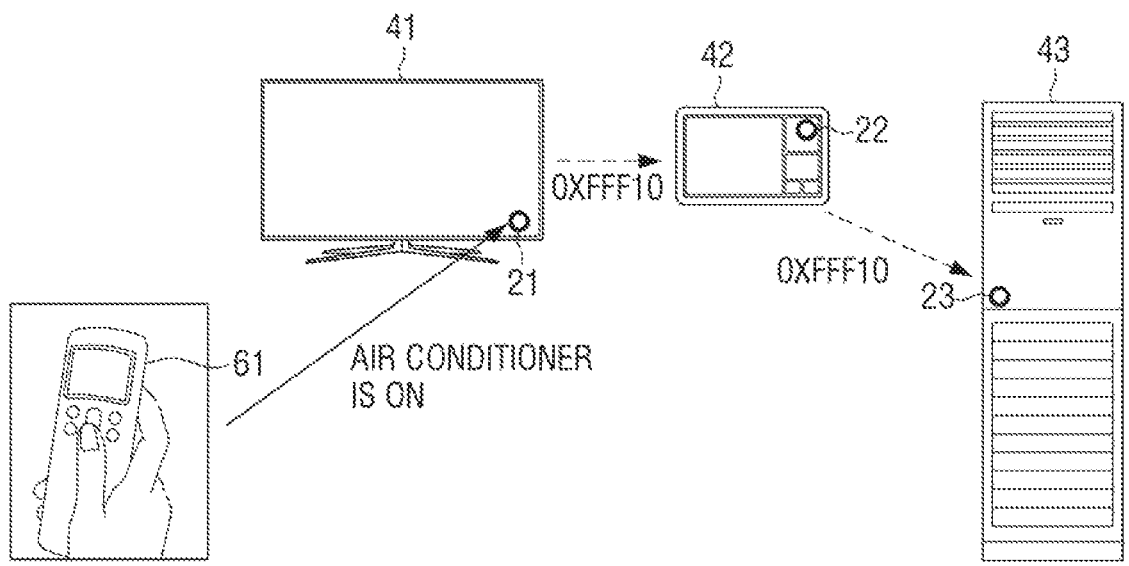

Referring to FIG. 29, according to an embodiment of the present disclosure, the user may point toward a first attachment device 21 attached to a first electronic device 41 in a first space (for example, a bed room), and select one button of the remote controller 61 so as to perform one function (for example, an ON function) of a third electronic device 43 (for example, an air conditioner). The first attachment device 21 which has received control data configured in the IR communication format from the remote controller 61 may re-transmit the control data configured in the IR communication format to a second attachment device 22 attached to a second electronic device 42 located in a second space (for example, a living room). The second attachment device 22 which has received the control data may re-transmit the control data configured in the IR communication format to a third attachment device 23 attached to the third electronic device 43 located in a third space (for example, a study room). In response to the control data being received, the third electronic device 43 may perform one function.

Figure 30:
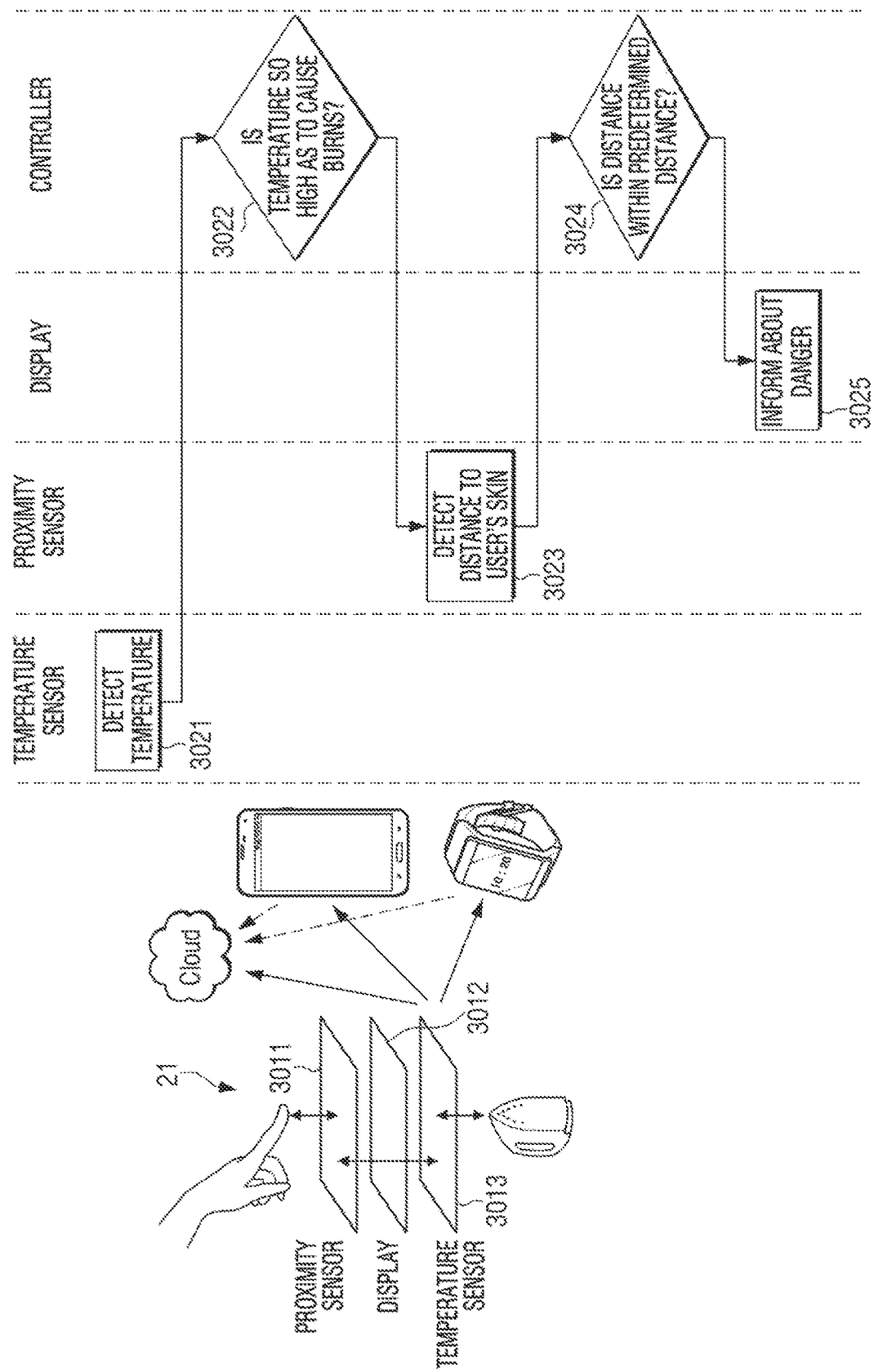

Referring to FIG. 30, according to an embodiment of the present disclosure, the temperature sensor of the sensing unit 580 in the third layer 3013 of the attachment device 21 may detect the temperature of a thing (for example, an iron) at operation 3021.

The processor 590 of the attachment device 21 may determine whether the temperature is higher than or equal to a predetermined value, that is, the temperature is so high as to cause burns to the user based on the detected temperature at operation 3022. In addition, the detected information may be transmitted to the user terminal 11, and the processor 190 of the user terminal 11 may determine whether the temperature is so high as to cause burns to the user at operation 3022.

As a result of determining, when the temperature is so high as to cause burns to the user, the proximity sensor of the sensing unit 580 in the first layer 3011 of the attachment device 21 may detect a distance from the thing to the user at operation 3023. The processor 590 of the attachment device 21 may determine whether the user is within a predetermined distance from the thing based on the detected distance at operation 3024. In addition, the detected information may be transmitted to the user terminal 11, and the processor 190 of the user terminal 11 may determine whether the user is within the predetermined distance from the thing at operation 3024.

As a result of determining, when it is determined that the user is in the proximity of the thing, the attachment device 21 may display notification information for alerting through the display in the second layer 3012 at operation 3025. In addition, the result of the determining may be transmitted to the user terminal 11, and the user terminal 11 may display the notification information for alerting through the display 130 at operation 3025.

Meanwhile, the user terminal 11 may transmit the received sensing information to the cloud 51. In addition, the attachment device 21 may directly transmit the sensing information to the cloud 51. In this case, the cloud 51 may analyze a user's behavior pattern, etc. based on the received information, and provide notification information to the user terminal 11 or the attachment device 21 when a similar situation is predicted in the future.

As described above, the attachment device 21 is implemented in such a pattern that sensors are vertically stacked, and thus shares the information or feedback (for example, notification information) detected by the sensors in a short-distance wireless communication method. In particular, when the display is implemented in one layer of the attachment device 21, the display may provide various images with low power by interworking with the sensors of the attachment device 21.

FIGS. 31 to 35 are views showing a process of attaching the attachment device 21 to a person and utilizing the same according to various embodiments of the present disclosure.

Figure 31:
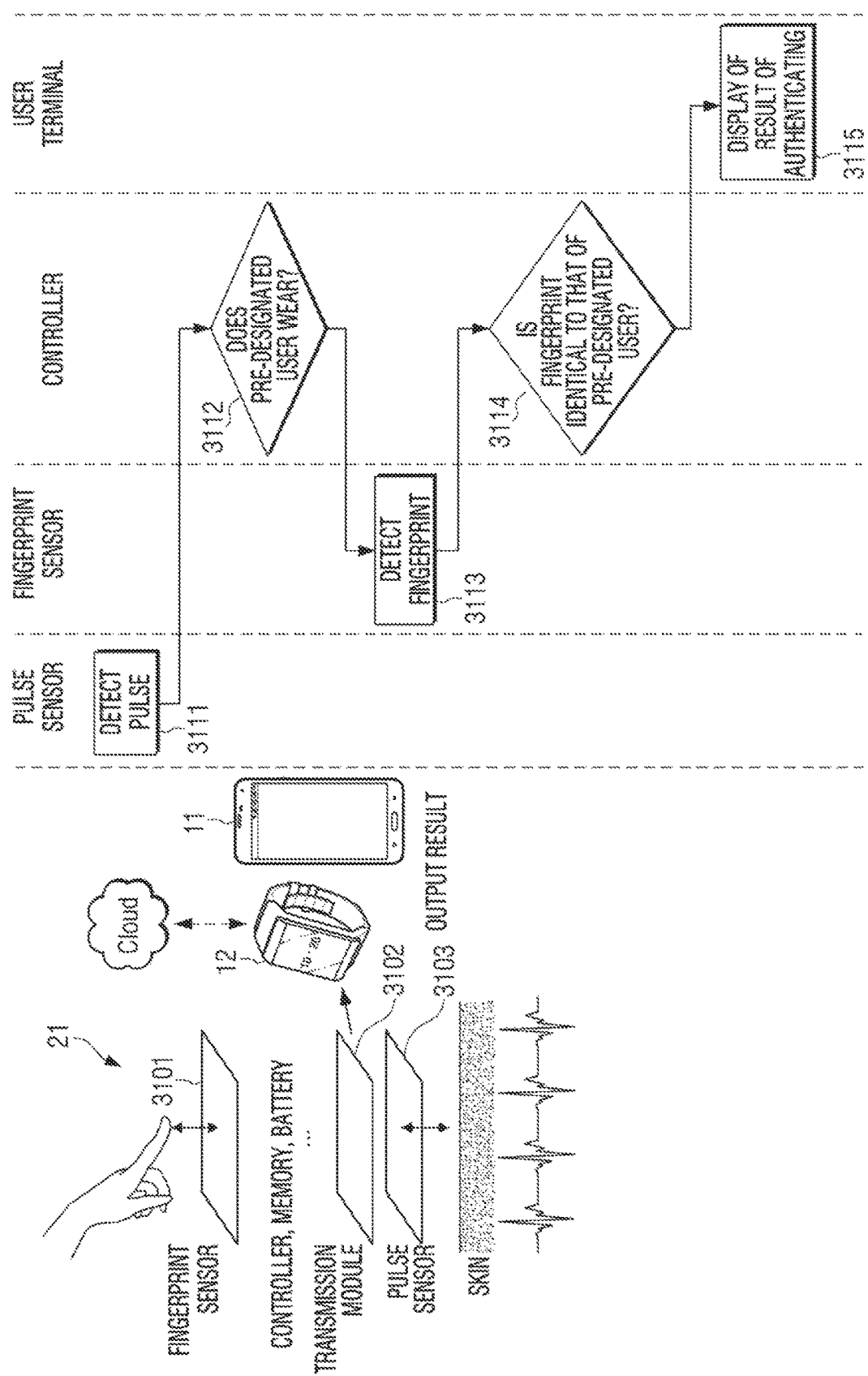
FIGS. 31, 32, 33A, 33B, 33C, 34, and 35 are views showing a process of attaching an attachment device to a person and utilizing the same according to various embodiments of the present disclosure.

Referring to FIG. 31, the sensing unit 580 in the internal layer 3103 of the attachment device 21 may detect user's biological signals. For example, the pulse sensor of the sensing unit 580 may detect a user's pulse at operation 3111. In addition, the heart beat sensor of the sensing unit 580 may detect a user's heartbeat.

The processor 590 of the attachment device 21 may determine whether a pre-designated user wears the attachment device 21 or not based on a detected pulse signal value at operation 3112. For example, the processor 590 of the attachment device 21 may determine whether the pre-designated user wears the attachment device 21 by comparing the detected pulse signal value and a pre-designated user pulse signal value. In addition, the transmission module of the communication unit 540 in one layer 3102 of the attachment device 21 may transmit the detected pulse signal value to least one user terminal 11, 12 or the cloud 51. In this case, the at least one user terminal 11, 12 or the cloud 51 may determine whether the pre-designated user wears the attachment device 21 or not based on the acquired pulse signal value, and transmit the result of the determining to the attachment device 21.

As a result of determining, when it is determined that the pre-designated user wears the attachment device 21, the sensing unit 580 in the external layer 3101 of the attachment device 21 may detect the user's biological signals. For example, the fingerprint sensor of the sensing unit 580 may detect a user's fingerprint at operation 3113.

Next, the processor 590 of the attachment device 21 may determine whether the detected fingerprint is consistent with the pre-designated user's fingerprint based on the characteristic value of the detected fingerprint at operation 3114. In addition, the transmission module of the communication 540 in one layer 3102 of the attachment device 21 may transmit the characteristic value of the detected fingerprint to the at least one user terminal 11, 12 or the cloud 51. In this case, the at least one user terminal 11, 12 or the cloud 51 may determine whether the detected fingerprint is consistent with the pre-designated user's fingerprint based on the characteristic value of the fingerprint.

Next, the transmission module of the communication unit 540 in one layer 3102 of the attachment device 21 may transmit the result of authenticating whether the user is consistent with the pre-designated user to the at least one user terminal 11, 12. Next, in response to the result of the authenticating being received, the processor 190 of the at least one user terminal 11, 12 may control the display 130 to display information related to the result of the authenticating at operation 3115. In addition, when another layer of the attachment device 21 is provided with a display, the attachment device 21 may display information related to the result of the authenticating through the display.

As described above, the user's pulse and fingerprint are detected through the internal layer 3103 which is in contact with user's skin, and the external layer 3102 which is exposed to the outside, and complex authentication is performed through these layers, so that usability is enhanced as security is improved, and an unnecessary error can be prevented. In addition, the respective sensors are included in different layers rather than being arranged horizontally, and are stacked on the user's skin, so that user's inconvenience (for example, a rash, tightened skin, etc.) can be solved.

Figure 32:
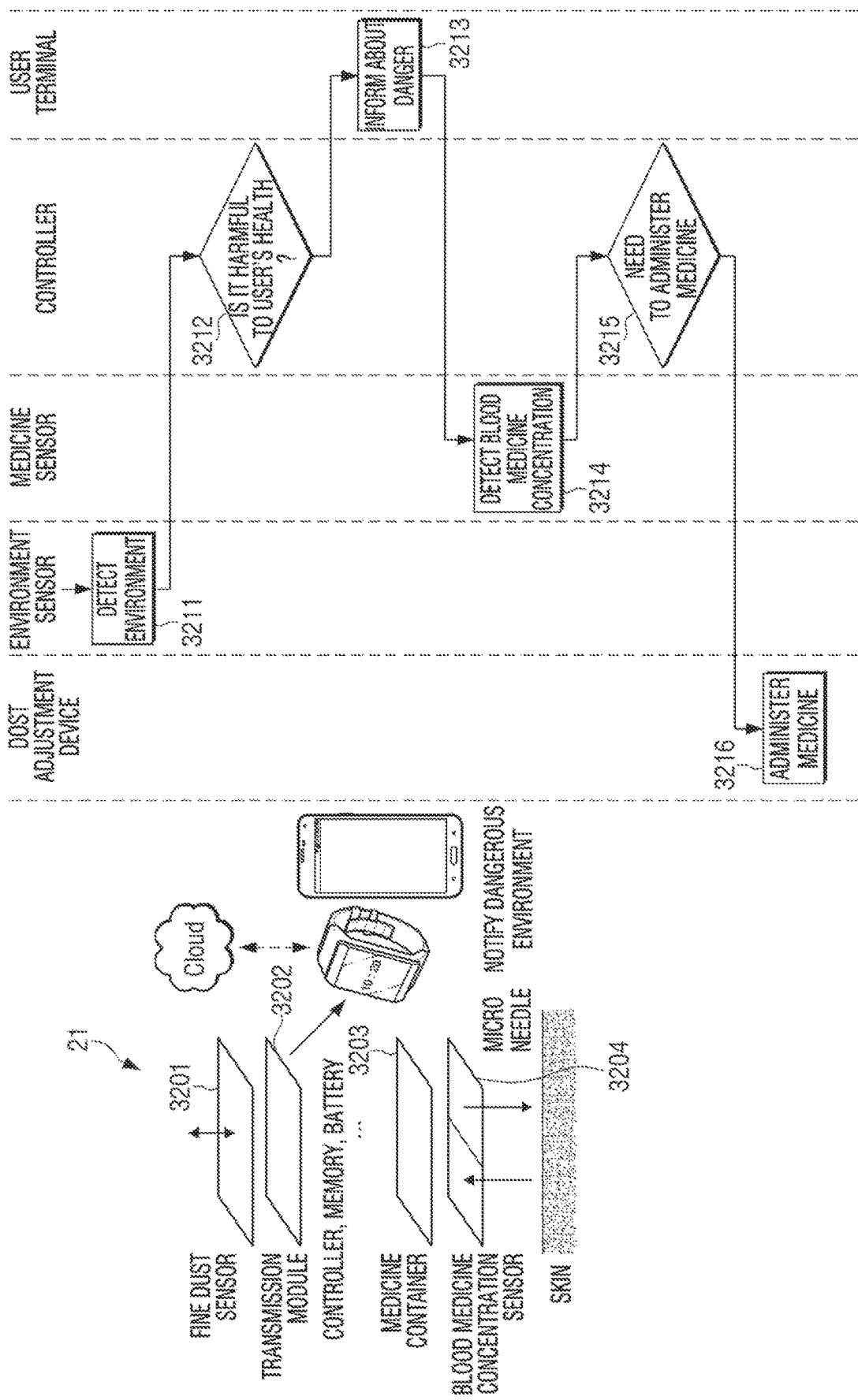

Referring to FIG. 32, according to an embodiment of the present disclosure, the environment sensor of the sensing unit 580 in the external layer 3201 of the attachment device 21 may detect the temperature or humidity of the surrounding environment or the concentration of fine dust at operation 3211. For example, a fine dust sensor may detect the concentration of fine dust which is harmful to user's health.

The processor 590 of the attachment device 21 may determine whether the surrounding environment is harmful to user's health based on the detected surrounding environment information at operation 3212. In this case, the determining process may be performed in the user terminal 11 or the cloud 51 which receives the surrounding environment information.

Next, when it is determined that the surrounding environment is harmful to user's health, the processor 590 of the attachment device 21 may control the transmission module of the communication unit 540 in one layer 3202 to transmit notification information for alerting to the user terminal 11. The processor 190 of the user terminal 11 which has received the notification information may control the display 130 to display the notification information at operation 3213.

In addition, when the processor 590 of the attachment device 21 determines that the surrounding environment is harmful to user's health, the blood medicine concentration sensor of the sensing unit 580 in the internal layer 3204 may detect the concentration of medicine in the user's blood at operation 3214. The processor 590 of the attachment device 21 which has acquired a medicine concentration value from the sensing unit 580 may determine whether it is necessary to administer medicine to the user at operation 3215. In addition, the user terminal 11 may acquire the medicine concentration value and thus determine whether it is necessary to administer medicine to the user at operation 3215.

Next, when it is determined that it is necessary to administer medicine to the user, the processor 590 of the attachment device 21 may control a micro needle in the internal layer 3204 to administer the medicine in the medicine container in one layer 3203 to user's skin at operation 3216.

As described above, the surrounding environment information is detected through the external layer 3201 of the attachment device 21, and the medicine is administered through the internal layer 3204 based on the surrounding environment information, so that user's health can be continuously managed. Additionally, the result of prescribing the medicine for the user such as medicine injection may be transmitted to the user terminal 11 or the cloud 51, so that user's health can be systematically managed. In addition, when it is difficult for the attachment device 21 to administer the medicine or the medicine is administered, the processor 590 of the attachment device 21 may provide feedback to the user through the haptic unit. In addition, the attachment device 21 may transmit the feedback information to the electronic device 41 or the user terminal 11, and the user terminal or the electronic device 41 may provide visual, acoustic or haptic feedback.

Figure 33A:
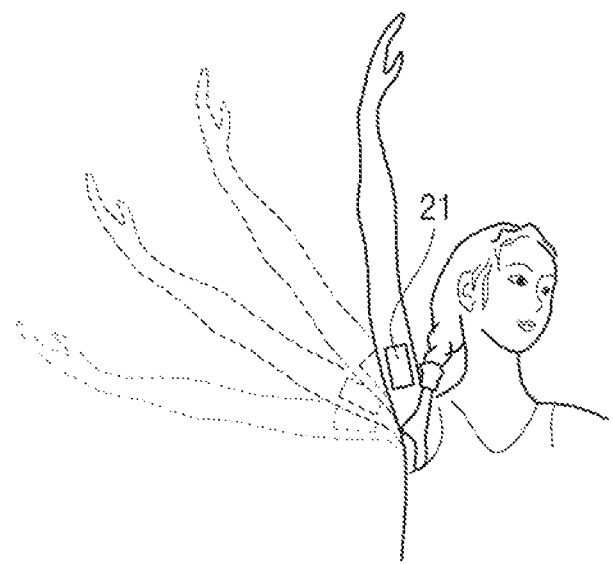

Referring to FIG. 33A, according to an embodiment of the present disclosure, when the attachment device 21 is provided with a display, the processor 590 of the attachment device 21 may control the display to provide an image like moving tattoos. In addition, when the attachment device 21 is formed of a plurality of layers and an image is mapped onto each of the layers, the processor 590 of the attachment device 21 may control to provide an image like moving tattoos by supplying power to the plurality of layers in sequence. When the image like the moving tattoos is provided may be determined user's motion information or user's bio information acquired by the sensing unit 580 of the attachment device 21. As described above, moving tattoos may be provided using the attachment device 21 at low power or low cost which is customized by the user.

Figure 33B:
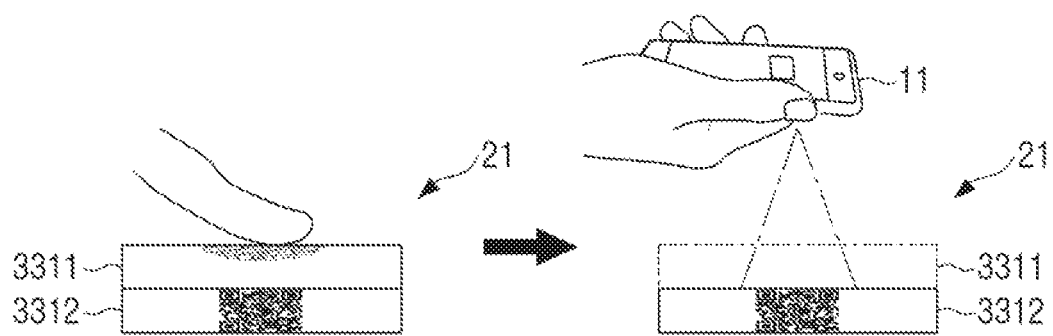

Referring to FIG. 33B, according to an embodiment of the present disclosure, the processor 590 of the attachment device 21 may control the display to display a payment code inserted into one layer 3312 in a special situation. For example, the processor 590 of the attachment device 21 may control the external layer 3311 to display the payment code image inserted into one layer by changing the colored external layer 3311 of the attachment device 21 (for example, skin color) to the transparent external layer 3311. In addition, the processor 590 of the attachment device 21 may control the display to display the payment code through the display of the attachment device 21.

The special situation may refer to a situation in which payment is needed and user authentication is performed in response to the sensing unit 580 detecting a user's touch on the external layer 3311 of the attachment device 21. In addition, the special situation may refer to a situation in which the user terminal 11 is located within a predetermined distance from the attachment device 21 or the user terminal 11 executes an application related to payment.

Figure 33C:
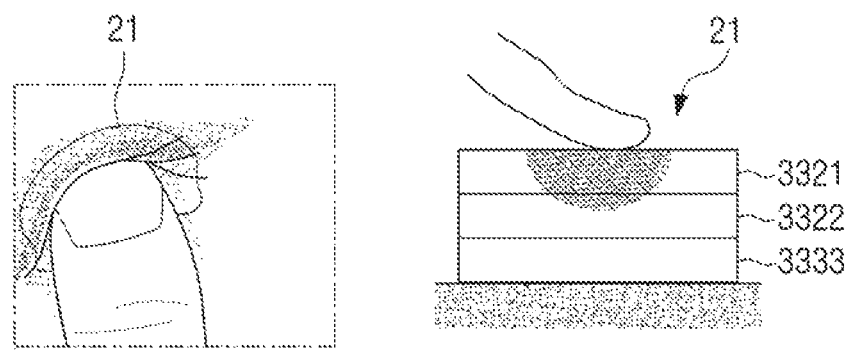

Referring to FIG. 33C, according to an embodiment of the present disclosure, when the plurality of layers 3321, 3322, 3323 of the attachment device 21 are vertically stacked, the processor 590 of the attachment device 21 may select one layer from the plurality of layers 3321, 3322, 3323 based on the intensity of pressure of the user pressing the attachment device 21. In addition, according to the result of the selecting, the processor 590 of the attachment device 21 may control to display an image (for example, a tattoos image) included in the selected layer. For example, the processor 590 of the attachment device 21 may supply power to display the image of the selected layer.

As described above, when the plurality of layers 3321, 3322, and 3323 include different images, the images included in the plurality of layers 3321, 3322, 3323 may be selectively displayed according to the intensity of the user's pressure on the attachment device 21.

Figure 34:
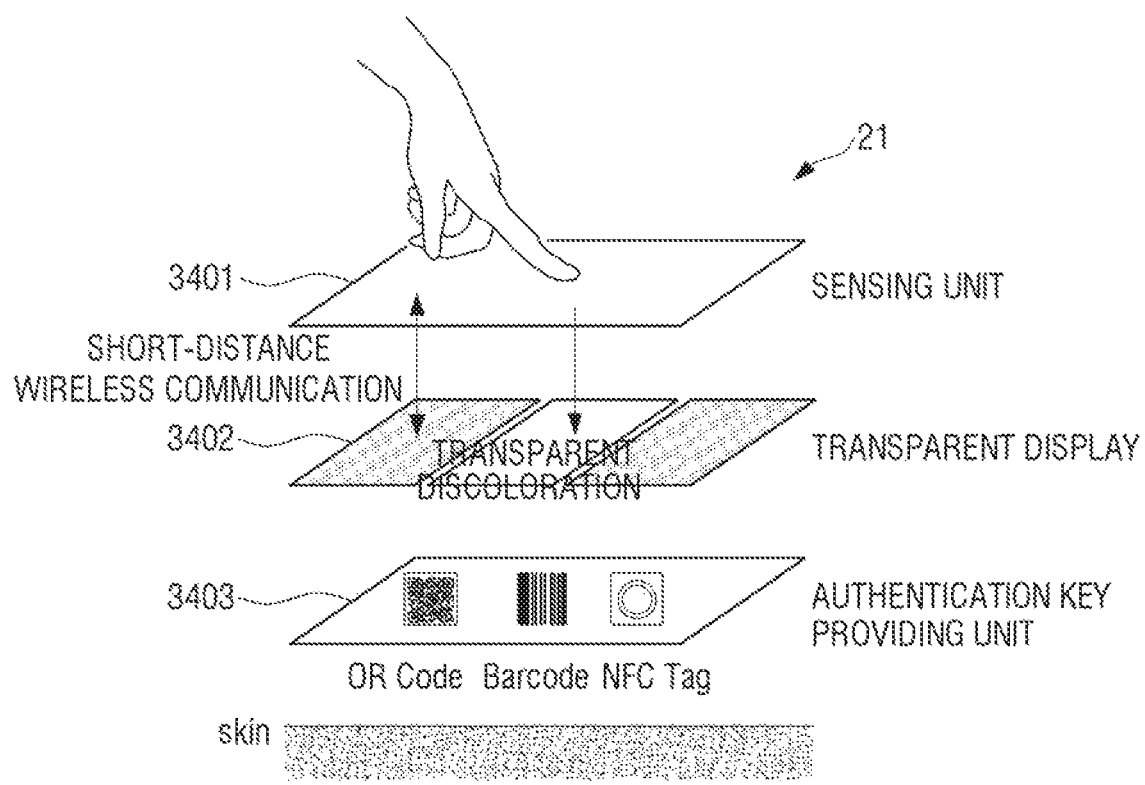

Referring to FIG. 34, according to an embodiment of the present disclosure, when the attachment device 21 is formed a plurality of layers 3401, 3402, and 3403, the first layer 3401 may include the sensing unit 580, the second layer 3402 may include a plurality of transparent displays, and the third layer 3403 may include an authentication key provider.

In this case, the sensing unit 580 of the first layer 3401 may detect a user's touch, gesture, or fingerprint.

In addition, the plurality of transparent displays of the second layer 3402 may be displayed transparently or opaquely. For example, the transparent displays may be normally displayed in color like skin color, and may be displayed transparently in a special condition.

In addition, the authentication key provider of the third layer 3403 may provide various kinds of authentication keys. For example, the third layer 3403 may display a barcode image or a quick response (QR) code image which is printed, and may display a code image for authenticating through the display. In addition, the authentication key provider may provide an authentication key including an NFC tag.

Herein, power may be supplied to the first layer 3401 and the second layer 3402, and data may be transmitted/received between the layers in a short-distance wireless communication method. On the other hand, the third layer 3403 provides the code image or the NFC tag, and thus extra power may not be supplied to the third layer 3403. That is, the wearable attachment device 21 may perform authentication when power supply is limited.

In this situation, the sensing unit 580 of the first layer 3401 may detect a user input. For example, the touch sensor of the sensing unit 580 may detect a user input to perform a single touch or a multi-touch.

In response to the user input, the plurality of transparent displays of the second layer may be selectively displayed. For example, in response to a single touch being detected, a transparent display corresponding to a barcode image may be transparently displayed, and the other transparent displays may be maintained opaquely (for example, in skin color). In addition, in response to a multi-touch being detected, a transparent display corresponding to a QR code image may be transparently displayed, and the other transparent displays may be maintained opaquely (for example, in skin color). In addition, the user may perform user authentication using the displayed authentication key.

As described above, the attachment device 21 is normally displayed in skin color, and provides the authentication key only when necessary (for example, only for payment), so that the security of the authentication key and user's convenience can be improved.

Figure 35:
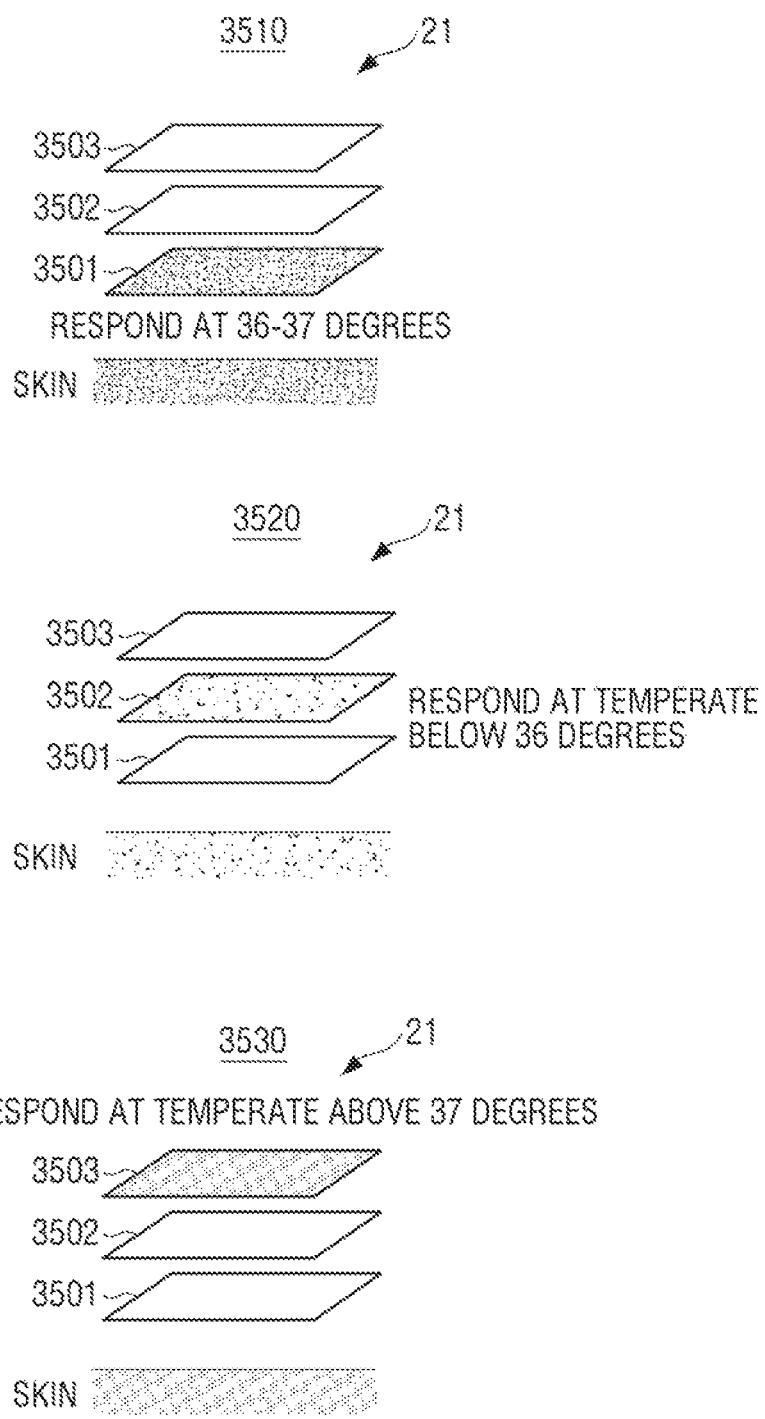

Referring to FIG. 35, according to an embodiment of the present disclosure, when the attachment device 21 is formed of a plurality of layers 3501, 3502, 3503, each of the plurality of layers 3501, 3502, 3503 may include the sensing unit 580.

In this case, the plurality of layers 3501, 3502, 3503 may display different information according to user's bio information. For example, when the user's temperature is detected as being from 36-37 degrees through the sensing unit 580 of the first layer 3501, the first layer 3501 may be displayed in first color (for example, skin color) as shown in view 3510 of FIG. 35. In addition, a first image which is a printed image of the first layer 3501 may be displayed.

In another example, when the user's temperature is detected as being below 36 degrees through the sensing unit 580 of the second layer 3502, the second layer 3502 may be displayed in second color (for example, light red) as shown in view 3520 of FIG. 35. In addition, a second image which is a printed image of the second layer 3502 may be displayed.

In another example, when the user's temperature is detected as exceeding 37 degrees through the sensing unit 580 of the third layer 3503, the third layer 3503 may be displayed in third color (for example, dark red) as shown in view 3530 of FIG. 35. In addition, a third image which is a printed image of the third layer 3503 may be displayed.

In this situation, the plurality of layers 3501, 3502, 3503 display different colors according to the results of the detecting of the respective layers 3501, 3502, 3503, and thus extra data transmission/reception may not be required between the plurality of layers 3501, 3502, 3503.

In addition, when the sensing unit 580 of one of the plurality of layers 3501, 3502, 3503 detects the bio information, the colors of the plurality of layers 3501, 3502, 3503 may be selectively displayed according to the detected bio information. For example, the processor 590 of the attachment device 21 may acquire the user's temperature from the sensing unit 580 of one layer, and selectively transmit control data to the plurality of layers 3501, 3502, 3503 according to the acquired temperature. For example, when the user's temperature is 36.5 degrees, the processor 590 of the attachment device 21 may transmit the control data to the first layer 3501. In this case, in response to the control data, the first layer 3501 may be displayed in the first color.

Figure 36A:
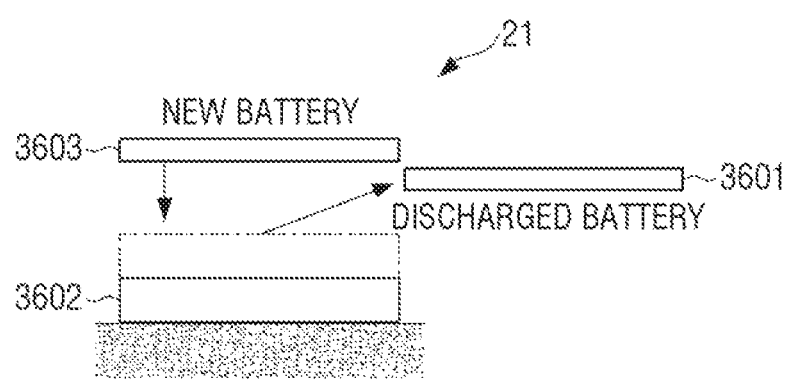
FIGS. 36A, 36B, and 36C are views showing a processing of attaching and detaching some of a plurality of layers of an attachment device according to various embodiments of the present disclosure.
Figure 36B:
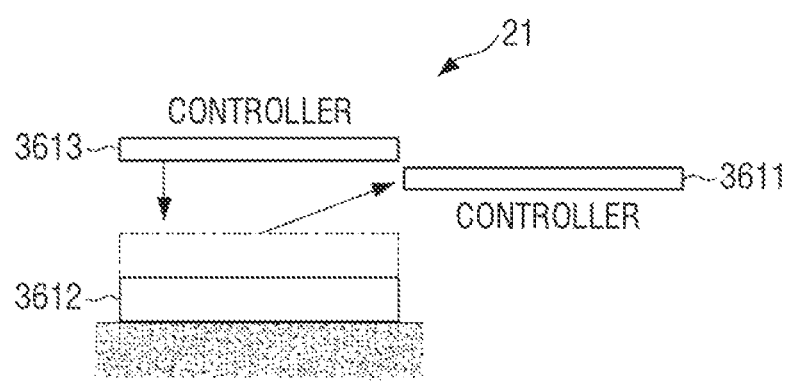
Figure 36C:
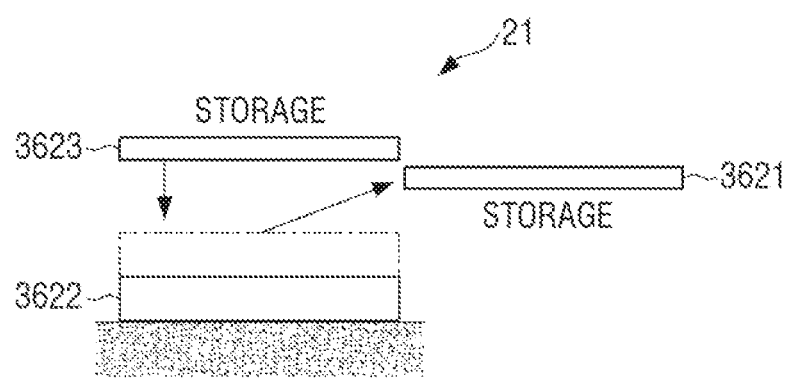

FIGS. 36A to 36C are views showing a process of attaching and detaching some of the plurality of layers of the attachment device 21 according to various embodiments of the present disclosure.

Referring to FIG. 36A, according to an embodiment of the present disclosure, a layer 3601 which includes a battery from among the plurality of layers 3601, 3602 of the attachment device 21 may be selectively attached and detected. For example, when the battery of the attachment device 21 is discharged, the user may remove the layer 3601 including the discharged battery, and may attach a layer 3603 including a new battery. In order to inform whether the battery is discharged or not, the processor 590 of the attachment device 21 may display battery information through the display included in one layer. In this case, the layers 3601, 3603 including the battery may be external layers which are exposed to the outside to facilitate attachment and detachment.

As described above, when the layers of the attachment device 21 are attachable and detachable, the user may carry a layer including a battery, and may additionally attach the layer to the attachment device or replace another layer with the layer when necessary, thereby continuously providing power to the attachment device 21.

On the other hand, when the battery is chargeable, the layer including the battery may be an internal layer. In this case, the layer including the battery may be attached to a wireless charging pad and supplied with power.

Referring to FIG. 36B, according to an embodiment of the present disclosure, a layer 3611 which includes the processor 590 from among the plurality of layers 3611, 3612 of the attachment device 21 may be selectively attached and detached. For example, when it is necessary to provide a new service or a new function, the user may remove the layer 3611 including the existing processor 590 and attach a layer 3613 including a new processor 590.

Referring to FIG. 36C, according to an embodiment of the present disclosure, a layer 3621 which includes the storage 550 from among the plurality of layers 3621, 3622 of the attachment device 21 may be selectively attached and detached. For example, when it is necessary to provide a new service or a new function, the user may remove the layer 3621 including the existing storage 550 and attach a layer 3623 including a new storage 550.

Meanwhile, when some of the plurality of layers of the attachment device 21 is detected or attached, the attachment device 21 may be automatically reset in response to the layer being detached or attached. The data used for resetting the attachment device 21 may be transmitted in a short-distance communication method through the common unit or the communication unit 540 of the attachment device 21.

In addition, when some of the plurality of layers of the attachment device 21 is attached, a service or a function which may be executed in relation to the newly attached layer may be automatically set and provided. In addition, information on the new service or function may be provided through the display of the attachment device 21 or the display 130 of the user terminal 11.

On the other hand, when some of the plurality of layers of the attachment device 21 is detached, a service or a function which may be executed in relation to the remaining layer may be automatically set and provided. In addition, the detachment state of the layer or information on the service or function which may be executed in relation to the remaining layer may be provided through the display of the attachment device 21 or the display 130 of the user terminal 11.

FIG. 37 is a view showing various examples of attaching the attachment device 21 to a person according to an embodiment of the present disclosure.

View 3710 of FIG. 37 shows various examples of attachment locations of a person to which the attachment device 21 is attached. In particular, the attachment device 21 may be manufactured in various shapes considering the area of the attachment location, the curvature of the attachment location, and whether the attachment device 21 is attached or detached. In addition, the attachment device 21 may be utilized for various purposes according to attachment locations. For example, when the attachment location is a calf, the attachment device 21 may be used to relax person's muscles. In addition, when the attachment location is a hip, the attachment device 21 may be used to measure how long a person sits.

As described above, the attachment device 21 may be implemented in various methods and may be freely attached regardless of the surface shape of a person or thing. In addition, the attachment device 21 may be manufactured in various sizes and shapes according to the purposes thereof.

View 3720 of FIG. 37 shows various examples of information that the attachment device 21 attached to person's skin can detect. For example, when the attachment device 21 detects biological signals, the attachment device 21 may detect person's temperature, hear beat, sweat, blood flow, oxygen saturation, brainwave, etc. In addition, when the attachment device 21 is attached to a skin surface, the attachment device 21 may detect a skin state, a scar state, skin flexibility, etc. In addition, the attachment device 21 may detect a body's motion, flexibility, pressure, a touch location, or whether a touch is made or not. In addition, the attachment device may detect a surrounding environment. For example, the attachment device 21 may detect fine dust concentration, an amount of ultraviolet ray, temperature, humidity, a sound, an ambient image, a location, weather, etc.

View 3730 of FIG. 37 shows various examples of information that the attachment device 21 can output. For example, the attachment device 21 may display an image or output vibration, a sound, light, and an electrical impulse. In addition, the attachment device 21 may be tightened or loosened to increase adhesion. In addition, the attachment device 21 may be torn or automatically detached from an attachment object when a function is completely performed or when a predetermined time elapses.

View 3740 of FIG. 37 shows various examples of supplying power to the attachment device 21. For example, the attachment device 21 may be supplied with power through body heat, body's motion, solar heat, drawn blood, etc.

Figure 38:
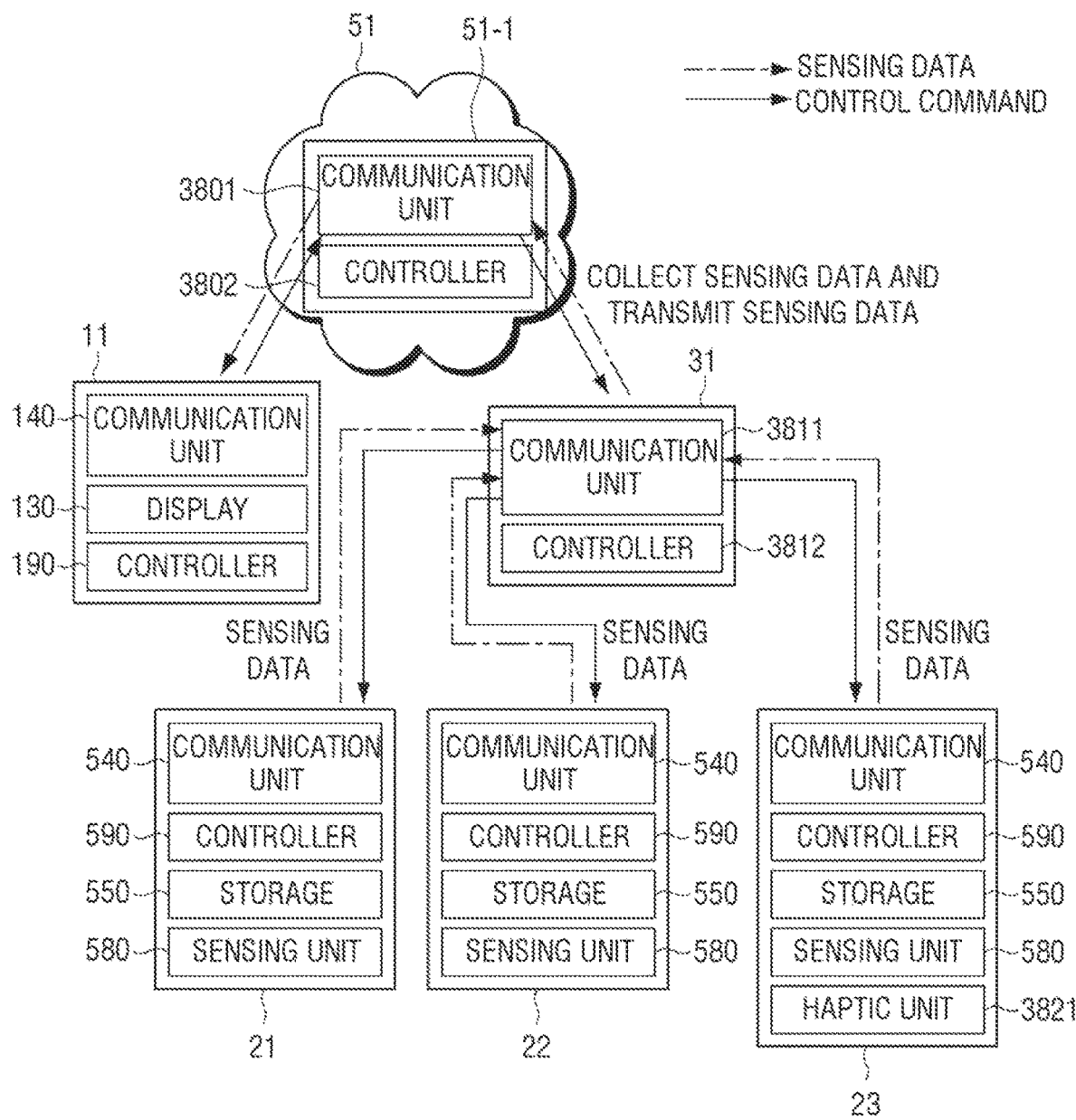
FIG. 38 is a block diagram schematically illustrating a configuration of a system according to an embodiment of the present disclosure.

FIG. 38 is a block diagram schematically illustrating a configuration of a system 10 according to an embodiment of the present disclosure.

Referring to FIG. 38, the system 10 may include a user terminal 11, a server 51-1 included in a cloud 51, a hub 31, and at least one attachment device 21, 22, 23.

The user terminal 11 and the server 51-1, and the server 51-1 and the hub 31 may be connected with each other through various communication methods. For example, they may be connected with each other through 3G, LTE, etc. which is a first communication method.

The hub 31 and the attachment devices 21, 22, 23 may be connected with each other through various communication methods. For example, they may be connected with each other through Wi-Fi, BLE, BT, etc. which is a second communication method.

The attachment devices 21, 22, 23 and electronic devices 41, 42 may be connected with each other through various communication methods. For example, they may be connected with each other through Wi-Fi, BLE, BT, IR, RFID, NFC, etc. which is a third communication method.

In this case, the first to third communication methods may be different communication methods, and the first communication method may be a long-distance communication method, and an area covered by the first communication method may be larger than an area covered by a short-distance communication method such as the second communication method or the third communication method. In this case, an area covered by the second communication method may be larger than an area covered by the third communication method.

The user terminal 11 may include a display 130, a processor 190, and a communication unit 140. The configurations of the display 130, the processor 190, and the communication unit 140 have been described in the above explanations, and thus a redundant explanation thereof is omitted.

The server 51-1 may include a communication unit 3801 and a processor 3802. The communication unit 3801 of the server 51-1 may communicate with an external device such as the user terminal 11 or the hub 31 according to various kinds of communication methods.

The hub 31 may include a communication unit 3811 and a processor 3812. The communication unit 3811 of the hub 31 may communicate with an external device such as the server 51-1 or the attachment devices 21, 22, 23 according to various kinds of communication methods.

The attachment devices 21, 22 each may include a communication unit 540, a processor 590, a sensing unit 580, and a storage 550. In addition, the other attachment device 23 may include a communication unit 540, a processor 590, a storage 550, a sensing unit 580, and a haptic unit 3821. In the system 10, the attachment device 21 may be attached to an electronic device, the attachment device 22 may be attached to a person, and the attachment device 23 may be attached to a wall.

According to an embodiment of the present disclosure, the processor 190 of the user terminal 11 may receive a user input to request the operation state of the person or thing to which the attachment devices 21, 22, 23 are attached, or surrounding environment information. In response to the user input, the communication unit 140 of the user terminal 11 may transmit the request information to the communication unit 3801 of the server 51-1.

Next, in response to the received request information, the processor 590 of the server 51-1 may transmit the request information to the communication unit 3811 of the indoor hub 31. In response to the request information being received by the communication unit 3811, the processor 3812 of the hub 31 may transmit the request information to the communication unit 540 of at least one attachment device 21, 22, 23.

Next, in response to the received request information, the processor 590 of each of the attachment devices 21, 22, 23 may control the sensing unit 580 of each of the attachment devices 21, 22, 23 to acquire the operation state of the person or thing to which the attachment devices 21, 22, 23 are attached or the surrounding environment information.

Accordingly, the sensing unit 580 of the attachment device 21 may acquire data related to the operation state of the electronic device. In addition, the sensing unit 580 of the attachment device 22 may acquire data related to the person's health state or the operation state. In addition, the sensing unit 580 of the attachment device 23 may acquire data related to the surrounding environment information.

Next, the processor 590 of each of the attachment devices 21, 22, 23 may control the communication unit 540 to transmit the sensing data acquired through the sensing unit 580 to the communication unit 3811 of the hub 31.

In response to the sensing data being acquired, the processor 3812 of the hub 31 may transmit the collected sensing data to the communication unit 3801 of the server 51-1.

Next, in response to the sensing data being received, the processor 3802 of the server 51-1 may analyze the received sensing data. In addition, as a result of analyzing the sensing data, the processor 3802 may acquire notification information to be notified to the user, recommendation information for the user, etc. In this case, the result of the analyzing may be acquired using a variety of information such as existing sensing data acquired by the server 51-1, a result of analyzing the existing sensing data, user's profile information, user behavior history information, etc.

Next, the processor 3802 of the server 51-1 may provide the acquired notification information, recommendation information, etc. to the communication unit 140 of the user terminal 11.

The processor 190 of the user terminal 11 may control the display 130 to display the received notification information, recommendation information, etc.

FIGS. 39 to 42 are flowcharts to illustrate a method for controlling a portable terminal according to various embodiments of the present disclosure.

Figure 39:
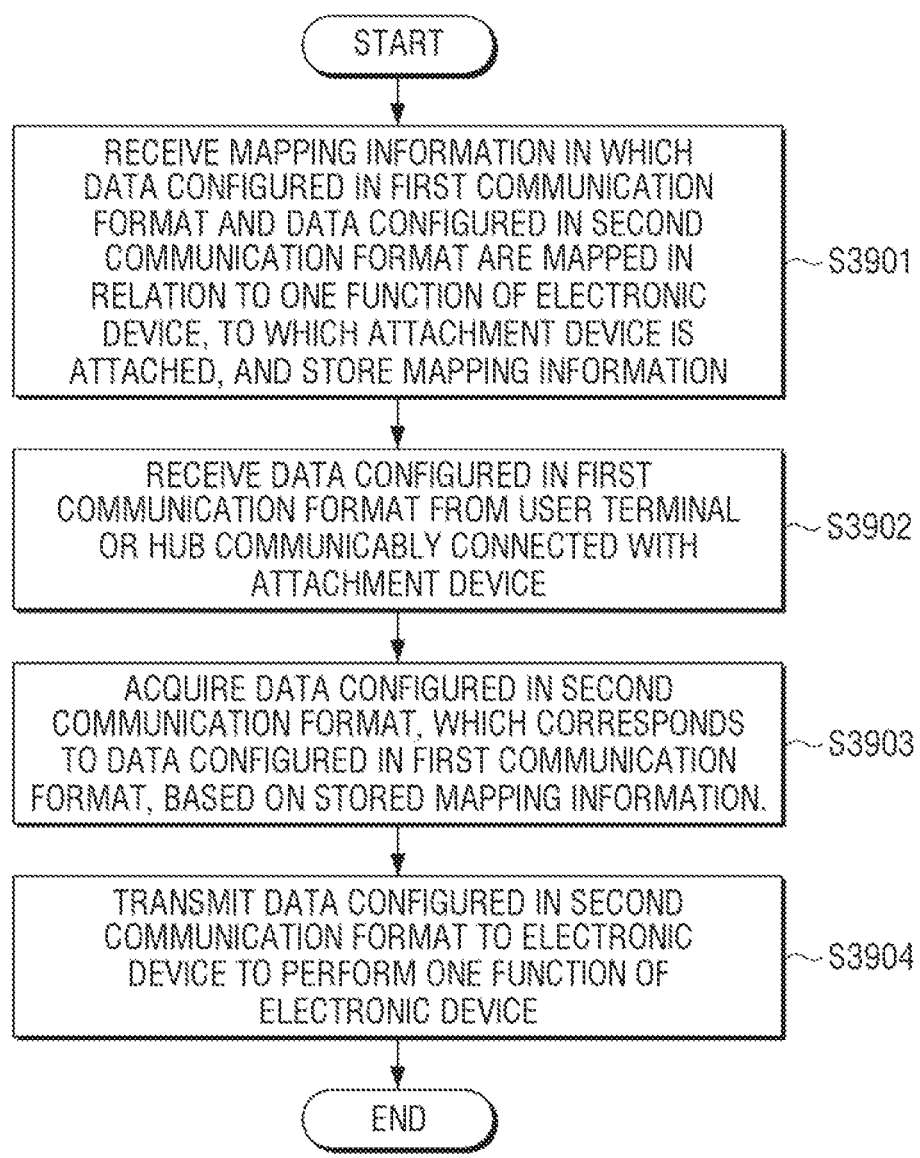
FIGS. 39, 40, 41, and 42 are flowcharts to illustrate a method for controlling a portable terminal according to various embodiments of the present disclosure.

Referring to FIG. 39, the attachment device 21 may receive mapping information in which data configured in a first communication format and data configured in second communication format in relation to one function of the electronic device 41, to which the attachment device 21 is attached, are mapped, and store the mapping information at operation S3901. In response to one attachment device being selected from an attachment device list of the user terminal 11, the attachment device 21 may receive the mapping information related to one function of the electronic device 41 from the user terminal 11 or the hub 31, and store the mapping information.

Next, the attachment device 21 may receive data configured in the first communication format from the user terminal 11 or the hub 31 which is communicably connected with the attachment device 21 at operation S3902.

Next, the attachment device 21 may acquire data configured in the second communication format corresponding to the data configured in the first communication format based on the stored mapping information at operation S3903.

Next, the attachment device 21 may transmit the data configured in the second communication format to the electronic device 41 to perform one function of the electronic device 41 at operation S3904.

In this case, the attachment device 21 may transmit the data configured in the second communication format to the electronic device 41 based on the operation state of the electronic device 41. For example, when the electronic device 41 is detected as being pre-operated, the attachment device 21 may not transmit the data configured in the second communication format to the electronic device 41.

In addition, the attachment device 21 may transmit the data configured in the second communication format to the electronic device 41 based on the surrounding environment information of the attachment device 21. For example, the electronic device 41 may detect ambient temperature or humidity, and transmit the data configured in the second communication format for controlling the electronic device 41 to the electronic device 41 considering the surrounding environment information.

Figure 40:
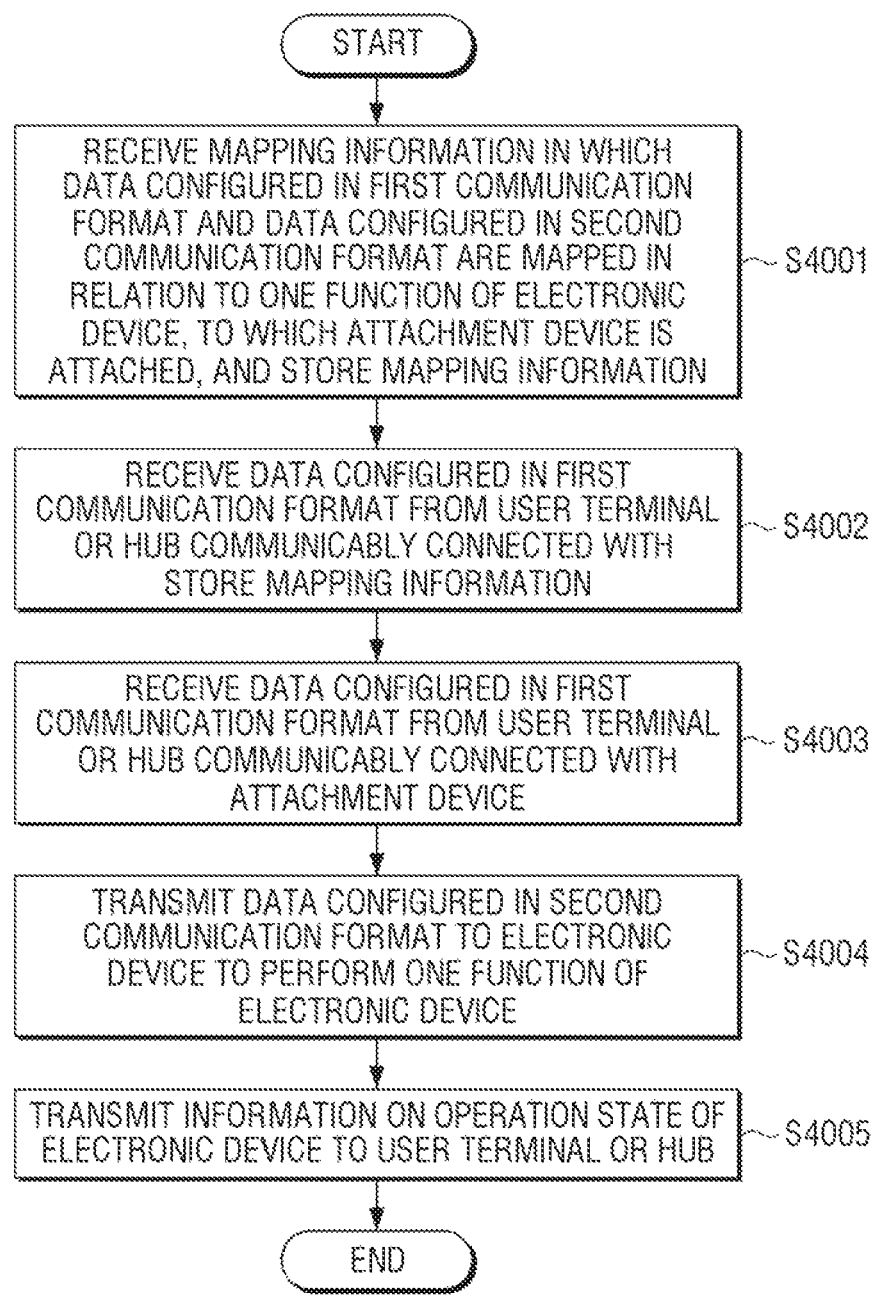

Referring to FIG. 40, according to an embodiment of the present disclosure, the attachment device 21 may receive mapping information in which data configured in a first communication format and data configured in second communication format in relation to one function of the electronic device 41, to which the attachment device 21 is attached, are mapped, and store the mapping information at operation S4001.

Next, the attachment device 21 may receive data configured in the first communication format from the user terminal 11 or the hub 31 which is communicably connected with the attachment device 21 at operation S4002.

Next, the attachment device 21 may acquire data configured in the second communication format corresponding to the data configured in the first communication format based on the stored mapping information at operation S4003.

Next, the attachment device 21 may transmit the data configured in the second communication format to the electronic device 41 to perform one function of the electronic device 41 at operation S4004.

Next, the attachment device 21 may transmit information on the operation state of the electronic device 41 to the user terminal 11 or the hub 31 at operation S4009. For example, the attachment device 21 may detect whether the electronic device 41 is in an on state or an off state, and may transmit the result of the detecting to the user terminal 11 or the hub 31 at operation S4009.

Figure 41:
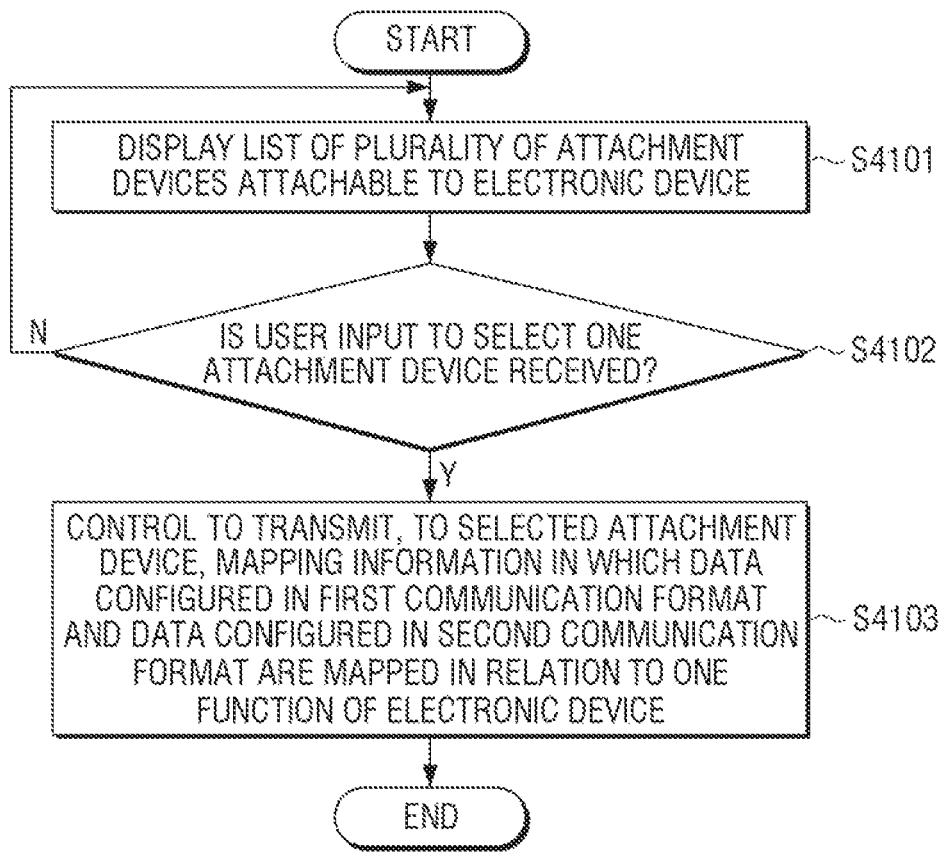

Referring to FIG. 41, according to an embodiment of the present disclosure, the user terminal 11 may display a list of a plurality of attachment devices which are attachable to the electronic device 41 at operation S4101.

Next, the user terminal 11 may determine whether a user input to select one attachment device 21 is received or not at operation S4102. As a result of determining, when the user input to select one attachment device 21 is received at operation S4102-Y, the user terminal 11 may transmit mapping information in which data configured in a first communication format and data configured in a second communication format in relation to one function of the electronic device 41 are mapped to the selected attachment device 21 at operation S4103.

Next, the user terminal 11 may display information on the function of the electronic device 41 which is controllable by the attachment device 21.

Figure 42:
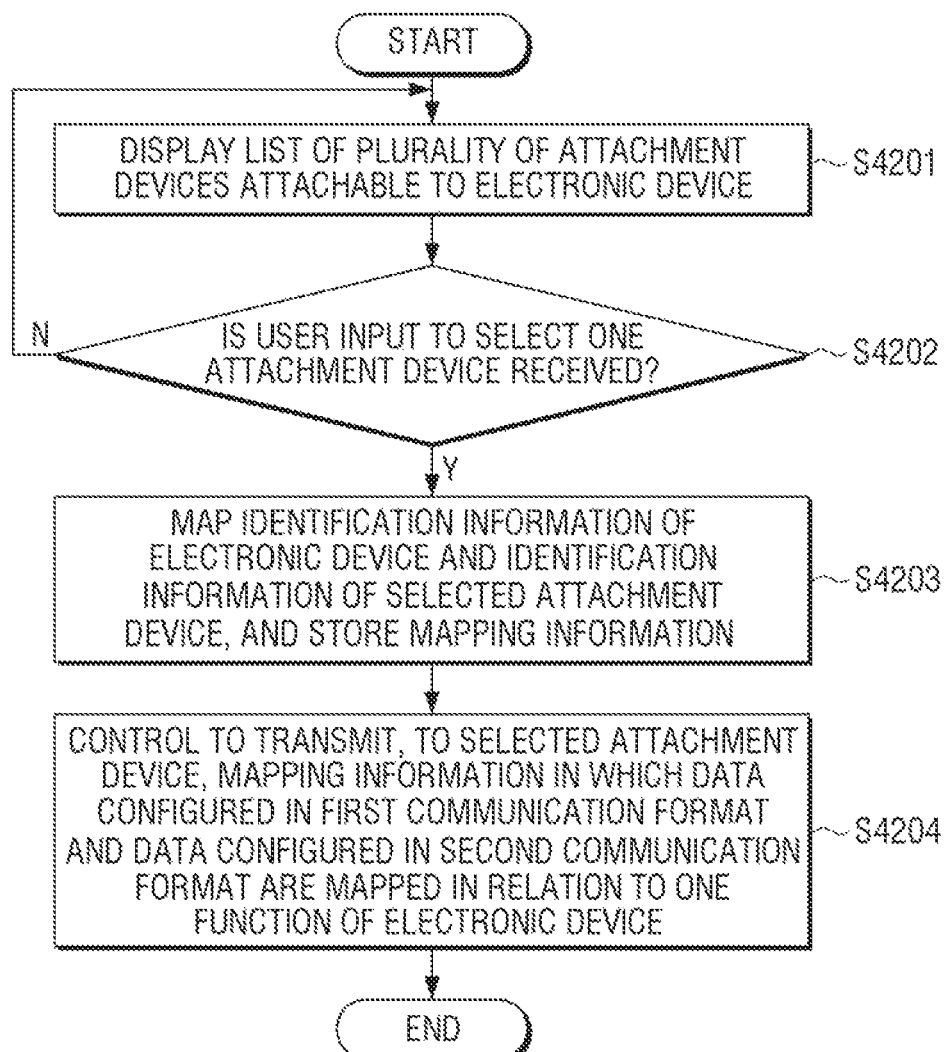

Referring to FIG. 42, according to an embodiment of the present disclosure, the user terminal 11 may display a list of a plurality of attachment devices which are attachable to the electronic device 41 at operation S4201.

Next, the user terminal 11 may determine whether a user input to select one attachment device 21 is received or not at operation S4202. As a result of determining, when the user input to select one attachment device 21 is received at operation S4202-Y, the user terminal 11 may map the identification information of the electronic device 41 and the identification information of the selected attachment device 21, and store the mapping information at operation S4203.

Next, the user terminal 11 may control to transmit mapping information in which data configured in a first communication format and data configured in a second communication format in relation to one function of the electronic device 41 are mapped to the selected attachment device 21 at operation S4204.

In this case, the user terminal 11 may directly transmit the mapping information to the attachment device 21, may transmit the mapping information to the attachment device 21 via the hub 31, may transmit the mapping information to the attachment device 21 via the cloud 51, or may transmit the mapping information to the attachment device 21 via the cloud 51 or the hub 31.

In addition, in response to the user terminal 11 transmitting a mapping information request signal to the hub 31, the hub 31 may transmit the mapping information stored in the hub 31 to the attachment device 21. In addition, in response to the user terminal 11 transmitting the mapping information request signal to the cloud 51, the cloud 51 may directly transmit the mapping information stored in the cloud 51 to the attachment device 21, and the cloud 51 may transmit the mapping information stored in the cloud 51 to the attachment device 21 via the hub 31.

The method for controlling the electronic device in the user terminal 11 according to the above-described embodiments of the present disclosure may be implemented as a program and provided. Specifically, a non-transitory computer readable medium which stores a program including the method for controlling the electronic device in the user terminal 11 may be provided.

The non-transitory computer readable medium refers to a medium that stores data semi-permanently rather than storing data for a very short time, such as a register, a cache, a memory or etc., and is readable by an apparatus. Specifically, the above-described programs may be stored in the non-transitory computer readable medium such as a compact disc (CD), a digital versatile disc (DVD), a hard disk, a Blu-ray disk, a universal serial bus (USB), a memory card, a ROM or etc., and may be provided. In addition, the above-described programs may be stored in the storage 150 of the user terminal 11 by way of an example of the non-transitory computer readable medium, and provided.

In addition, the method for controlling the electronic device in the attachment device 21 according to the above-described embodiments of the present disclosure may be implemented as a program and provided. Specifically, a non-transitory computer readable medium which stores a program including the method for controlling the electronic device in the attachment device 21 may be provided.

The non-transitory computer readable medium refers to a medium that stores data semi-permanently rather than storing data for a very short time, such as a register, a cache, a memory or etc., and is readable by an apparatus. Specifically, the above-described programs may be stored in the non-transitory computer readable medium such as a CD, a DVD, a hard disk, a Blu-ray disk, a USB, a memory card, a ROM or etc., and may be provided. In addition, the above-described programs may be stored in the storage 550 of the attachment device 21 by way of an example of the non-transitory computer readable medium, and provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device in a user terminal, the method comprising:
   displaying a list of a plurality of attachment devices which are attachable to the electronic device;
   receiving a first user input to select an attachment device to control the electronic device from the list;
   receiving an operation state of the electronic device from the selected attachment device;
   based on receiving a second user input, obtain first data corresponding to the second user input, the first data configured in a first communication format in relation to a function of the electronic device and mapping information for converting the first data into second data, the second data configured in a second communication format in relation to the function;
   based on the operation state of the electronic device indicating that the electronic device is performing the operation related to the function, receiving notification information indicating that the function is being performed from the attachment device; and
   based on the operation state of the electronic device indicating that the electronic device is not performing the operation related to the function, transmitting, to the selected attachment device, the first data and the mapping information for converting the first data into the second data,
   wherein the first communication format corresponds to a communication format between the user terminal and the selected attachment device, and the second communication format corresponds to a communication format between the selected attachment device and the electronic device.

2. The method of claim 1, further comprising:
   mapping identification information of the electronic device and identification information of the selected attachment device; and
   storing the mapping information.

3. The method of claim 1, further comprising:
   displaying information related to a function of the electronic device which is controllable by the selected attachment device.

4. The method of claim 1, the displaying of the information comprises:
   displaying the information related to the operation state of the electronic device based on the received operation state of the electronic device.

5. The method of claim 1, wherein the transmitting of the mapping information to the selected attachment device comprises controlling, by at least one of the user terminal, a hub, and a cloud, to transmit the mapping information to the selected attachment device.

6. A user terminal which controls an electronic device, the user terminal comprising:
   a display configured to display a list of a plurality of attachment devices which are attachable to the electronic device; and
   a processor configured to:
      based on a first user input to select an attachment device to control the electronic device from the attachment device list, receive an operation state of the electronic device from the selected attachment device, based on receiving a second user input, obtain first data corresponding to the second user input the first data configured in a first communication format in relation to a function of the electronic device and mapping information for converting the first data into second data, the second data configured in a second communication format in relation to the function, based on the operation state of the electronic device indicating that the electronic device is performing the operation related to the function, receive notification information indicating that the function is being performed from the attachment device; and based on the operation state of the electronic device indicating that the electronic device is not performing the operation related to the function, transmit, to the selected attachment device, the first data and the mapping information for converting the first data into the second data, wherein the first communication format corresponds to a communication format between the user terminal and the selected attachment device, and the second communication format corresponds to a communication format between the selected attachment device and the electronic device.

7. The user terminal of claim 6, further comprising a storage configured to:

map identification information of the electronic device and identification information of the selected attachment device, and store the mapping information.

8. The user terminal of claim 6, wherein the processor is further configured to display information related to a function of the electronic device which is controllable by the selected attachment device.

9. The user terminal of claim 6, wherein the processor is further configured to display the information based on the operation state of the electronic device received from to the selected attachment device.

10. The user terminal of claim 6, wherein the processor is further configured to control at least one of the user terminal, a hub, and a cloud to transmit the mapping information to the selected attachment device.

* * * * *